US012013519B2

United States Patent
Kim et al.

(10) Patent No.: US 12,013,519 B2
(45) Date of Patent: Jun. 18, 2024

(54) CAMERA MODULE

(71) Applicant: Samsung Electro-Mechanics Co., Ltd., Suwon-si (KR)

(72) Inventors: Hag Chul Kim, Suwon-si (KR); Tae Yeon Lim, Suwon-si (KR); Phil Ho Jung, Suwon-si (KR); Yong Joo Jo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 272 days.

(21) Appl. No.: 17/339,220

(22) Filed: Jun. 4, 2021

(65) Prior Publication Data

US 2022/0113520 A1     Apr. 14, 2022

(30) Foreign Application Priority Data

Oct. 12, 2020 (KR) .......................... 10-2020-0131366

(51) Int. Cl.
  *G02B 15/14* (2006.01)
  *G02B 13/00* (2006.01)
  *G02B 27/00* (2006.01)

(52) U.S. Cl.
  CPC ....... *G02B 15/142* (2019.08); *G02B 13/0045* (2013.01); *G02B 13/0065* (2013.01); *G02B 27/0025* (2013.01)

(58) Field of Classification Search
  CPC .............. G02B 15/142; G02B 13/0045; G02B 13/0065; G02B 27/0025

(Continued)

(56) References Cited

U.S. PATENT DOCUMENTS 3,603,726 A * 9/1971 Garber .................... G06E 3/001
  348/335
4,529,280 A * 7/1985 Nohda ................... A61B 3/036
  351/214

(Continued)

FOREIGN PATENT DOCUMENTS

CN     1531406 A     9/2004
CN     1648710 A     8/2005

(Continued)

OTHER PUBLICATIONS

Taiwanese Office Action dated Mar. 22, 2022, in counterpart Taiwanese Patent Application No. 110111437 (8 pages in English, 10 pages in Mandarin).

(Continued)

*Primary Examiner* — James R Greece
(74) *Attorney, Agent, or Firm* — NSIP Law

(57) ABSTRACT

A camera module includes a first lens group; a first optical path folding unit; a second lens group; and a second optical path folding unit. The first lens group, the first optical path folding unit, the second lens group, and the second optical path folding unit are sequentially disposed from an object side of the first lens group toward an imaging plane of the camera module. The first optical path folding unit includes a first fixed reflective member and a first movable reflective member configured to vary a length of an optical path between the first lens group and the second lens group, and the second optical path folding unit includes a second fixed reflective member and a second movable reflective member configured to vary a length of an optical path between the second lens group and an imaging plane.

28 Claims, 33 Drawing Sheets

(58) Field of Classification Search
USPC .......................................................... 359/691
See application file for complete search history.

(56) References Cited

U.S. PATENT DOCUMENTS

| | | | | |
|---|---|---|---|---|
| 5,166,718 | A * | 11/1992 | Suzuki | G03B 19/12 |
| | | | | 396/111 |
| 6,094,210 | A * | 7/2000 | Cobb | G02B 7/28 |
| | | | | 347/241 |
| 6,282,022 | B1 | 8/2001 | Abe | |
| 7,522,336 | B2 * | 4/2009 | Hermann | G02B 21/20 |
| | | | | 359/368 |
| 9,967,547 | B2 * | 5/2018 | Georgiev | H04N 23/55 |
| 9,986,223 | B2 * | 5/2018 | Goma | G02B 17/0856 |
| 2002/0159029 | A1 * | 10/2002 | Ross | A61B 3/103 |
| | | | | 351/212 |
| 2005/0189481 | A1 | 9/2005 | Nishimura et al. | |
| 2006/0092524 | A1 * | 5/2006 | Konno | G02B 13/0065 |
| | | | | 359/678 |
| 2006/0152677 | A1 | 7/2006 | Youssefi et al. | |
| 2006/0256429 | A1 | 11/2006 | Obrebski et al. | |
| 2007/0002462 | A1 | 1/2007 | Mitsuki | |
| 2007/0126911 | A1 * | 6/2007 | Nanjo | G02B 15/145115 |
| | | | | 348/335 |
| 2014/0111869 | A1 | 4/2014 | Kawamura | |
| 2014/0112651 | A1 | 4/2014 | Sato | |
| 2015/0029595 | A1 | 1/2015 | Swihart et al. | |
| 2015/0253647 | A1 | 9/2015 | Mercado | |
| 2017/0108669 | A1 * | 4/2017 | Kim | A61B 18/1402 |
| 2017/0108670 | A1 * | 4/2017 | Ko | G02B 13/0065 |
| 2020/0004039 | A1 | 1/2020 | Ogasahara | |
| 2020/0026033 | A1 | 1/2020 | Mercado | |
| 2020/0088972 | A1 | 3/2020 | Yoo et al. | |

FOREIGN PATENT DOCUMENTS

| | | | | |
|---|---|---|---|---|
| CN | 1882856 | A | 12/2006 | |
| CN | 100568043 | C | 12/2009 | |
| CN | 103620471 | A | 3/2014 | |
| CN | 103797396 | A | 5/2014 | |
| CN | 104898352 | A | 9/2015 | |
| CN | 105122129 | A | 12/2015 | |
| CN | 105659142 | A | 6/2016 | |
| CN | 106597650 | A | 4/2017 | |
| CN | 106597652 | A | 4/2017 | |
| CN | 110261997 | A | 9/2019 | |
| CN | 110879454 | A | 3/2020 | |
| CN | 110908071 | A | 3/2020 | |
| CN | 111308688 | A | 6/2020 | |
| JP | 6-347746 | A | 12/1994 | |
| JP | 11-115225 | A | 4/1999 | |
| JP | 2007-149934 | A | 6/2007 | |
| JP | 2014-202541 | A | 10/2014 | |
| JP | 2016095490 | A * | 5/2016 | ........... G02B 17/008 |
| TW | 200736657 | A | 10/2007 | |
| WO | WO 2014/072818 | A2 | 5/2014 | |
| WO | WO 2018/139280 | A1 | 8/2018 | |

OTHER PUBLICATIONS

Chinese Office Action dated Mar. 10, 2023, in counterpart Chinese Patent Application No. 202210463930.5 (14 pages in English, 10 pages in Chinese).

Chinese Office Action dated Dec. 12, 2022, in counterpart Chinese Patent Application No. 202210463930.5 (12 pages in English, 14 pages in Chinese).

Chinese Office Action dated Sep. 23, 2022, in counterpart Chinese Patent Application No. 202110794797.7 (15 pages in English, 14 pages in Chinese).

Indian Office Action dated Apr. 20, 2022, in counterpart Indian Patent Application No. 202114012797 (5 pages in English).

* cited by examiner

CAMERA MODULE

CROSS-REFERENCE TO RELATED APPLICATIONS

This application claims the benefit under 35 USC 119(a) of Korean Patent Application No. 10-2020-0131366 filed on Oct. 12, 2020, in the Korean Intellectual Property Office, the entire disclosure of which is incorporated herein by reference for all purposes.

BACKGROUND

1. Field

This application relates to a camera module in which a focus and a magnification may be adjusted and that may be mounted in a mobile terminal.

2. Description of Related Art

In a retractable optical imaging system in which a plurality of lenses are arranged in a row, as the number of lenses is increased, an overall length of the optical imaging system is increased. For example, it is more difficult to miniaturize an optical imaging system including five lenses than to miniaturize an optical imaging system including three lenses. Therefore, it may be difficult to mount a zoom camera module in which a focus and a magnification may be adjusted in a thin mobile terminal.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first lens group; a first optical path folding unit; a second lens group; and a second optical path folding unit, wherein the first lens group, the first optical path folding unit, the second lens group, and the second optical path folding unit are sequentially disposed from an object side of the first lens group toward an imaging plane of the camera module, the first optical path folding unit includes a first fixed reflective member and a first movable reflective member configured to vary a length of an optical path between the first lens group and the second lens group, and the second optical path folding unit includes a second fixed reflective member and a second movable reflective member configured to vary a length of an optical path between the second lens group and the imaging plane.

The first lens group may include a first lens having a refractive power; and a second lens having a refractive power.

An object-side surface of the first lens may be convex.

An image-side surface of the second lens may be concave.

The second lens group may include a third lens having a refractive power; a fourth lens having a refractive power; and a fifth lens having a refractive power.

An object-side surface of the third lens may be convex.

An object-side surface of the fourth lens may be convex.

An object-side surface of the fifth lens may be convex.

The camera module may further include a prism disposed before the object side of the first lens group.

The first movable reflective member and the second movable reflective member may be configured to move so that a distance between the first fixed reflective member and the first movable reflective member decreases as a distance between the second fixed reflective member and the second movable reflective member increases, and increases as the distance between the second fixed reflective member and the second movable reflective member decreases.

In another general aspect, a camera module includes a first lens group; a second lens group; a first optical path folding unit disposed between the first lens group and the second lens group; and a second optical path folding unit disposed between the second lens group and an imaging plane of the camera module, wherein an optical path of the camera module extends from an object side of the first lens group to the imaging plane, and the first optical path folding unit and the second optical path folding unit are configured to increase or decrease a length of at least one portion of the optical path of the camera module in a direction intersecting an optical axis of the first lens group.

The first lens group may include a first lens, the optical path of the camera module may extend from an object-side surface of the first lens to the imaging plane, and a ratio (TTL1/TTL2) of a maximum length (TTL1) of the optical path of the camera module to a minimum length (TTL2) of the optical path of the camera module may be 0.90 to 1.20.

The camera module may include an optical imaging system including the first lens group, the second lens group, the first optical path folding unit, and the second optical path folding unit, and a ratio (ft/fw) of a maximum focal length (ft) of the optical imaging system to a minimum focal length (fw) of the optical imaging system may be 1.8 to 2.2.

The first lens group may include a first lens, the optical path of the camera module may extend from an object-side surface of the first lens to the imaging plane, and a ratio (TTL2/ft) of a minimum length (TTL2) of the optical path of the camera module to the maximum focal length (ft) may be 2.0 to 4.0.

A ratio (ft/IMGHTt) of the maximum focal length (ft) to an image height (IMGHTt) of the optical imaging system at the maximum focal length (ft) equal to one half of a diagonal length of an effective area of the imaging plane at the maximum focal length (ft) may be 14 to 20.

The camera module may further include a prism disposed before an object side of the first lens group.

In another general aspect, a camera module includes a first lens group having an optical axis; a first optical path folding unit; a second lens group having an optical axis; and a second optical path folding unit, wherein the first lens group, the first optical path folding unit, the second lens group, and the second optical path folding unit are sequentially disposed from an object side of the first lens group toward an imaging plane of the camera module, the first optical path folding unit includes a first fixed reflective member; and a first movable reflective member configured to move in a direction intersecting the optical axis of the first lens group to vary a length of an optical path between the first lens group and the second lens group, and a second movable reflective member configured to move in a direction intersecting the optical axis of the second lens group to vary a length of an optical path between the second lens group and the imaging plane.

The first fixed reflective member may be disposed between the first lens group and the second lens group on a virtual straight line that is coaxial with the optical axis of the first lens group, the first movable reflective member may be disposed to face the first fixed reflective member in the direction intersecting the optical axis of the first lens group, the second fixed reflective member may be disposed between the second lens group and the imaging plane on a virtual straight line that is coaxial with the optical axis of the second lens group, and the second movable reflective member may be disposed to face the second fixed reflective member in the direction intersecting the optical axis of the second lens group.

The first movable reflective member may be configured to move away from the first fixed reflective member to decrease a magnification of the camera module, and move toward the first fixed reflective member to adjust a focus of the camera module, and the second movable reflective member may be configured to move away from the second fixed reflective member to increase the magnification of the camera module as the first movable reflective member moves toward the first fixed reflective member to adjust the focus of the camera module, and move toward the second fixed reflective member to adjust the focus of the camera module as the first movable reflective member moves away from the first fixed reflective member to decrease the magnification of the camera module.

The first lens group may include a first lens having a positive refractive power and a second lens having a negative refractive power sequentially disposed in ascending numerical order along the optical axis of the first lens group from the object side of the first lens group to an image side of the first lens group, and the second lens group may include a third lens having a refractive power, a fourth lens having a negative refractive power, and a fifth lens having a positive refractive power sequentially disposed in ascending numerical order along the optical axis of the second lens group from an object side of the second lens group to an image side of the second lens group.

In another general aspect, an electronic device includes the camera module described above.

The electronic device may further include either one or both of a camera module configured to perform short distance image capturing and a camera module configured to perform middle distance image capturing.

In another general aspect, a camera module includes a first lens group having an optical axis; a second lens group having an optical axis; a first optical path folding unit disposed between the first lens group and the second lens group; and a second optical path folding unit disposed between the second lens group and an imaging plane of the camera module, wherein an optical path of the camera module extends from an object side of the first lens group to an imaging plane of the camera module and includes first path portions formed by the first optical path folding unit and extending in a direction intersecting the optical axis of the first lens group; and second path portions formed by the second optical path folding unit and extending in a direction intersecting the optical axis of the second lens group, the first optical path folding unit is configured to increase or decrease respective lengths of the first path portions, and the second optical path folding unit is configured to increase or decrease respective lengths of the second path portions.

The first optical path folding unit may include a first fixed reflective member disposed between the first lens group and the second lens group on a virtual straight line that may be coaxial with the optical axis of the first lens group; and a first movable reflective member disposed on the first path portions, and the second optical path folding unit may include a second fixed reflective member disposed between the second lens group and the second lens group on a virtual straight line that may be coaxial with the optical axis of the second lens group; and a second movable reflective member disposed on the second path portions.

The first movable reflective member may be configured to increase the respective lengths of the first path portions to decrease a focal length of the camera module, and decrease the respective lengths of the first path portions to adjust a focus of the camera module, and the second movable reflective member may be configured to increase the respective lengths of the second path portions to increase the focal length of the camera module as the first movable reflective member decreases the respective lengths of the first path portions to adjust the focus of the camera module, and decrease the respective lengths of the second path portions to adjust the focus of the camera module as the first movable reflective member increases the respective lengths of the first path portions to decrease the focal length of the camera module.

The first lens group may include a first lens having a positive refractive power and a second lens having a negative refractive power sequentially disposed in ascending numerical order along the optical axis of the first lens group from the object side of the first lens group to an image side of the first lens group, and the second lens group may include a third lens having a refractive power, a fourth lens having a negative refractive power, and a fifth lens having a positive refractive power sequentially disposed in ascending numerical order along the optical axis of the second lens group from an object side of the second lens group to an image side of the second lens group.

In another general aspect, an electronic device includes the camera module described above.

The electronic device may further include either one or both of a camera module configured to perform short distance image capturing and a camera module configured to perform middle distance image capturing.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
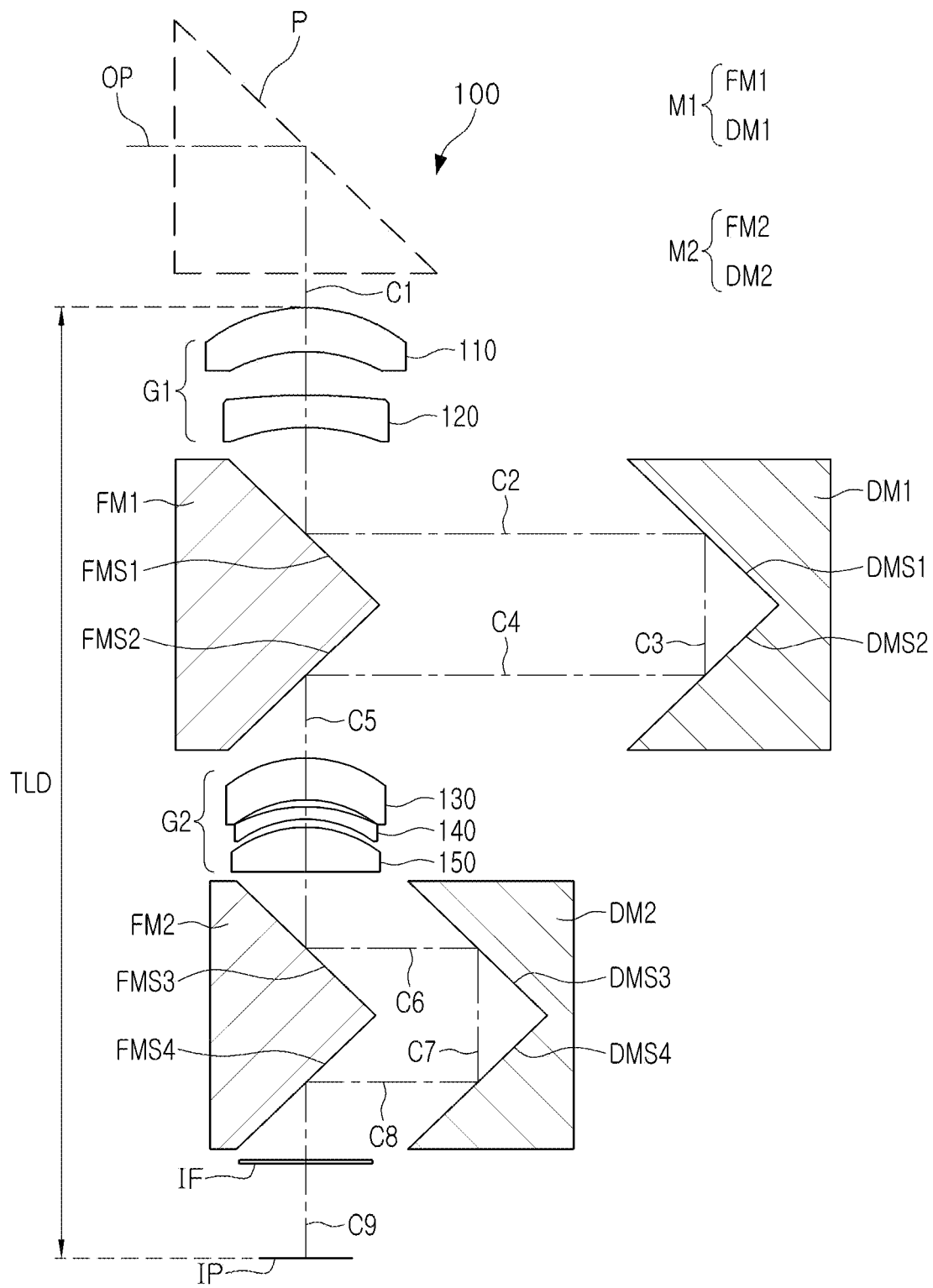
FIG. 1 is a diagram of a first example of a camera module in a first mode having a first magnification.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Furthermore, although the examples described herein have a variety of configurations, other configurations are possible as will be apparent after an understanding of the disclosure of this application.

Use herein of the term "may" in describing the various examples, e.g., as to what an example may include or implement, means that at least one example exists in which such a feature is included or implemented, but not all examples are limited thereto.

An optical imaging system of a camera module includes a plurality of lenses disposed along an optical axis. The plurality of lenses may be spaced apart from each other by predetermined distances along the optical axis.

For example, the optical imaging system includes a first lens, a second lens, a third lens, a fourth lens and a fifth lens sequentially disposed in ascending numerical order along an optical axis of the optical imaging system from an object side of the optical imaging system toward an imaging plane of the optical imaging system, with the first lens being closest to the object side of the optical imaging system and the fifth lens being closest to the imaging plane.

In each lens, an object-side surface is a surface of the lens closest to the object side of the optical imaging system, and an image-side surface is a surface of the lens closest to the imaging plane.

Unless stated otherwise, a reference to a shape of a lens surface refers to a shape of a paraxial region of the lens surface. A paraxial region of a lens surface is a central portion of the lens surface surrounding and including an optical axis of the lens surface in which light rays incident to the lens surface make a small angle $\theta$ to the optical axis, and the approximations $\sin \theta \approx \theta$, $\tan \theta \approx \theta$, and $\cos \theta \approx 1$ are valid.

For example, a statement that an object-side surface of a lens is convex means that at least a paraxial region of the object-side surface of the lens is convex, and a statement that an image-side surface of the lens is concave means that at least a paraxial region of the image-side surface of the lens is concave. Therefore, even though the object-side surface of the lens may be described as being convex, the entire object-side surface of the lens may not be convex, and a peripheral region of the object-side surface of the lens may be concave. Also, even though the image-side surface of the lens may be described as being concave, the entire image-side surface of the lens may not be concave, and a peripheral region of the image-side surface of the lens may be convex.

TLD is a distance from an object-side surface of the first lens to the imaging plane with folded portions of an optical path from the object-side surface of the first lens to the imaging plane formed by optical path folding units replaced by straight-line optical paths. Thus, TLD is a distance from the object-side surface of the first lens to the imaging plane with the optical path folding units removed.

TTL1 is a length of the optical path of the optical imaging system from the object-side surface of the first lens to the imaging plane in a first mode including the folded portions of the optical path formed by the optical path folding units.

TTL2 is a length of the optical path from the object-side surface of the first lens to the imaging plane in a second mode including the folded portions of the optical path formed by the optical path folding units.

f1, f2, f3, f4, and f5 are respective focal lengths of the first to fifth lenses, fw is a minimum focal length of the optical imaging system in the first mode, and ft is a maximum focal length of the optical imaging system in the second mode.

IMGHT is a maximum effective image height of the optical imaging system and is equal to one half of a diagonal length of a maximum effective imaging area of an imaging surface of an image sensor, wherein the imaging surface is disposed at the imaging plane. Stated another way, IMGHT is equal to one half of a maximum effective area of the imaging plane corresponding to the maximum effective imaging area of the imaging surface of the image sensor. IMGHT may change as the focal length of the optical imaging system changes.

IMGHTw is a maximum effective image height of the optical imaging system at the minimum focal length fw of the optical imaging system in the first mode, and IMGHTt is a maximum effective image height of the optical imaging system at the maximum focal length ft of the optical imaging system in the second mode.

Fno is an f-number of the optical imaging system, and is equal to the focal length fw or ft of the optical imaging system divided by an entrance pupil diameter of the optical imaging system corresponding to the focal length fw or ft.

Radiuses of curvature of the surfaces of the lenses, thickness of the lenses and the other elements, distances between adjacent ones of the lenses and the other elements, the respective focal lengths f1, f2, f3, f4, and f5 of the first to fifth lenses, the minimum and maximum focal lengths fw and ft of the optical imaging system, TLD, TTL1, TTL2, IMGHT, IMGHTw, and IMGHTt are expressed in millimeters (mm), although other units of measurement may be used. Fno, refractive indexes of the lenses, and Abbe numbers of the lenses are dimensionless quantities.

The thicknesses of the lenses and the other elements, the distances between the adjacent ones of the lenses and the other elements, TLD, TTL1, and TTL2 are measured along the optical axis of the optical imaging system.

This application discloses a camera module that may be mounted in a mobile terminal. For example, the camera module may be mounted in a small portable electronic device such as a smartphone, a laptop computer, or a personal digital assistant (PDA). However, the camera module is not limited to being mounted in these electronic devices. For example, the camera module may be mounted on a monitor for image communication.

The camera module may be configured to enable it to be miniaturized. For example, an overall size of the camera module may be reduced by folding an optical path of the camera module extending from an object-side surface of a first lens of the camera module to an imaging plane of the camera module. A plurality of portions of the optical path of the camera module may extend in a direction intersecting a length direction of the camera module. Therefore, a distance (TLD) from the object-side surface of the first lens to the imaging plane with folded portions of the optical path of the camera module extending from the object-side surface of the first lens to the imaging plane formed by optical path folding units replaced by straight-line optical paths may be smaller than a length (TTL1 and TTL2) of the optical path of the camera module extending from the object-side surface of the first lens to the imaging plane including the folded portions of the optical path of the camera module extending from the object-side surface of the first lens to the imaging plane formed by the optical path folding units. TTL1 is a length of the optical path of the camera module in a first mode, and TTL2 is a length of the optical path of the camera module in a second mode. Thus, TLD is a distance from the object-side surface of the first lens to the imaging plane with the optical path folding units removed.

The camera module may include a first lens group, a second lens group, a first optical path folding unit, and a second optical path folding unit. However, the camera module is not limited to only these components. For example, the camera module may further include a stop controlling an amount of light passing through an optical imaging system of the camera module. In addition, the camera module may further include an infrared cut-off filter filtering infrared light. Furthermore, the camera module may further include an image sensor (that is, an imaging device) having an imaging surface disposed at the imaging plane of the camera module. The image sensor converts an image of a subject formed on an effective imaging area of the imaging surface by the optical imaging system into an electrical signal. Furthermore, the camera module may further include at least one gap maintaining member maintaining a predetermined distance between two lenses. In addition, the camera module may further include a member configured to fold or refract an optical path before the first lens group. For example, the camera module may include a prism. The prism may be disposed on an object side of the first lens group. The prism may be made of a material having a substantially high refractive index. For example, the refractive index of the prism may be greater than or equal to 1.7 and less than 2.0.

The camera module may have adjustable focal length and an adjustable magnification. For example, in the camera module, a magnification may be adjusted by changing a length of an optical path between the first lens group and the second lens group and a length of an optical path between the second lens group and the imaging plane. At least one portion of the optical path between the first lens group and the second lens group may extend in a direction intersecting an optical axis of the first lens group, and at least one portion of the optical path between the second lens group and the imaging plane may extend in a direction intersecting an optical axis of the second lens group. A virtual straight line may connect the optical axis of the first lens group to the optical axis of the second lens group. In other words, the optical axis of the second lens group may be coaxial with the optical axis of the first lens group.

An example of a camera module may include a plurality of lens groups and a plurality of optical path folding units. For example, the camera module may include a first lens group, a second lens group, a first optical path folding unit, and a second optical path folding unit. The first lens group, the first optical path folding unit, the second lens group, and the second optical path folding unit may be sequentially disposed along an optical path of the camera module extending from an object side of the first lens group to an imaging plane of the camera module. For example, the first optical path folding unit may be disposed between the first lens group and the second lens group, and the second optical path folding unit may be disposed between the second lens group and the imaging plane. Each of the first optical path folding unit and the second optical path folding unit may vary a length of a respective optical path. For example, the first optical path folding unit may vary a length of an optical path between the first lens group and the second lens group, and the second optical path folding unit may vary a length of an optical path between the second lens group and the imaging plane. Each of the first optical path folding unit and the second optical path folding unit may include a reflection mirror, a prism, or any other optical element capable of folding an optical path.

The first optical path folding unit may include a first fixed reflective member and a first movable reflective member. The first fixed reflective member may be disposed between the first lens group and the second lens group to fold a straight-line optical path between the first lens group and the second lens group. For example, the first fixed reflective member may reflect light emitted from the first lens group in a direction intersecting an optical axis of the first lens group. The first fixed reflective member may include a plurality of reflective surfaces. For example, the first fixed reflective member may include a first fixed reflective surface reflecting the light emitted from the first lens group to the first movable reflective member, and a second fixed reflective surface reflecting light emitted from the first movable reflective member to the second lens group. The first movable reflective member may vary the length of the optical path between the first lens group and the second lens group. For example, the first movable reflective member may move to be near to the first fixed reflective member or move to be far from the first fixed reflective member to vary the length of the optical path between the first lens group and the second lens group. The first movable reflective member may include a plurality of reflective surfaces. For example, the first movable reflective member may include a first movable reflective surface and a second movable reflective surface. The first movable reflective member may reflect the light reflected by the first fixed reflective surface to the second movable reflective surface, and the second movable reflective surface may reflect the light reflected by the first movable reflective surface to the second fixed reflective surface.

The second optical path folding unit may include a second fixed reflective member and a second movable reflective member. The second fixed reflective member may be disposed between the second lens group and the imaging plane to fold a straight-line optical path between the second lens group and the imaging plane. For example, the second fixed reflective member may reflect light emitted from the second lens group in a direction intersecting an optical axis of the second lens group. The second fixed reflective member may include a plurality of reflective surfaces. For example, the second fixed reflective member may include a third fixed reflective surface reflecting the light emitted from the second lens group to the second movable reflective member, and a fourth fixed reflective surface reflecting light emitted from the second movable reflective member to the imaging plane. However, the second fixed reflective member does not necessarily include a plurality of reflective surfaces. For example, the fourth fixed reflective surface may be omitted if desired. The second movable reflective member may vary the length of the optical path between the second lens group and the imaging plane. For example, the second movable reflective member may move to be near to the second fixed reflective member or move to be far from the second fixed reflective member to vary the length of the optical path between the second lens group and the imaging plane. The second movable reflective member may include a plurality of reflective surfaces. For example, the second movable reflective member may include a third movable reflective surface and a fourth movable reflective surface. The third movable reflective surface may reflect the light reflected by the third fixed reflective surface to the fourth movable reflective surface, and the fourth movable reflective surface may reflect the light reflected by the third movable reflective surface to the fourth fixed reflective surface, or to the imaging plane if the fourth reflective surface is omitted.

A distance between the first fixed reflective member and the first movable reflective member may have a predetermined relationship with a distance between the second fixed reflective member and the second movable reflective member. For example, when the distance between the second fixed reflective member and the second movable reflective member decreases, the distance between the first fixed reflective member and the first movable reflective member may increase. Conversely, when the distance between the second fixed reflective member and the second movable reflective member increases, the distance between the first fixed reflective member and the first movable reflective member may decrease.

The first lens group may include a plurality of lenses. For example, the first lens group may include a first lens having a refractive power and a second lens having a refractive power. The first lens and the second lens may have respective shapes. For example, the first lens may have a shape in which an object-side surface thereof is convex, and the second lens may have a shape in which an image-side surface thereof is concave. The first lens and the second lens may have refractive powers having different signs. For example, the first lens may have a positive refractive power, and the second lens may have a negative refractive power.

The second lens group may include a plurality of lenses. For example, the second lens group may include a third lens having a refractive power, a fourth lens having a refractive power, and a fifth lens having a refractive power. The third to fifth lenses may have respective shapes. For example, the third lens may have a shape in which an object-side surface thereof is convex, the fourth lens may have a shape in which an object-side surface thereof is convex, and the fifth lens may have a shape in which an object-side surface thereof is convex. One lens of the third to fifth lenses may have a refractive power having a sign that is different from signs of refractive powers of the other two lenses of the third to fifth lenses. For example, the fourth lens may have a refractive power having a sign that is different from signs of refractive powers of the third lens and the fifth lens. For example, the fourth lens may have a negative refractive power, and the third and fifth lenses may have a positive refractive power. Alternatively, the fifth lens may have a refractive power having a sign that is different from signs of refractive powers of the third and fourth lenses. For example, the fifth lens may have a positive refractive power, and the third and fourth lenses may have a negative refractive power.

The camera module may further include another optical path folding unit. For example, the camera module may further include a prism disposed on an object side of the first lens group.

Another example of a camera module may include a plurality of lens groups and a plurality of optical path folding units. For example, the camera module may include a first lens group, a second lens group, a first optical path folding unit, and a second optical path folding unit. The first optical path folding unit may be disposed between the first lens group and the second lens group, and the second optical path folding unit may be disposed between the second lens group and an imaging plane of the camera module.

Each optical path folding unit may be configured to form an optical path in a direction intersecting an optical axis of a corresponding lens group. For example, the first optical path folding unit may form an optical path in a direction intersecting an optical axis of the first lens group, and the second optical path folding unit may form an optical path in a direction intersecting an optical axis of the second lens group. Each optical path folding unit may vary a length of a corresponding optical path. For example, the first optical path folding unit may increase or decrease a length of an optical path between the first lens group and the second lens group, and the second optical path folding unit may increase or decrease a length of an optical path between the second lens group and the imaging plane.

In the camera module, a length of an optical path from an object-side surface of a first lens of the first lens group to the imaging plane may be varied by the first and second optical path folding units. A maximum length (TTL1) of the optical path from the object-side surface of the first lens to the imaging plane and a minimum length (TTL2) of the optical path from the object-side surface of the first lens to the imaging plane may satisfy a predetermined condition. For example, a ratio (TTL1/TTL2) of the maximum distance (TTL1) of the optical path from the object-side surface of the first lens to the imaging plane to the minimum distance (TTL2) of the optical path from the object-side surface of the first lens to the imaging plane may be 0.90 to 1.20.

The camera module may have a variable focal length. For example, an optical imaging system of the camera module may have a maximum focal length (ft) capable of capturing an image at a relatively long distance and a minimum focal length (fw) capable of capturing an image at a relatively short distance according to positions of the first and second optical path folding units. The maximum focal length (ft) and the minimum focal length (fw) of the optical imaging system may satisfy a predetermined condition. For example, a ratio (ft/fw) of the maximum focal length (ft) of the optical imaging system to the minimum focal length (fw) of the optical imaging system may be 1.8 to 2.2.

The maximum focal length (ft) of the optical imaging system and the minimum distance (TTL2) of the optical path from the object-side surface of the first lens to the imaging plane may satisfy a predetermined condition. For example, a ratio (TTL2/ft) of the minimum distance (TTL2) of the optical path from the object-side surface of the first lens to the imaging plane to the maximum focal length (ft) of the optical imaging system may be 2.0 to 4.0.

The maximum focal length (ft) of the optical imaging system and an image height (IMGHTt) of the optical imaging system at the maximum focal length (ft) may satisfy a predetermined condition. The image height (IMGHTt) is a maximum effective image height of the optical imaging system at the maximum focal length (ft), and is equal to one half of a diagonal length of a maximum effective imaging area of the imaging surface of the image sensor at the maximum focal length (ft). For example, a ratio (ft/IMGHTt) of the maximum focal length (ft) of the optical imaging system to the image height (IMGHTt) of the optical imaging system at the maximum focal length (ft) may be 14 to 20.

The camera module may further include another optical path folding unit. For example, the camera module may further include a prism disposed on an object side of the first lens group.

Hereinafter, an optical imaging system of the camera module will be described.

The optical imaging system may include a first lens group and a second lens group. The first lens group may include a first lens and a second lens, and the second lens group may include a third lens, a fourth lens, and a fifth lens. The first to fifth lenses may be sequentially disposed along an optical path from an object side of the first lens to an imaging plane of the optical imaging system. For example, the first lens may be disposed closest to an object, and the fifth lens may be disposed closest to the imaging plane. For reference, an arrangement order of the lenses is determined on the basis of the optical axis passing through the lenses, and may thus be different from physical positions of the lenses.

The first lens may have a refractive power. For example, the first lens may have a positive refractive power. One surface of the first lens may be convex, and the other surface thereof may be concave. For example, an object-side surface of the first lens may be convex, and an image-side surface thereof may be concave. The first lens may have at least one aspherical surface. For example, both of the object-side surface and an image-side surface of the first lens may be aspherical. The first lens may have a predetermined refractive index. For example, the refractive index of the first lens may be greater than or equal to 1.55 and less than 1.7. The first lens may have a predetermined focal length. For example, the focal length of the first lens may be greater than or equal to 38 mm and less than 300 mm.

The second lens may have a refractive power. For example, the second lens may have a negative refractive power. One surface of the second lens may be concave. For example, an image-side surface of the second lens may be concave. However, the concave shape of the second lens is not limited to the image-side surface. For example, an object-side surface or an object-side surface and the image-side surface of the second lens may be concave. The second lens may have at least one aspherical surface. For example, the object-side surface and the image-side surface of the second lens may be aspherical. The second lens may have a refractive index less than that of the first lens. For example, the refractive index of the second lens may be greater than or equal to 1.5 or and less than 1.6. The second lens may have a predetermined focal length. For example, the focal length of the second lens may be greater than or equal to −40 mm and less than −10 mm.

The third lens may have a refractive power. For example, the third lens may have a positive refractive power or a negative refractive power. One surface of the third lens may be concave. For example, an image-side surface of the third lens may be concave. The third lens may have at least one aspherical surface. For example, an object-side surface and the image-side surface of the third lens may be aspherical. The third lens may have a refractive index less than that of the first lens. For example, the refractive index of the third lens may be greater than or equal to 1.50 and less than 1.58. The third lens may have a predetermined focal length. For example, the focal length of the third lens having the positive refractive power may be greater than or equal to 300 mm and less than 5000 mm, and the focal length of the third lens having the negative refractive power may be greater than or equal to −4000 mm and less than −100 mm.

The fourth lens may have a refractive power. For example, the fourth lens may have a negative refractive power. One surface of the fourth lens may be convex. For example, an object-side surface of the fourth lens may be convex. The fourth lens may have at least one aspherical surface. For example, the object-side surface and an image-side surface of the fourth lens may be aspherical. The fourth lens may have a refractive index higher than that of the third lens. For example, the refractive index of the fourth lens may be greater than or equal to 1.58 and less than 1.70. The fourth lens may have a predetermined focal length. For example, the focal length of the fourth lens may be greater than or equal to −40 mm and less than −10 mm.

The fifth lens may have a refractive power. For example, the fifth lens may have a positive refractive power. One surface of the fifth lens may be convex. For example, an object-side surface of the fifth lens may be convex. The fifth lens may have at least one aspherical surface. For example, the object-side surface and an image-side surface of the fifth lens may be aspherical. The fifth lens may have a refractive index less than that of the fourth lens. For example, the refractive index of the fifth lens may be greater than or equal to 1.50 and less than 1.58. The fifth lens may have a predetermined focal length. For example, the focal length of the fifth lens may be greater than or equal to 8.0 mm and less than 20 mm.

The first to fifth lenses may be made of materials having a refractive index greater than 1.0. For example, the first to fifth lenses may be made of plastic or glass.

Each of the first to fifth lenses may have at least one aspherical surface as described above. Each aspherical surface of the first to fifth lenses may be represented by Equation 1 below.

$$Z = \frac{cr^2}{1 + \sqrt{1 - (1+k)c^2r^2}} + Ar^4 + Br^6 + Cr^8 + Dr^{10} + Er^{12} + Fr^{14} + Gr^{16} + Hr^{18} + Jr^{20} + \ldots \quad (1)$$

In Equation 1, c is a curvature of a lens surface and is equal to a reciprocal of a radius of curvature of the lens surface at an optical axis of the lens surface, k is a conic constant, r is a distance from any point on the lens surface to the optical axis of the lens surface in a direction perpendicular to the optical axis of the lens surface, A to H and J are aspheric constants, and Z (also known as sag) is a distance in a direction parallel to the optical axis of the lens surface from the point on the lens surface at the distance r from the optical axis of the lens surface to a tangential plane perpendicular to the optical axis and intersecting a vertex of the lens surface.

Although it has been described above that both the object-side surface and the image-side surface of each one of the first to fifth lenses may be aspherical, either one or both of the object-side surface and the image-side surface of any one or any combination of any two or more of the first to fifth lenses may be spherical if desired. For example, both the object-side surface and the image-side surface of each one of the first to fifth lenses may be spherical, and none of them may be aspherical.

The camera module or the optical imaging system of the camera module may have predetermined numerical conditions. For example, the camera module or the optical imaging system of the camera module may satisfy one or more of the following Conditional Expressions 1 to 13:

| | |
|---|---|
| $0.1 < fw/f1 < 1.2$ | (Conditional Expression 1) |
| $-1.0 < fw/f3 < 1.0$ | (Conditional Expression 2) |
| $-2.0 < fw/f4 < -0.7$ | (Conditional Expression 3) |
| $1.0 < fw/f5 < 3.4$ | (Conditional Expression 4) |
| $0.90 \leq TTL1/TTL2 \leq 1.20$ | (Conditional Expression 5) |
| $1.8 \leq ft/fw \leq 2.2$ | (Conditional Expression 6) |
| $2.0 \leq TTL2/ft \leq 4.0$ | (Conditional Expression 7) |
| $14 \leq ft/IMGHTt \leq 20$ | (Conditional Expression 8) |
| $4.0 < TTL1/fw < 12$ | (Conditional Expression 9) |
| $40 < TTL1/IMGHTw < 50$ | (Conditional Expression 10) |
| $7.0 < fw/IMGHTw < 10$ | (Conditional Expression 11) |
| $0.4 < TLD/TTL1 < 0.6$ | (Conditional Expression 12) |
| $1.0 < TLD/fw < 2.0$ | (Conditional Expression 13) |

Figure 2:
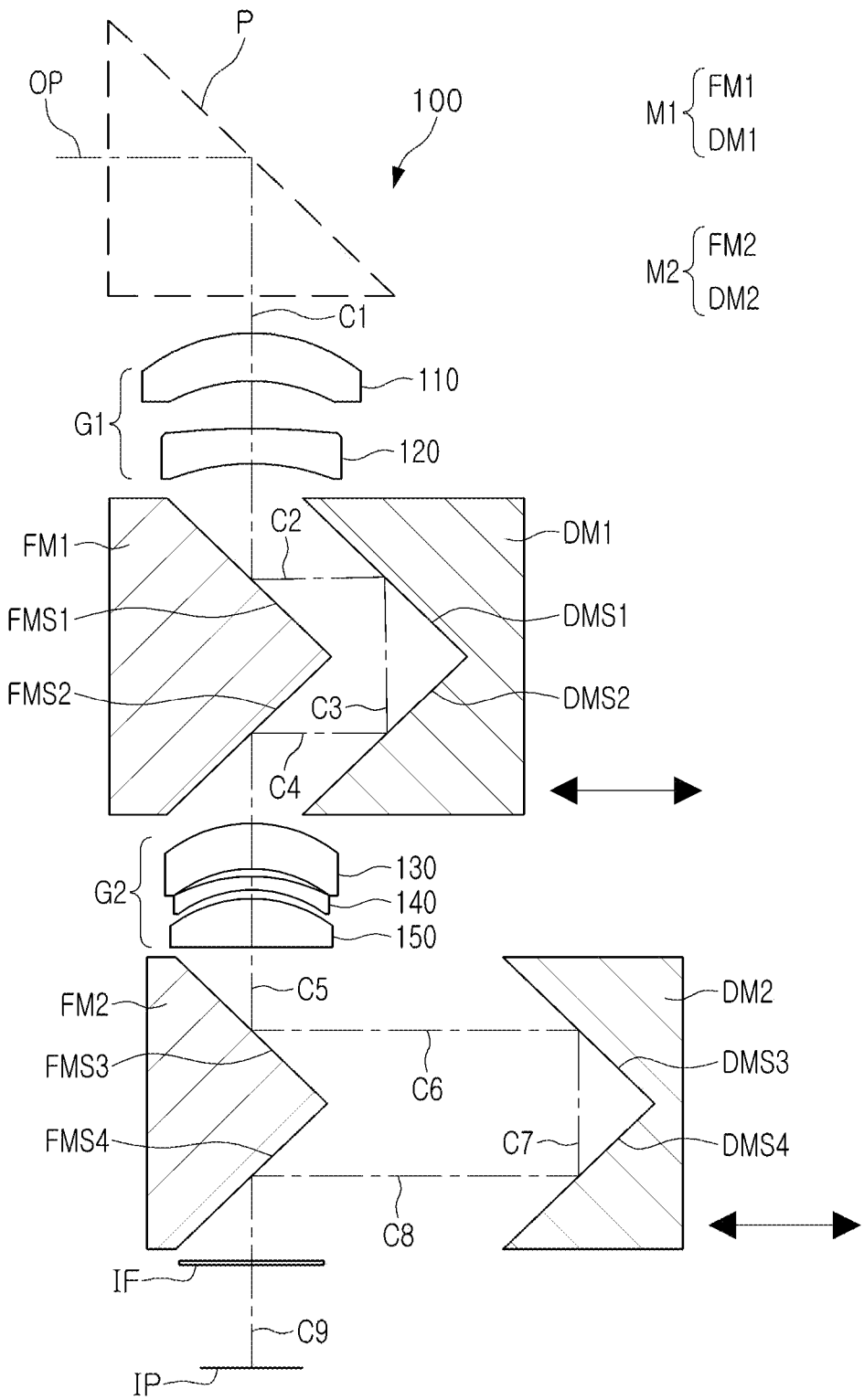
FIG. 2 is a diagram of the first example of the camera module in a second mode having a second magnification greater than the first magnification.
Figure 3:
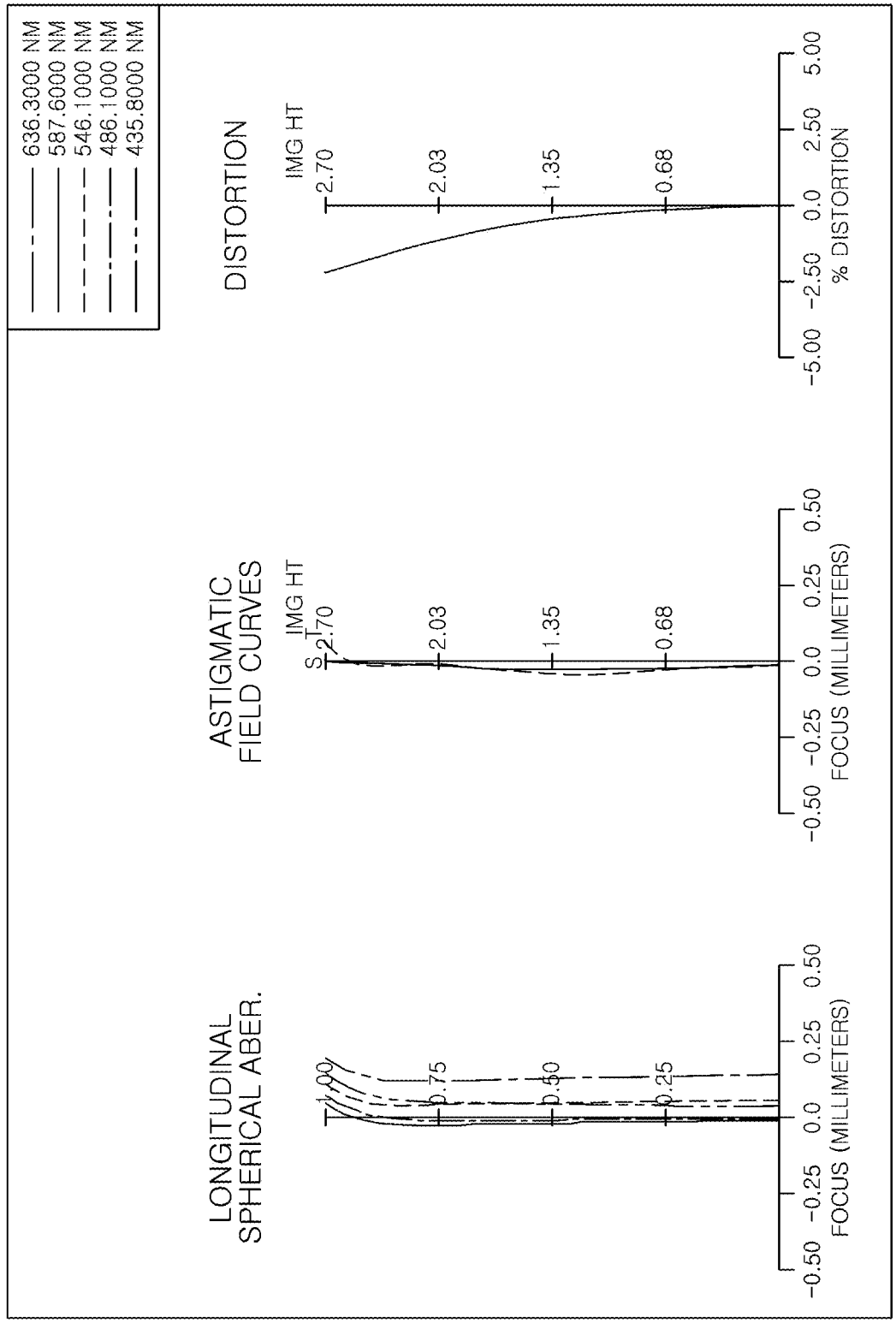
FIG. 3 shows curves representing aberration characteristics of the first example of the camera module in the first mode illustrated in FIG. 1.
Figure 4:
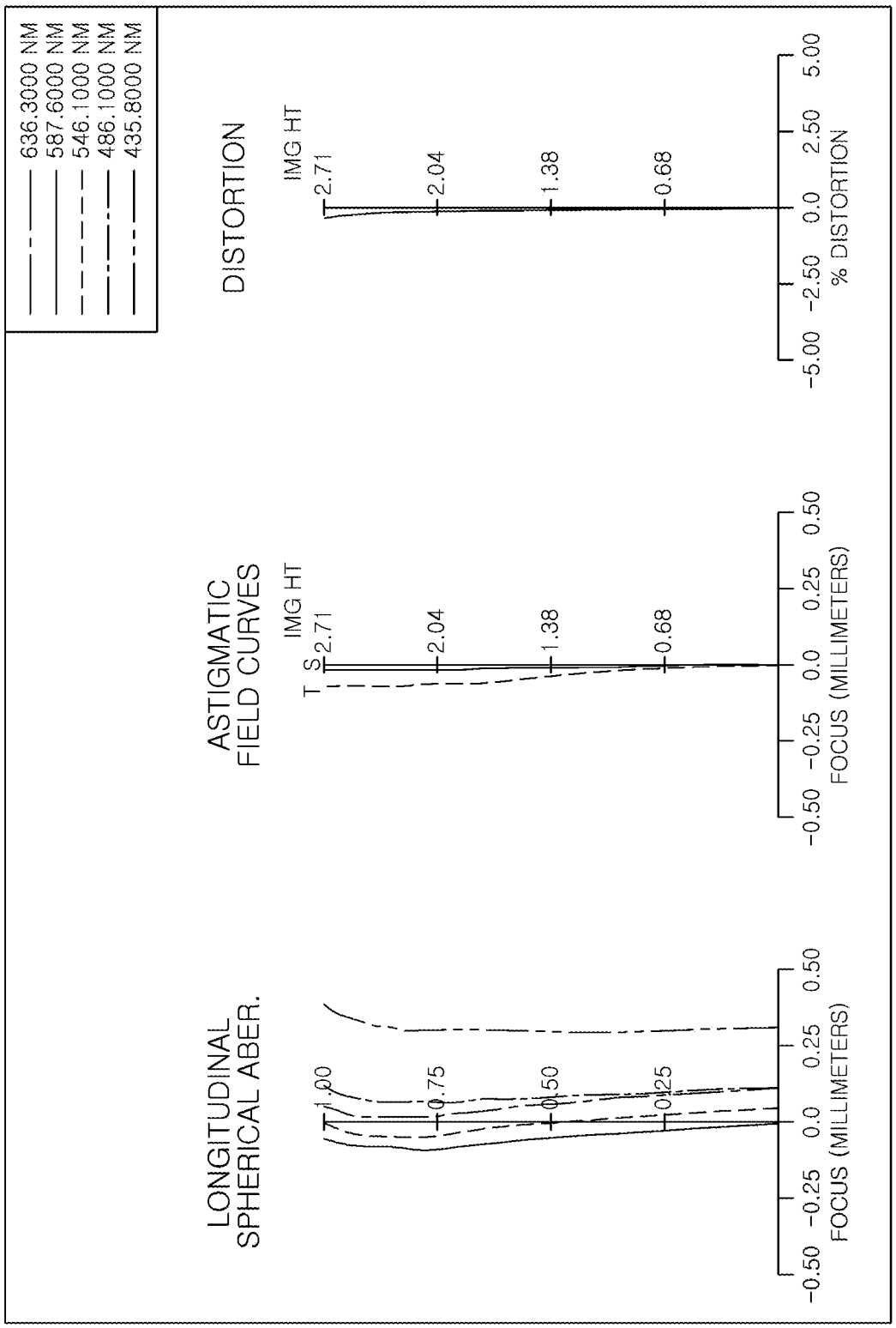
FIG. 4 shows curves representing aberration characteristics of the first example of the camera module in the second mode illustrated in FIG. 2.

FIG. 1 is a diagram of a first example of a camera module in a first mode having a first magnification, FIG. 2 is a diagram of the first example of the camera module in a second mode having a second magnification greater than the first magnification, FIG. 3 shows curves representing aberration characteristics of the first example of the camera module in the first mode illustrated in FIG. 1, and FIG. 4 shows curves representing aberration characteristics of the first example of the camera module in the second mode illustrated in FIG. 2.

Referring to FIGS. 1 and 2, a camera module 100 may include a prism P, a first lens group G1, a second lens group G2, a first optical path folding unit M1, a second optical path folding unit M2, a filter IF, and an image sensor IP having an imaging surface disposed at an imaging plane of the camera module 100.

The prism P may be disposed in an opening of the camera module 100. The prism P may convert a path of light incident from one side of the camera module 100 into a length direction of the camera module 100. For example, a path OP of light reflected from an object may be changed into a first optical axis C1 direction by the prism P. The first optical axis C1 is an optical axis of the first lens group G1.

The first lens group G1 may be disposed on an image side of the prism P and may include a first lens 110 and a second lens 120. The first lens 110 may have a positive refractive power, and an object-side surface thereof may be convex while an image-side surface thereof may be concave. The second lens 120 may have a negative refractive power, and an object-side surface thereof may be convex while an image-side surface thereof may be concave.

The second lens group G2 may be disposed on an image side of the first lens group G1 and may include a third lens 130, a fourth lens 140, and a fifth lens 150. The third lens 130 may have a negative refractive power, and an object-side surface thereof may be convex while an image-side surface thereof may be concave. The fourth lens 140 may have a negative refractive power, and an object-side surface thereof may be convex while an image-side surface thereof may be concave. The fifth lens 150 may have a positive refractive power, and an object-side surface thereof may be convex while an image-side surface thereof may be concave.

The first optical path folding unit M1 may be disposed between the first lens group G1 and the second lens group G2. The first optical path folding unit M1 may include a first fixed reflective member FM1 and a first movable reflective member DM1.

The first fixed reflective member FM1 may be disposed between the first lens group G1 and the second lens group G2. In detail, the first fixed reflective member FM1 may be disposed on a virtual straight line connecting the first optical axis C1 of the first lens group G1 to a fifth optical axis C5 of the second lens group G2. In other words, the fifth optical axis C5 of the second lens group may be coaxial with the first optical axis C1 of the first lens group. The first fixed reflective member FM1 may include a plurality of reflective surfaces. For example, the first fixed reflective member FM1 may include a first fixed reflective surface FMS1 and a second fixed reflective surface FMS2. The first fixed reflective surface FMS1 may reflect light emitted from the second lens 120 in a direction intersecting the first optical axis C1. For example, the first fixed reflective surface FMS1 may reflect light incident along the first optical axis C1 in a second optical axis C2 direction intersecting the first optical axis C1. The second fixed reflective surface FMS2 may reflect light emitted from the first movable reflective member DM1 to the second lens group G2. For example, the second fixed reflective surface FMS2 may reflect light incident along a fourth optical axis C4 in the fifth optical axis C5 direction intersecting the fourth optical axis C4.

The first movable reflective member DM1 may be disposed on one side of the first fixed reflective member FM1. For example, the first movable reflective member DM1 may be disposed on the second optical axis C2 and the fourth optical axis C4. The first movable reflective member DM1 may move along the second optical axis C2 and the fourth optical axis C4. For example, the first movable reflective member DM1 may be moved to be near to the first fixed reflective member FM1 or be moved to be far from the first fixed reflective member FM1 by a first driving unit. The first movable reflective member DM1 may include a plurality of reflective surfaces. For example, the first movable reflective member DM1 may include a first movable reflective surface DMS1 and a second movable reflective surface DMS2. The first movable reflective surface DMS1 may reflect light incident along the second optical axis C2 in a third optical axis C3 direction, and the second movable reflective surface DMS2 may reflect light incident along the third optical axis C3 in the fourth optical axis C4 direction to the second fixed reflective surface FMS2. The first movable reflective member DM1 may increase or decrease a length of an optical path connecting the first lens group G1 and the second lens group G2 to each other along the first optical axis C1, the second optical axis C2, the third optical axis C3, the fourth optical axis C4, and the fifth optical axis C5. For example, the length of the optical path connecting the first lens group G1 and the second lens group G2 to each other may decrease as the first movable reflective member DM1 moves closer to the first fixed reflective member FM1, and may increase as the first movable reflective member DM1 moves farther from the first fixed reflective member FM1.

The first optical path folding unit M1 configured as described above may bypass a portion of a straight-line optical path connecting the first lens group G1 and the second lens group G2 to each other. In addition, the first optical path folding unit M1 may increase or decrease the length of the optical path connecting the first lens group G1 and the second lens group G2 to each other as described above. Therefore, in the camera module 100, a focus and a magnification may be adjusted through the first optical path folding unit M1.

The second optical path folding unit M2 is disposed between the second lens group G2 and the image sensor IP. The second optical path folding unit M2 may include a second fixed reflective member FM2 and a second movable reflective member DM2.

The second fixed reflective member FM2 may be disposed on a virtual straight line connecting the fifth optical axis C5 of the second lens group G2 to a ninth optical axis C9 of the image sensor IP. In other words, the ninth optical axis C9 of the image sensor IP may be coaxial with the fifth optical axis C5 of the second lens group G2. The second fixed reflective member FM2 may include a plurality of reflective surfaces. For example, the second fixed reflective member FM2 may include a third fixed reflective surface FMS3 and a fourth fixed reflective surface FMS4. The third fixed reflective surface FMS3 may reflect light emitted from the fifth lens 150 in a direction intersecting the fifth optical axis C5. For example, the third fixed reflective surface FMS3 may reflect light incident along the fifth optical axis C5 in a sixth optical axis C6 direction intersecting the fifth optical axis C5. The fourth fixed reflective surface FMS4 may reflect light emitted from the second movable reflective member DM2 to the image sensor IP. For example, the fourth fixed reflective surface FMS4 may reflect light incident along an eighth optical axis C8 in the ninth optical axis C9 direction intersecting the eighth optical axis C8.

The second movable reflective member DM2 may be disposed on one side of the second fixed reflective member FM2. For example, the second movable reflective member DM2 may be disposed on the sixth optical axis C6 and the eighth optical axis C8. The second movable reflective member DM2 may move along the sixth optical axis C6 and the eighth optical axis C8. For example, the second movable reflective member DM2 may be moved to be near to the second fixed reflective member FM2 or be moved to be far from the second fixed reflective member FM2 by a second driving unit. The second movable reflective member DM2 may include a plurality of reflective surfaces. For example, the second movable reflective member DM2 may include a third movable reflective surface DMS3 and a fourth movable reflective surface DMS4. The third movable reflective surface DMS3 may reflect light incident along the sixth optical axis C6 in a seventh optical axis C7 direction, and the fourth movable reflective surface DMS4 may reflect light incident along the seventh optical axis C7 in the eighth optical axis direction C8 to the fourth fixed reflective surface FMS4. The second movable reflective member DM2 may increase or decrease a length of an optical path connecting the second lens group G2 and the image sensor IP to each other along the fifth optical axis C5, the sixth optical axis C6, the seventh optical axis C7, the eighth optical axis C8, and the ninth optical axis C9. For example, the length of the optical path connecting the second lens group G2 and the image sensor IP to each other may decrease as the second movable reflective member DM2 moves closer to the second fixed reflective member FM2, and may increase as the second movable reflective member DM2 moves farther from the second fixed reflective member FM2.

The second optical path folding unit M2 configured as described above may bypass a portion of a straight-line optical path connecting the second lens group G2 and the image sensor IP to each other. In addition, the second optical path folding unit M2 may increase or decrease the length of the optical path connecting the second lens group G2 and the image sensor IP to each other as described above. Therefore, in the camera module 100, a focus and a magnification may be adjusted through the second optical path folding unit M2.

The filter IF may be disposed on an object side of the image sensor IP. The filter IF may filter light of a specific range of wavelengths included in incident light. For example, the filter IF may be configured to filter infrared rays.

The image sensor IP may be configured to convert an incident optical image into an electric signal. The image sensor IP may include a plurality of optical sensors. The image sensor IP can be manufactured in a charge-coupled device (CCD) form. However, a form of the image sensor IP is not limited to the CCD form.

The camera module 100 may perform image capturing in two modes. For example, the camera module 100 may have a first mode of capturing an image of a subject located at a middle distance, and a second mode of capturing an image of a subject located at a long distance. Alternatively, the camera module 100 may have a first mode of magnifying a subject at a first magnification and capturing an image of the magnified subject at the first magnification, and a second mode of magnifying a subject at a second magnification greater than the first magnification and capturing an image of the magnified subject at the second magnification. However, an image capturing mode of the camera module 100 is not limited to two modes. For example, the camera module 100 may also perform image capturing during an operation in which the first mode is switched to the second mode or an operation in which the second mode is switched to the first mode, as well as in the first and second modes.

First, the first mode of the camera module 100 will be described with reference to FIG. 1.

The first mode of the camera module 100 may be a mode in which the length of the optical path between the first lens group G1 and the second lens group G2 is increased by as much as possible. For example, in the first mode, the length of the optical path between the first lens group G1 and the second lens group G2 may be increased by as much as possible by increasing a distance between the first fixed reflective member FM1 and the first movable reflective member DM1. In addition, in the first mode, a focus of the camera module 100 may be adjusted while decreasing a distance between the second fixed reflective member FM2 and the second movable reflective member DM2. The camera module 100 in the first mode may capture an image of the subject located at a middle distance, or may magnify the subject at the first magnification and capture an image of the magnified subject at the first magnification, as described above.

FIG. 3 shows curves representing aberration characteristics of the camera module 100 in the first mode illustrated in FIG. 1.

Next, the second mode of the camera module 100 will be described with reference to FIG. 2.

The second mode of the camera module 100 may be a mode in which the length of the optical path between the second lens group G2 and the image sensor IP is increased by as much as possible. For example, in the second mode, the length of the optical path between the second lens group G2 and the image sensor IP may be increased by as much as possible by increasing a distance between the second fixed reflective member FM2 and the second movable reflective member DM2. In addition, in the second mode, a focus of the camera module 100 may be adjusted while decreasing the distance between the first fixed reflective member FM1 and the first movable reflective member DM1. The camera module 100 in the second mode may capture an image of the subject located at a long distance, or may magnify the subject at the second magnification greater than the first magnification and capture an image of the magnified subject at the second magnification, as described above.

FIG. 4 shows curves representing aberration characteristics of the camera module 100 in the second mode illustrated in FIG. 2.

The camera module 100 configured as described above may capture images of the subjects located at a middle distance and a long distance, or may magnify the subjects at a plurality of magnifications and capture images of the magnified subjects at the plurality of magnifications, through the plurality of optical path folding units M1 and M2. Furthermore, in the camera module 100, a folded optical path may be formed inside the camera module 100 as illustrated in FIGS. 1 and 2, and the camera module 100 may thus be miniaturized.

Table 1 below lists characteristics of the lenses and other elements of the camera module 100, and Table 2 below lists aspherical constants of surfaces of the lenses of the camera module 100.

TABLE 1

| Surface No. | Element | Radius of Curvature | Thickness/ Distance (First Mode) | Thickness/ Distance (Second Mode) | Refractive Index | Abbe Number |
|---|---|---|---|---|---|---|
| S1 | Prism | Infinity | 8.000 | 8.000 | 1.717 | 29.50 |
| S2 | | Infinity | 8.000 | 8.000 | 1.717 | 29.50 |
| S3 | | Infinity | 2.000 | 2.000 | | |
| S4 | First | 9.644 | 2.750 | 2.750 | 1.660 | 20.40 |
| S5 | Lens | 9.124 | 2.850 | 2.850 | | |
| S6 | Second | 50.052 | 1.950 | 1.950 | 1.560 | 37.30 |
| S7 | Lens | 13.644 | 6.500 | 6.500 | | |
| S8 | FMS1 | Infinity | 24.000 | 7.800 | | |
| S9 | DMS1 | Infinity | 9.000 | 9.000 | | |
| S10 | DMS2 | Infinity | 24.000 | 7.800 | | |
| S11 | FMS2 | Infinity | 5.000 | 5.000 | | |
| S12 | Third | 7.809 | 2.490 | 2.490 | 1.544 | 56.00 |
| S13 | Lens | 6.701 | 0.594 | 0.594 | | |
| S14 | Fourth | 10.963 | 0.650 | 0.650 | 1.615 | 25.90 |
| S15 | Lens | 7.066 | 0.634 | 0.634 | | |
| S16 | Fifth | 7.792 | 2.660 | 2.660 | 1.544 | 56.00 |
| S17 | Lens | 87.106 | 5.000 | 5.000 | | |
| S18 | FMS3 | Infinity | 11.000 | 17.806 | | |
| S19 | DMS3 | Infinity | 8.000 | 8.000 | | |
| S20 | DMS4 | Infinity | 11.000 | 17.806 | | |
| S21 | FMS4 | Infinity | 5.000 | 5.000 | | |
| S22 | Filter | Infinity | 0.220 | 0.220 | 1.516 | 64.10 |
| S23 | | Infinity | 5.780 | 5.780 | | |
| S24 | Imaging Plane | Infinity | 0.000 | 0.000 | | |

TABLE 2

| | Surface No. | | | | |
|---|---|---|---|---|---|
| | S4 | S5 | S6 | S7 | S12 |
| k | 0 | 0 | 0 | 0 | 0 |
| A | 1.936E−04 | 2.395E−04 | −1.585E−04 | −5.702E−05 | −1.991E−05 |
| B | −3.825E−06 | −5.154E−06 | 1.938E−05 | 1.580E−05 | −4.125E−07 |
| C | −3.606E−08 | −3.495E−07 | −1.657E−07 | 5.173E−07 | 7.712E−08 |
| D | −1.181E−09 | −1.497E−09 | −9.518E−10 | −1.740E−08 | 1.524E−09 |
| E | 6.075E−11 | 2.577E−10 | −5.755E−10 | −9.078E−10 | −4.200E−11 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

| | Surface No. | | | | |
|---|---|---|---|---|---|
| | S13 | S14 | S15 | S16 | S17 |
| k | 0 | 0 | 0 | 0 | 0 |
| A | 2.987E−05 | 6.119E−05 | −3.885E−05 | −4.183E−05 | 3.922E−05 |
| B | −4.357E−07 | −1.788E−06 | 1.749E−06 | −8.568E−08 | −5.176E−06 |
| C | −1.198E−07 | −1.461E−07 | 1.526E−07 | −8.824E−08 | −1.083E−07 |
| D | −2.190E−09 | 4.480E−09 | 1.478E−09 | −1.256E−08 | −2.251E−09 |
| E | 9.345E−10 | 5.281E−10 | 3.127E−10 | 3.599E−10 | −4.245E−10 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

Figure 5:
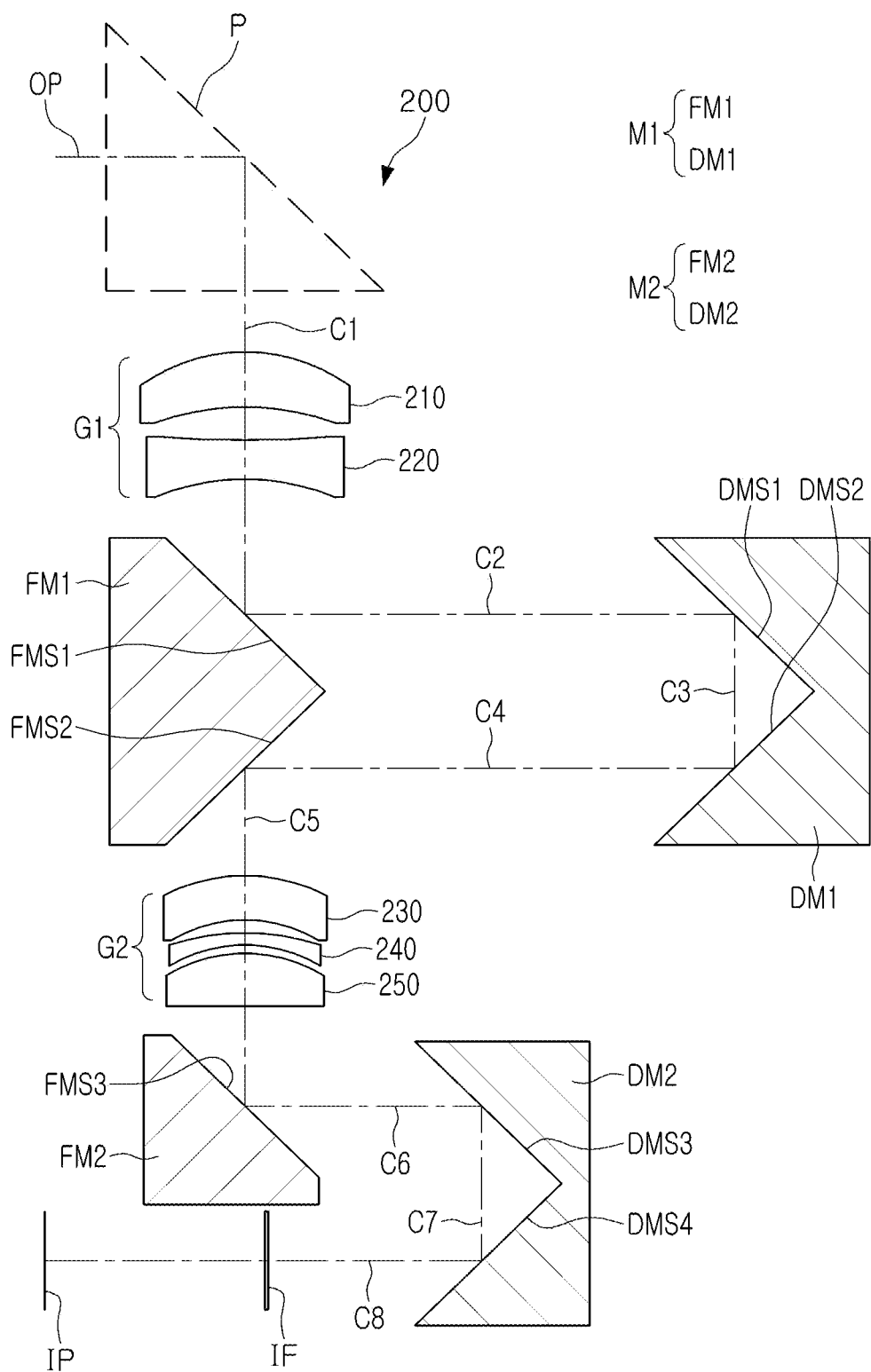
FIG. 5 is a diagram of a second example of a camera module in a first mode having a first magnification.
Figure 6:
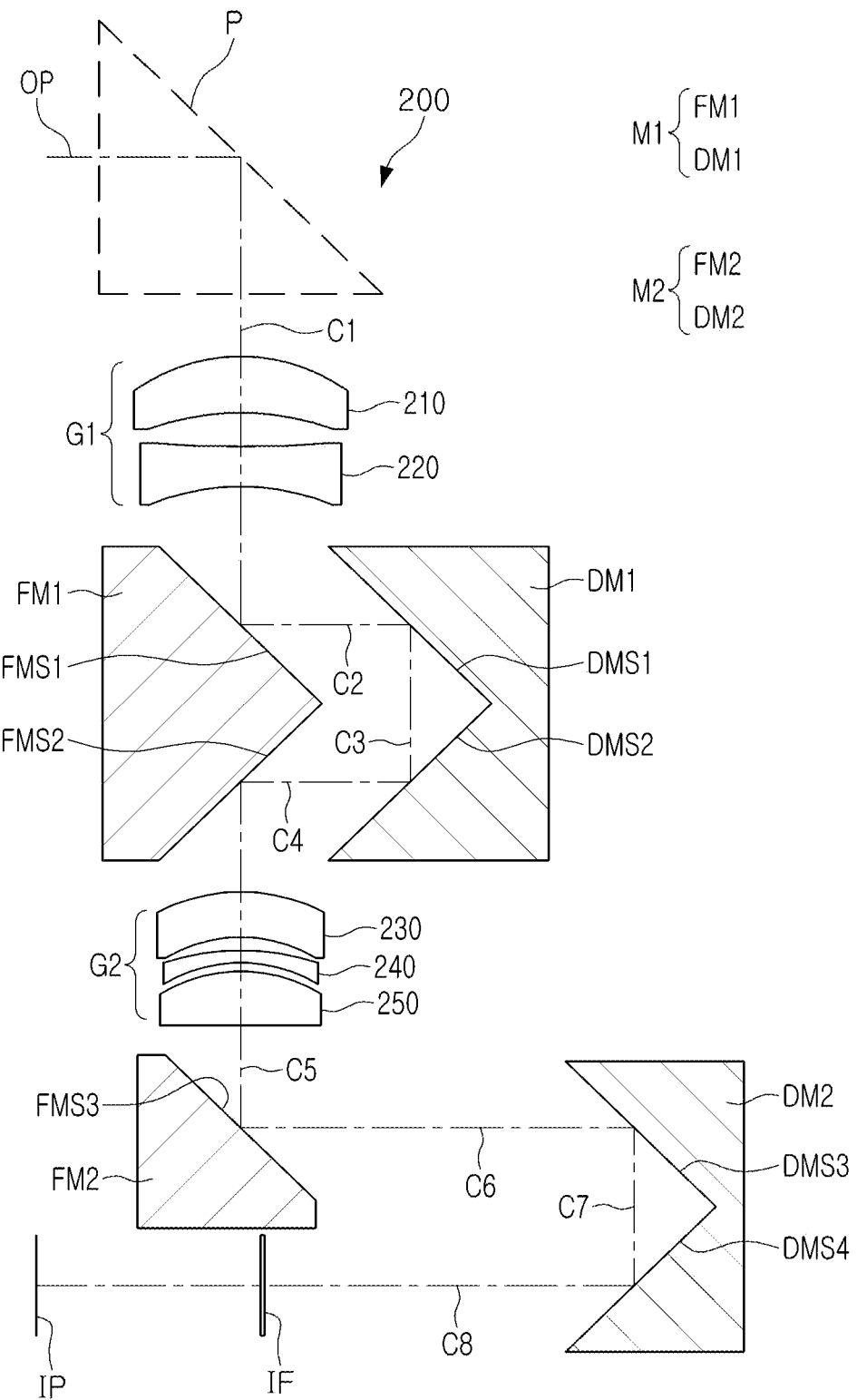
FIG. 6 is a diagram of the second example of the camera module in a second mode having a second magnification greater than the first magnification.
Figure 7:
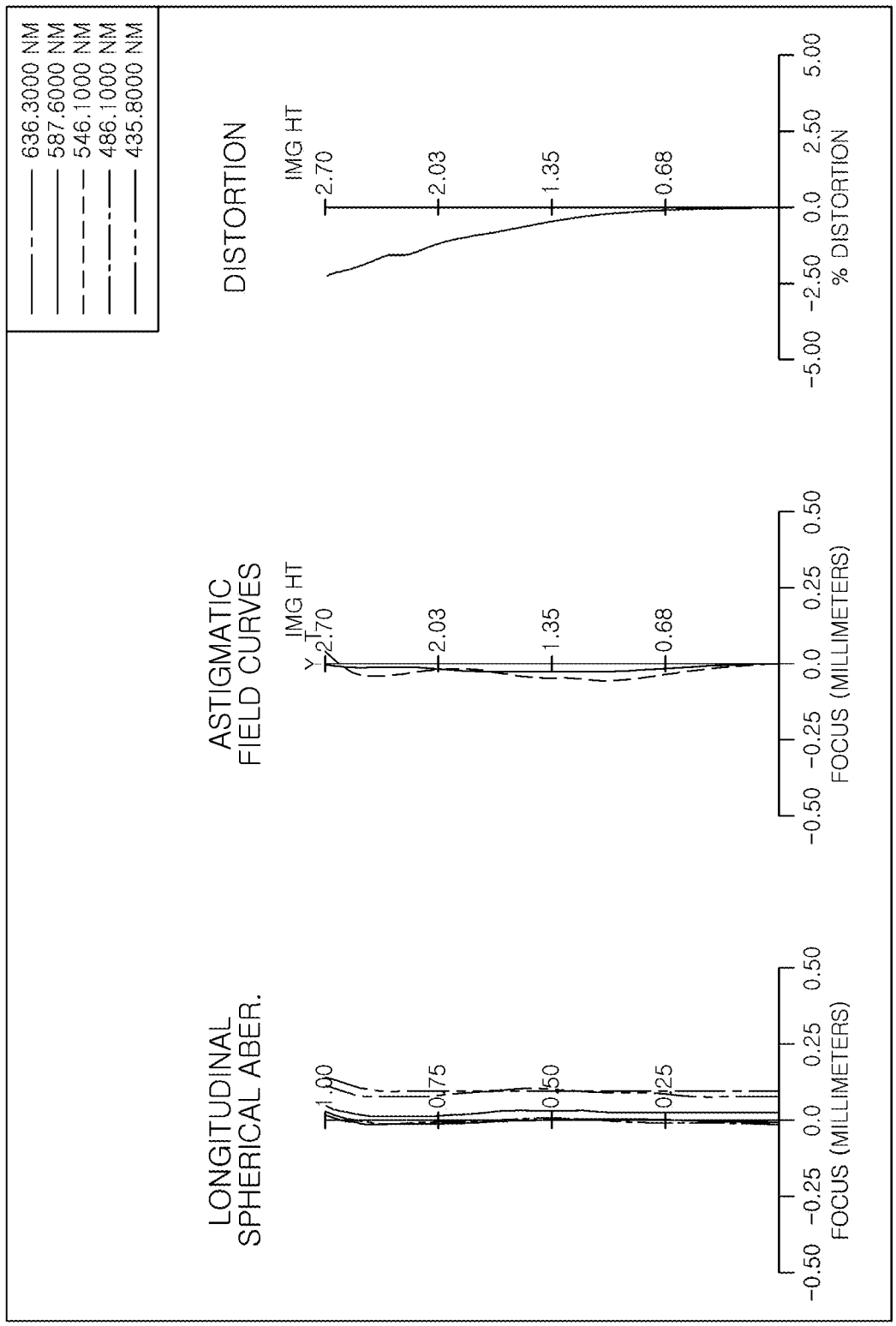
FIG. 7 shows curves representing aberration characteristics of the second example of the camera module in the first mode illustrated in FIG. 5.
Figure 8:
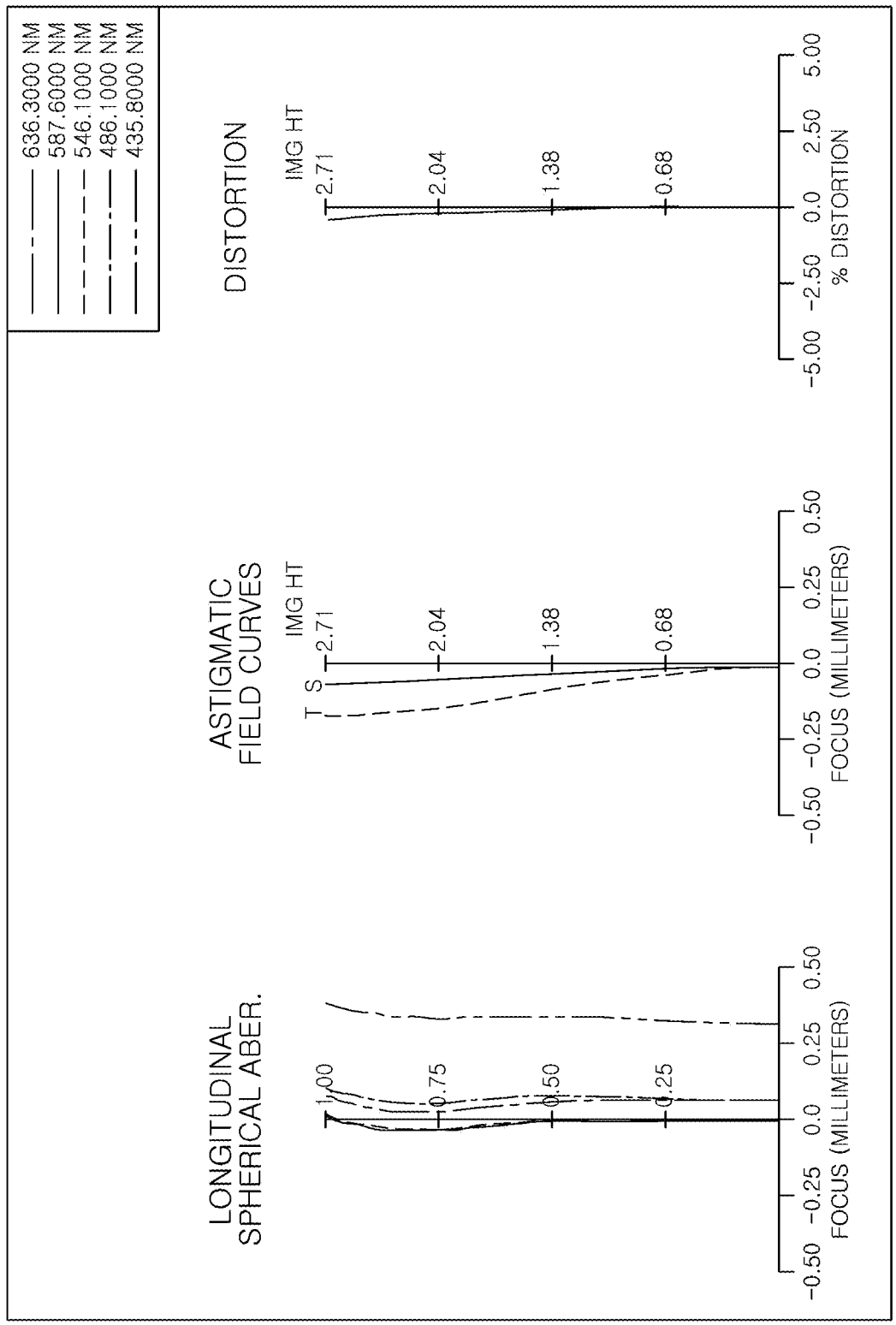
FIG. 8 shows curves representing aberration characteristics of the second example of the camera module in the second mode illustrated in FIG. 6.

FIG. 5 is a diagram of a second example of a camera module in a first mode having a first magnification, FIG. 6 is a diagram of the second example of the camera module in a second mode having a second magnification greater than the first magnification, FIG. 7 shows curves representing aberration characteristics of the second example of the camera module in the first mode illustrated in FIG. 5, and FIG. 8 shows curves representing aberration characteristics of the second example of the camera module in the second mode illustrated in FIG. 6.

Referring to FIGS. 5 and 6, a camera module 200 may include a prism P, a first lens group G1, a second lens group G2, a first optical path folding unit M1, a second optical path folding unit M2, a filter IF, and an image sensor IP having an imaging surface disposed at an imaging plane of the camera module 200.

The prism P may be disposed in an opening of the camera module 200. The prism P may convert a path of light incident from one side of the camera module 200 into a length direction of the camera module 200. For example, a path OP of light reflected from an object may be changed into a first optical axis C1 direction by the prism P. The first optical axis C1 is an optical axis of the first lens group G1.

The first lens group G1 may be disposed on an image side of the prism P and may include a first lens 210 and a second lens 220. The first lens 210 may have a positive refractive power, and an object-side surface thereof may be convex while an image-side surface thereof may be concave. The second lens 220 may have a negative refractive power, and an object-side surface thereof may be convex while an image-side surface thereof may be concave.

The second lens group G2 may be disposed on an image side of the first lens group G1 and may include a third lens 230, a fourth lens 240, and a fifth lens 250. The third lens 230 may have a negative refractive power, and an object-side surface thereof may be convex while an image-side surface thereof may be concave. The fourth lens 240 may have a negative refractive power, and an object-side surface thereof may be convex while an image-side surface thereof may be concave. The fifth lens 250 may have a positive refractive power, and an object-side surface thereof may be convex while an image-side surface thereof may be concave.

The first optical path folding unit M1 may be disposed between the first lens group G1 and the second lens group G2. The first optical path folding unit M1 may include a first fixed reflective member FM1 and a first movable reflective member DM1.

The first fixed reflective member FM1 may be disposed between the first lens group G1 and the second lens group G2. In detail, the first fixed reflective member FM1 may be disposed on a virtual straight line connecting the first optical axis C1 of the first lens group G1 to a fifth optical axis C5 of the second lens group G2. In other words, the fifth optical axis C5 of the second lens group G2 may be coaxial with the first optical axis C1 of the first lens group G1. The first fixed reflective member FM1 may include a plurality of reflective surfaces. For example, the first fixed reflective member FM1 may include a first fixed reflective surface FMS1 and a second fixed reflective surface FMS2. The first fixed reflective surface FMS1 may reflect light emitted from the second lens 220 in a direction intersecting the first optical axis C1. For example, the first fixed reflective surface FMS1 may reflect light incident along the first optical axis C1 in a second optical axis C2 direction intersecting the first optical axis C1. The second fixed reflective surface FMS2 may reflect light emitted from the first movable reflective member DM1 to the second lens group G2. For example, the second fixed reflective surface FMS2 may reflect light incident along a fourth optical axis C4 in the fifth optical axis C5 direction intersecting the fourth optical axis C4.

The first movable reflective member DM1 may be disposed on one side of the first fixed reflective member FM1. For example, the first movable reflective member DM1 may be disposed on the second optical axis C2 and the fourth optical axis C4. The first movable reflective member DM1 may move along the second optical axis C2 and the fourth optical axis C4. For example, the first movable reflective member DM1 may be moved to be near to the first fixed reflective member FM1 or be moved to be far from the first fixed reflective member FM1 by a first driving unit. The first movable reflective member DM1 may include a plurality of reflective surfaces. For example, the first movable reflective member DM1 may include a first movable reflective surface DMS1 and a second movable reflective surface DMS2. The first movable reflective surface DMS1 may reflect light incident along the second optical axis C2 in a third optical axis C3 direction, and the second movable reflective surface DMS2 may reflect light incident along the third optical axis C3 in the fourth optical axis C4 direction to the second fixed reflective surface FMS2. The first movable reflective member DM1 may increase or decrease a length of an optical path connecting the first lens group G1 and the second lens group G2 to each other along the first optical axis C1, the second optical axis C2, the third optical axis C3, the fourth optical axis C4, and the fifth optical axis C5. For example, the length of the optical path connecting the first lens group G1 and the second lens group G2 to each other may decrease as the first movable reflective member DM1 moves closer to the first fixed reflective member FM1, and may increase as the first movable reflective member DM1 moves farther from the first fixed reflective member FM1.

The first optical path folding unit M1 configured as described above may bypass a portion of a straight-line optical path connecting the first lens group G1 and the second lens group G2 to each other. In addition, the first optical path folding unit M1 may increase or decrease the length of the optical path connecting the first lens group G1 and the second lens group G2 to each other as described above. Therefore, in the camera module 200, a focus and a magnification may be adjusted through the first optical path folding unit M1.

The second optical path folding unit M2 is disposed between the second lens group G2 and the image sensor IP. The second optical path folding unit M2 may include a second fixed reflective member FM2 and a second movable reflective member DM2.

The second fixed reflective member FM2 may be disposed between the second lens group G2 and the image sensor IP on the fifth optical axis C5 of the second lens group G2. The second fixed reflective member FM2 may include one reflective surface. For example, the second fixed reflective member FM2 may include a third fixed reflective surface FMS3. The third fixed reflective surface FMS3 may reflect light emitted from the fifth lens 250 in a direction intersecting a fifth optical axis C5. For example, the third fixed reflective surface FMS3 may reflect light incident along the fifth optical axis C5 in a sixth optical axis C6 direction intersecting the fifth optical axis C5.

The second movable reflective member DM2 may be disposed on one side of the second fixed reflective member FM2. For example, the second movable reflective member DM2 may be disposed on the sixth optical axis C6 and an eighth optical axis C8. The second movable reflective member DM2 may move along the sixth optical axis C6 and the eighth optical axis C8. For example, the second movable reflective member DM2 may be moved to be near to the second fixed reflective member FM2 or be moved to be far from the second fixed reflective member FM2 by a second driving unit. The second movable reflective member DM2 may include a plurality of reflective surfaces. For example, the second movable reflective member DM2 may include a third movable reflective surface DMS3 and a fourth movable reflective surface DMS4. The third movable reflective surface DMS3 may reflect light incident along the sixth optical axis C6 in a seventh optical axis C7 direction, and the fourth movable reflective surface DMS4 may reflect light incident along the seventh optical axis C7 in the eighth optical axis direction C8 to the image sensor IP. The second movable reflective member DM2 may increase or decrease a length of an optical path connecting the second lens group G2 and the image sensor IP to each other along the fifth optical axis C5, the sixth optical axis C6, the seventh optical axis C7, and the eighth optical axis C8. For example, the length of the optical path connecting the second lens group G2 and the image sensor IP to each other may decrease as the second movable reflective member DM2 moves closer to the second fixed reflective member FM2, and may increase as the second movable reflective member DM2 moves farther from the second fixed reflective member FM2.

The second optical path folding unit M2 configured as described above may bypass a portion of an optical path connecting the second lens group G2 and the image sensor IP to each other. In addition, the second optical path folding unit M2 may increase or decrease the length of the optical path connecting the second lens group G2 and the image sensor IP to each other as described above. Therefore, in the camera module 200, a focus and a magnification may be adjusted through the second optical path folding unit M2.

The filter IF may be disposed on an object side of the image sensor IP. The filter IF may filter light of a specific range of wavelengths included in incident light. For example, the filter IF may be configured to filter infrared rays.

The image sensor IP may be configured to convert an incident optical image into an electric signal. The image sensor IP may include a plurality of optical sensors. The image sensor IP can be manufactured in a CCD form. However, a form of the image sensor IP is not limited to the CCD form.

The camera module 200 may perform image capturing in two modes. For example, the camera module 200 may have a first mode of capturing an image of a subject located at a middle distance, and a second mode of capturing an image of a subject located at a long distance. Alternatively, the camera module 200 may have a first mode of magnifying a subject at a first magnification and capturing an image of the magnified subject at the first magnification, and a second mode of magnifying a subject at a second magnification greater than the first magnification and capturing an image of the magnified subject at the second magnification. However, an image capturing mode of the camera module 200 is not limited to two modes. For example, the camera module 200 may also perform image capturing during an operation in which the first mode is switched to the second mode or an operation in which the second mode is switched to the first mode, as well as in the first and second modes.

First, the first mode of the camera module 200 will be described with reference to FIG. 5.

The first mode of the camera module 200 may be a mode in which the length of the optical path between the first lens group G1 and the second lens group G2 is increased by as much as possible. For example, in the first mode, the length of the optical path between the first lens group G1 and the second lens group G2 may be increased by as much as possible by increasing a distance between the first fixed reflective member FM1 and the first movable reflective member DM1. In addition, in the first mode, a focus of the camera module 200 may be adjusted while decreasing a distance between the second fixed reflective member FM2 and the second movable reflective member DM2. The camera module 200 in the first mode may capture an image of the subject located at a middle distance, or may magnify the subject at the first magnification and capture an image of the magnified subject at the first magnification, as described above.

FIG. 7 shows curves representing aberration characteristics of the camera module 200 in the first mode illustrated in FIG. 5.

Next, the second mode of the camera module 200 will be described with reference to FIG. 6.

The second mode of the camera module 200 may be a mode in which the length of the optical path between the second lens group G2 and the image sensor IP is increased by as much as possible. For example, in the second mode, the length of the optical path between the second lens group G2 and the image sensor IP may be increased by as much as possible by increasing a distance between the second fixed reflective member FM2 and the second movable reflective member DM2. In addition, in the second mode, a focus of the camera module 200 may be adjusted while decreasing the distance between the first fixed reflective member FM1 and the first movable reflective member DM1. The camera module 200 in the second mode may capture an image of the subject located at a long distance, or may magnify the subject at the second magnification greater than the first magnification and capture an image of the magnified subject at the second magnification, as described above.

FIG. 8 shows curves representing aberration characteristics of the camera module 200 in the second mode illustrated in FIG. 6.

The camera module 200 configured as described above may capture images of the subjects located at a middle distance and a long distance, or may magnify the subjects at a plurality of magnifications and capture images of the magnified subjects at the plurality of magnifications, through the plurality of optical path folding units M1 and M2. Furthermore, in the camera module 200, a folded optical path may be formed inside the camera module 200 as illustrated in FIGS. 5 and 6, and the camera module 200 may thus be miniaturized.

Table 3 below lists characteristics of the lenses and other elements of the camera module 200, and Table 4 below lists aspherical constants of surfaces of the lenses of the camera module 200.

TABLE 3

| Surface No. | Element | Radius of Curvature | Thickness/ Distance (First Mode) | Thickness/ Distance (Second Mode) | Refractive Index | Abbe Number |
|---|---|---|---|---|---|---|
| S1 | Prism | Infinity | 7.000 | 7.000 | 1.717 | 29.50 |
| S2 | | Infinity | 7.000 | 7.000 | 1.717 | 29.50 |
| S3 | | Infinity | 3.098 | 3.098 | | |
| S4 | First | 8.511 | 2.750 | 2.750 | 1.660 | 20.40 |
| S5 | Lens | 11.625 | 1.699 | 1.699 | | |
| S6 | Second | 398.852 | 1.950 | 1.950 | 1.560 | 37.30 |
| S7 | Lens | 9.833 | 6.500 | 6.500 | | |
| S8 | FMS1 | Infinity | 24.000 | 7.800 | | |
| S9 | DMS1 | Infinity | 9.000 | 9.000 | | |
| S10 | DMS2 | Infinity | 24.000 | 7.800 | | |
| S11 | FMS2 | Infinity | 5.000 | 5.000 | | |
| S12 | Third | 8.035 | 2.354 | 2.354 | 1.544 | 56.00 |
| S13 | Lens | 7.173 | 0.621 | 0.621 | | |
| S14 | Fourth | 12.865 | 0.650 | 0.650 | 1.615 | 25.90 |
| S15 | Lens | 7.200 | 0.550 | 0.550 | | |
| S16 | Fifth | 7.926 | 2.660 | 2.660 | 1.544 | 56.00 |
| S17 | Lens | 1152.879 | 5.000 | 5.000 | | |
| S18 | FMS3 | Infinity | 11.200 | 17.806 | | |
| S19 | DMS3 | Infinity | 8.000 | 8.000 | | |
| S20 | DMS4 | Infinity | 10.200 | 16.806 | | |
| S21 | Filter | Infinity | 0.220 | 0.220 | 1.516 | 64.10 |
| S22 | | Infinity | 11.170 | 11.170 | | |
| S23 | Imaging Plane | Infinity | 0.000 | 0.000 | | |

TABLE 4

| | Surface No. | | | | |
|---|---|---|---|---|---|
| | S4 | S5 | S6 | S7 | S12 |
| k | 0 | 0 | 0 | 0 | 0 |
| A | 2.904E−05 | 9.588E−06 | 3.489E−05 | 4.662E−05 | −1.285E−06 |
| B | 1.097E−06 | 1.263E−06 | 3.219E−06 | 4.470E−06 | 7.228E−07 |
| C | 5.008E−09 | 8.143E−08 | 2.422E−07 | −3.851E−08 | 8.502E−09 |
| D | −1.217E−09 | 1.148E−08 | 1.256E−08 | 1.063E−08 | 1.666E−09 |
| E | 7.642E−11 | 1.651E−10 | 4.182E−21 | −2.181E−21 | −3.497E−11 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

| | Surface No. | | | | |
|---|---|---|---|---|---|
| | S13 | S14 | S15 | S16 | S17 |
| k | 0 | 0 | 0 | 0 | 0 |
| A | 2.317E−06 | −6.933E−06 | 6.541E−06 | 8.337E−07 | 2.329E−06 |
| B | −1.563E−07 | −7.322E−07 | 6.551E−07 | −2.789E−07 | −1.095E−07 |
| C | 4.164E−08 | −6.000E−08 | 5.819E−08 | −6.752E−08 | −1.772E−07 |
| D | −4.703E−10 | 7.489E−09 | −2.413E−09 | −1.823E−08 | −1.235E−08 |
| E | 1.114E−20 | −2.706E−21 | 1.304E−20 | −2.614E−20 | 1.415E−20 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

Figure 9:
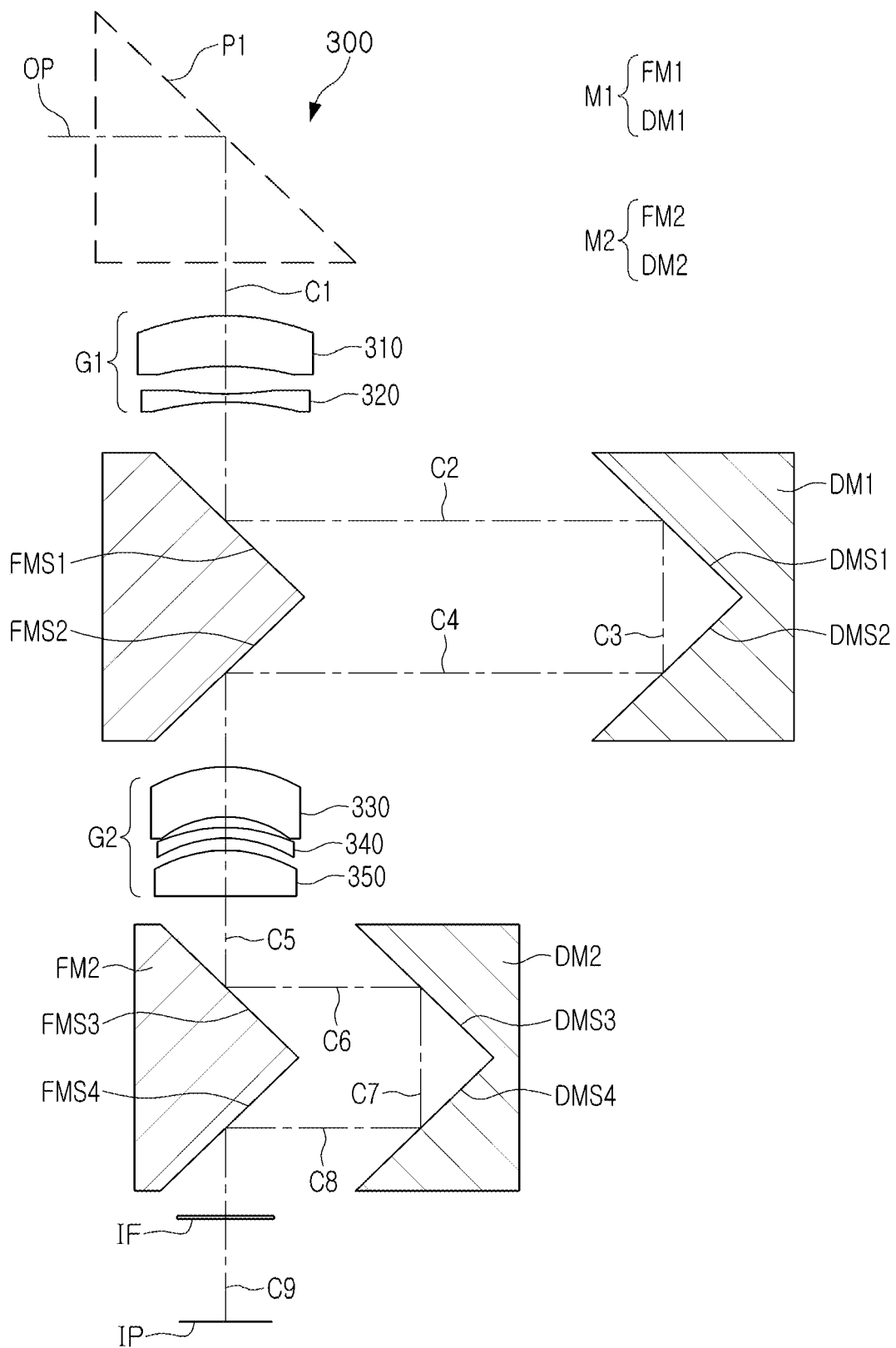
FIG. 9 is a diagram of a third example of a camera module in a first mode having a first magnification.
Figure 10:
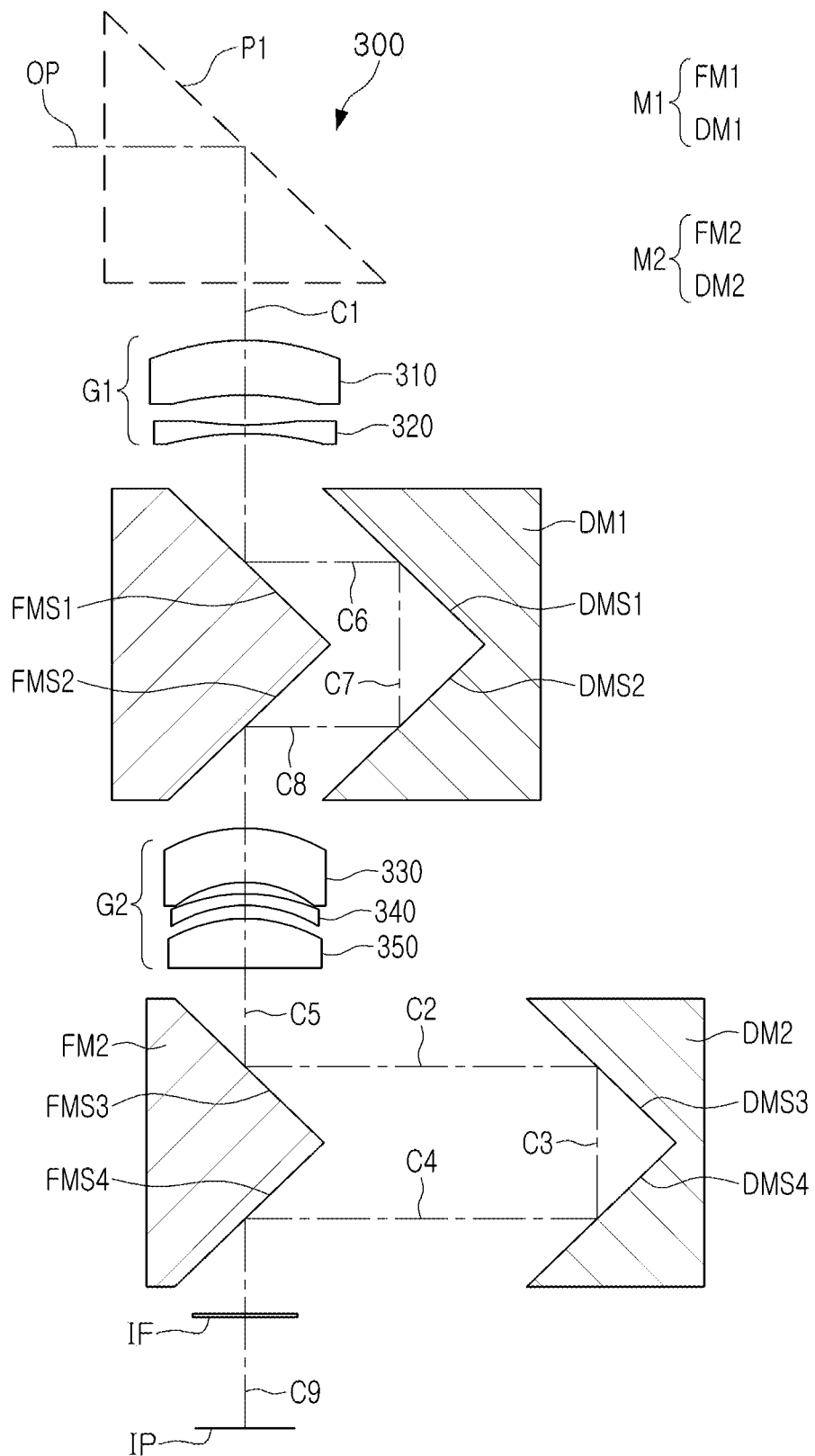
FIG. 10 is a diagram of the third example of the camera module in a second mode having a second magnification greater than the first magnification.
Figure 11:
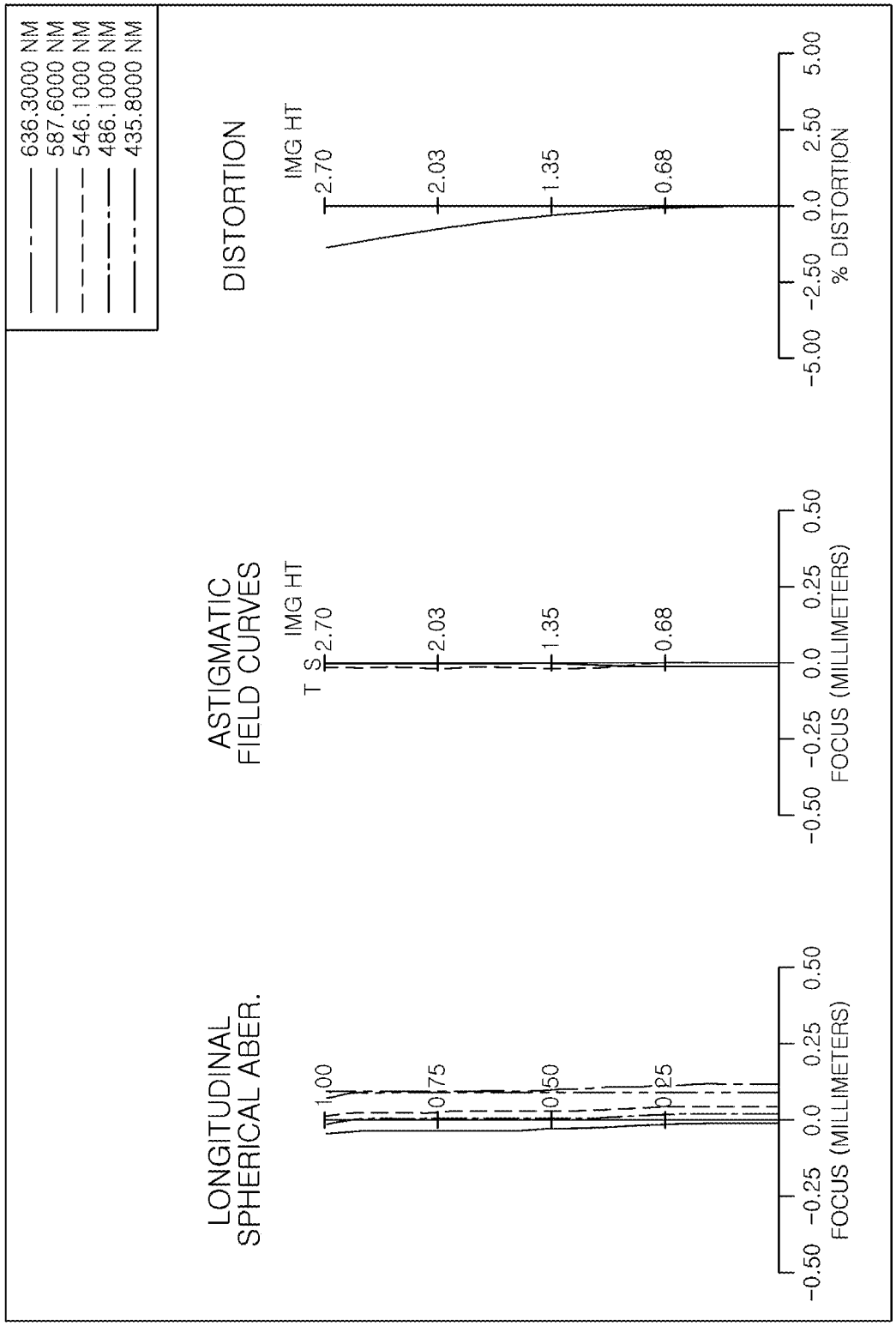
FIG. 11 shows curves representing aberration characteristics of the third example of the camera module in the first mode illustrated in FIG. 9.
Figure 12:
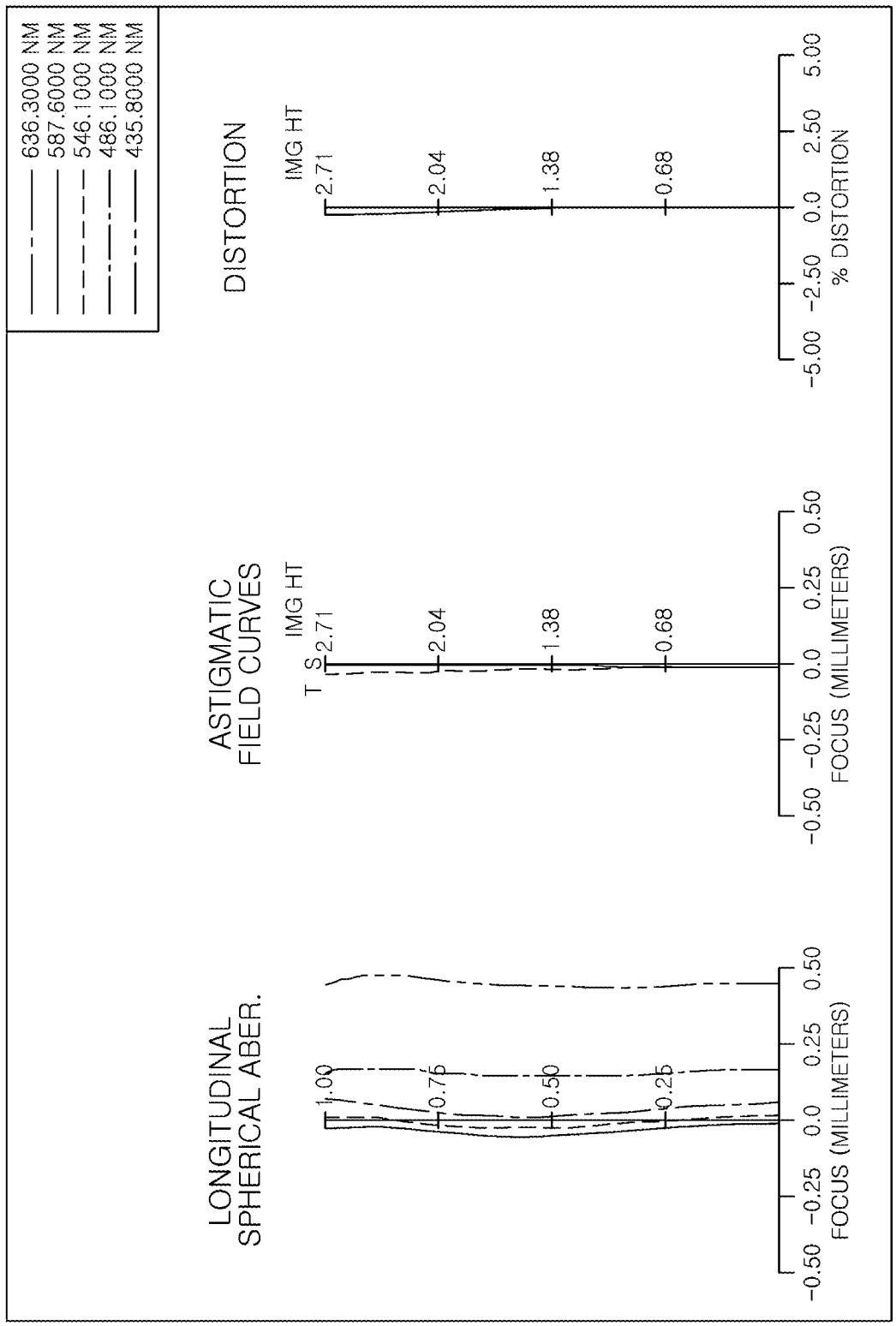
FIG. 12 shows curves representing aberration characteristics of the third example of the camera module in the second mode illustrated in FIG. 10.

FIG. 9 is a diagram of a third example of a camera module in a first mode having a first magnification, FIG. 10 is a diagram of the third example of the camera module in a second mode having a second magnification greater than the first magnification, FIG. 11 shows curves representing aberration characteristics of the third example of the camera module in the first mode illustrated in FIG. 9, and FIG. 12 shows curves representing aberration characteristics of the third example of the camera module in the second mode illustrated in FIG. 10.

Referring to FIGS. 9 and 10, a camera module 300 may include a prism P, a first lens group G1, a second lens group G2, a first optical path folding unit M1, a second optical path folding unit M2, a filter IF, and an image sensor IP having an imaging surface disposed at an imaging plane of the camera module 300.

The prism P may be disposed in an opening of the camera module 300. The prism P may convert a path of light incident from one side of the camera module 300 into a length direction of the camera module 300. For example, a path OP of light reflected from an object may be changed into a first optical axis C1 direction by the prism P. The first optical axis C1 is an optical axis of the first lens group G1.

The first lens group G1 may be disposed on an image side of the prism P and may include a first lens 310 and a second lens 320. The first lens 310 may have a positive refractive power, and an object-side surface thereof may be convex while an image-side surface thereof may be concave. The second lens 320 may have a negative refractive power, and an object-side surface thereof may be concave and an image-side surface thereof may be concave.

The second lens group G2 may be disposed on an image side of the first lens group G1 and may include a third lens 330, a fourth lens 340, and a fifth lens 350. The third lens 330 may have a positive refractive power, and an object-side surface thereof may be convex while an image-side surface thereof may be concave. The fourth lens 340 may have a negative refractive power, and an object-side surface thereof may be convex while an image-side surface thereof may be concave. The fifth lens 350 may have a positive refractive power, and an object-side surface thereof may be convex while an image-side surface thereof may be concave.

The first optical path folding unit M1 may be disposed between the first lens group G1 and the second lens group G2. The first optical path folding unit M1 may include a first fixed reflective member FM1 and a first movable reflective member DM1.

The first fixed reflective member FM1 may be disposed between the first lens group G1 and the second lens group G2. In detail, the first fixed reflective member FM1 may be disposed on a virtual straight line connecting the first optical axis C1 of the first lens group G1 to the fifth optical axis C5 of the second lens group G2. In other words, the fifth optical axis C5 of the second lens group G2 may be coaxial with the first optical axis C1 of the first lens group G1. The first fixed reflective member FM1 may include a plurality of reflective surfaces. For example, the first fixed reflective member FM1 may include a first fixed reflective surface FMS1 and a second fixed reflective surface FMS2. The first fixed reflective surface FMS1 may reflect light emitted from the second lens 320 in a direction intersecting the first optical axis C1. For example, the first fixed reflective surface FMS1 may reflect light incident along the first optical axis C1 in a second optical axis C2 direction intersecting the first optical axis C1. The second fixed reflective surface FMS2 may reflect light emitted from the first movable reflective member DM1 to the second lens group G2. For example, the second fixed reflective surface FMS2 may reflect light incident along a fourth optical axis C4 in the fifth optical axis C5 direction intersecting the fourth optical axis C4.

The first movable reflective member DM1 may be disposed on one side of the first fixed reflective member FM1. For example, the first movable reflective member DM1 may be disposed on the second optical axis C2 and the fourth optical axis C4. The first movable reflective member DM1 may move along the second optical axis C2 and the fourth optical axis C4. For example, the first movable reflective member DM1 may be moved to be near to the first fixed reflective member FM1 or be moved to be far from the first fixed reflective member FM1 by a first driving unit. The first movable reflective member DM1 may include a plurality of reflective surfaces. For example, the first movable reflective member DM1 may include a first movable reflective surface DMS1 and a second movable reflective surface DMS2. The first movable reflective surface DMS1 may reflect light incident along the second optical axis C2 in a third optical axis C3 direction, and the second movable reflective surface DMS2 may reflect light incident along the third optical axis C3 in the fourth optical axis C4 direction to the second fixed reflective surface FMS2. The first movable reflective member DM1 may increase or decrease a length of an optical path connecting the first lens group G1 and the second lens group G2 to each other along the first optical axis C1, the second optical axis C2, the third optical axis C3, the fourth optical axis C4, and the fifth optical axis C5. For example, the length of the optical path connecting the first lens group G1 and the second lens group G2 to each other may decrease as the first movable reflective member DM1 moves closer to the first fixed reflective member FM1, and may increase as the first movable reflective member DM1 moves farther from the first fixed reflective member FM1.

The first optical path folding unit M1 configured as described above may bypass a portion of a straight-line optical path connecting the first lens group G1 and the second lens group G2 to each other. In addition, the first optical path folding unit M1 may increase or decrease the length of the optical path connecting the first lens group G1 and the second lens group G2 to each other as described above. Therefore, in the camera module 300, a focus and a magnification may be adjusted through the first optical path folding unit M1.

The second optical path folding unit M2 is disposed between the second lens group G2 and the image sensor IP. The second optical path folding unit M2 may include a second fixed reflective member FM2 and a second movable reflective member DM2.

The second fixed reflective member FM2 may be disposed on a virtual straight line connecting the fifth optical axis C5 of the second lens group G2 to a ninth optical axis C9 of the image sensor IP. In other words, the ninth optical axis C9 of the image sensor IP may be coaxial with the fifth optical axis C5 of the second lens group G2. The second fixed reflective member FM2 may include a plurality of reflective surfaces. For example, the second fixed reflective member FM2 may include a third fixed reflective surface FMS3 and a fourth fixed reflective surface FMS4. The third fixed reflective surface FMS3 may reflect light emitted from the fifth lens 350 in a direction intersecting the fifth optical axis C5. For example, the third fixed reflective surface FMS3 may reflect light incident along the fifth optical axis C5 in a sixth optical axis C6 direction intersecting the fifth optical axis C5. The fourth fixed reflective surface FMS4 may reflect light emitted from the second movable reflective member DM2 to the image sensor IP. For example, the fourth fixed reflective surface FMS4 may reflect light incident along an eighth optical axis C8 in the ninth optical axis C9 direction intersecting the eighth optical axis C8.

The second movable reflective member DM2 may be disposed on one side of the second fixed reflective member FM2. For example, the second movable reflective member DM2 may be disposed on the sixth optical axis C6 and the eighth optical axis C8. The second movable reflective member DM2 may move along the sixth optical axis C6 and the eighth optical axis C8. For example, the second movable reflective member DM2 may be moved to be near to the second fixed reflective member FM2 or be moved to be far from the second fixed reflective member FM2 by a second driving unit. The second movable reflective member DM2 may include a plurality of reflective surfaces. For example, the second movable reflective member DM2 may include a third movable reflective surface DMS3 and a fourth movable reflective surface DMS4. The third movable reflective surface DMS3 may reflect light incident along the sixth optical axis C6 in a seventh optical axis C7 direction, and the fourth movable reflective surface DMS4 may reflect light incident along the seventh optical axis C7 in the eighth optical axis direction C8 to the fourth fixed reflective surface FMS4. The second movable reflective member DM2 may increase or decrease a length of an optical path connecting the second lens group G2 and the image sensor IP to each other along the fifth optical axis C5, the sixth optical axis C6, the seventh optical axis C7, the eighth optical axis C8, and the ninth optical axis C9. For example, the length of the optical path connecting the second lens group G2 and the image sensor IP to each other may decrease as the second movable reflective member DM2 moves closer to the second fixed reflective member FM2, and may increase as the second movable reflective member DM2 moves farther from the second fixed reflective member FM2.

The second optical path folding unit M2 configured as described above may bypass a portion of a straight-line optical path connecting the second lens group G2 and the image sensor IP to each other. In addition, the second optical path folding unit M2 may increase or decrease the length of the optical path connecting the second lens group G2 and the image sensor IP to each other as described above. Therefore, in the camera module 300, a focus and a magnification may be adjusted through the second optical path folding unit M2.

The filter IF may be disposed on an object side of the image sensor IP. The filter IF may filter light of a specific range of wavelengths included in incident light. For example, the filter IF may be configured to filter infrared rays.

The image sensor IP may be configured to convert an incident optical signal into an electric signal. The image sensor IP may include a plurality of optical sensors. The image sensor IP can be manufactured in CCD form. However, a form of the image sensor IP is not limited to the CCD form.

The camera module 300 may perform image capturing in two modes. For example, the camera module 300 may have a first mode of capturing an image of a subject located at a middle distance, and a second mode of capturing an image of a subject located at a long distance. Alternatively, the camera module 300 may have a first mode of magnifying a subject at a first magnification and capturing an image of the magnified subject at the first magnification, and a second mode of magnifying a subject at a second magnification greater than the first magnification and capturing an image of the magnified subject at the second magnification. However, an image capturing mode of the camera module 300 is not limited to two modes. For example, the camera module 300 may also perform image capturing during an operation in which the first mode is switched to the second mode or an operation in which the second mode is switched to the first mode, as well as in the first and second modes.

First, the first mode of the camera module 300 will be described with reference to FIG. 9.

The first mode of the camera module 300 may be a mode in which the length of the optical path between the first lens group G1 and the second lens group G2 is increased by as much as possible. For example, in the first mode, the length of the optical path between the first lens group G1 and the second lens group G2 may be increased by as much as possible by increasing a distance between the first fixed reflective member FM1 and the first movable reflective member DM1. In addition, in the first mode, a focus of the camera module 300 may be adjusted while decreasing a distance between the second fixed reflective member FM2 and the second movable reflective member DM2. The camera module 300 in the first mode may capture an image of the subject located at a middle distance, or may magnify the subject at the first magnification and capture an image of the magnified subject at the first magnification, as described above.

FIG. 11 shows curves representing aberration characteristics of the camera module 300 in the first mode illustrated in FIG. 9.

Next, the second mode of the camera module 300 will be described with reference to FIG. 10.

The second mode of the camera module 300 may be a mode in which the length of the optical path between the second lens group G2 and the image sensor IP is increased by as much as possible. For example, in the second mode, the length of the optical path between the second lens group G2 and the image sensor IP may be increased by as much as possible by increasing a distance between the second fixed reflective member FM2 and the second movable reflective member DM2. In addition, in the second mode, a focus of the camera module 300 may be adjusted while decreasing the distance between the first fixed reflective member FM1 and the first movable reflective member DM1. The camera module 300 in the second mode may capture an image of the subject located at a long distance, or may magnify the subject at the second magnification greater than the first magnification and capture an image of the magnified subject at the second magnification, as described above.

FIG. 12 shows curves representing aberration characteristics of the camera module 300 in the second mode illustrated in FIG. 10.

The camera module 300 configured as described above may capture images of the subjects located at a middle distance and a long distance, or may magnify the subjects at a plurality of magnifications and capture images of the magnified subjects at the plurality of magnifications, through the plurality of optical path folding units M1 and M2. Furthermore, in the camera module 300, a folded optical path may be formed inside the camera module 300 as illustrated in FIGS. 9 and 10, and the camera module 300 may thus be miniaturized.

Table 5 below lists characteristics of the lenses and other elements of the camera module 300, and Table 6 below lists aspherical constants of surfaces of the lenses of the camera module 300. As can be seen from Table 6, all of the first to fifth lenses of the camera module 300 may have spherical surfaces.

TABLE 5

| Surface No. | Element | Radius of Curvature | Thickness/ Distance (First Mode) | Thickness/ Distance (Second Mode) | Refractive Index | Abbe Number |
|---|---|---|---|---|---|---|
| S1 | Prism | Infinity | 7.000 | 7.000 | 1.717 | 29.50 |
| S2 | | Infinity | 7.000 | 7.000 | 1.717 | 29.50 |
| S3 | | Infinity | 3.098 | 3.098 | | |
| S4 | First | 14.350 | 2.739 | 2.739 | 1.660 | 20.40 |
| S5 | Lens | 17.580 | 1.524 | 1.524 | | |
| S6 | Second | −59.424 | 0.550 | 0.550 | 1.560 | 37.30 |
| S7 | Lens | 21.131 | 6.500 | 6.500 | | |
| S8 | FMS1 | Infinity | 24.000 | 7.800 | | |
| S9 | DMS1 | Infinity | 9.000 | 9.000 | | |
| S10 | DMS2 | Infinity | 24.000 | 7.800 | | |
| S11 | FMS2 | Infinity | 5.000 | 5.000 | | |
| S12 | Third | 7.445 | 2.922 | 2.922 | 1.544 | 56.00 |
| S13 | Lens | 6.434 | 0.566 | 0.566 | | |
| S14 | Fourth | 10.302 | 0.592 | 0.592 | 1.615 | 25.90 |
| S15 | Lens | 6.578 | 0.604 | 0.604 | | |
| S16 | Fifth | 7.343 | 2.660 | 2.660 | 1.544 | 56.00 |
| S17 | Lens | 52.129 | 5.000 | 5.000 | | |
| S18 | FMS3 | Infinity | 10.800 | 17.806 | | |
| S19 | DMS3 | Infinity | 8.000 | 8.000 | | |
| S20 | DMS4 | Infinity | 10.800 | 17.806 | | |
| S21 | FMS4 | Infinity | 5.000 | 5.000 | | |
| S22 | Filter | Infinity | 0.220 | 0.220 | 1.516 | 64.10 |
| S23 | | Infinity | 5.746 | 5.746 | | |
| S24 | Imaging Plane | Infinity | 0.000 | 0.000 | | |

TABLE 6

| | Surface No. | | | | |
|---|---|---|---|---|---|
| | S4 | S5 | S6 | S7 | S12 |
| k | 0 | 0 | 0 | 0 | 0 |
| A | 0 | 0 | 0 | 0 | 0 |
| B | 0 | 0 | 0 | 0 | 0 |
| C | 0 | 0 | 0 | 0 | 0 |
| D | 0 | 0 | 0 | 0 | 0 |
| E | 0 | 0 | 0 | 0 | 0 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |
| | Surface No. | | | | |
| | S13 | S14 | S15 | S16 | S17 |
| k | 0 | 0 | 0 | 0 | 0 |
| A | 0 | 0 | 0 | 0 | 0 |
| B | 0 | 0 | 0 | 0 | 0 |
| C | 0 | 0 | 0 | 0 | 0 |
| D | 0 | 0 | 0 | 0 | 0 |
| E | 0 | 0 | 0 | 0 | 0 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

Figure 13:
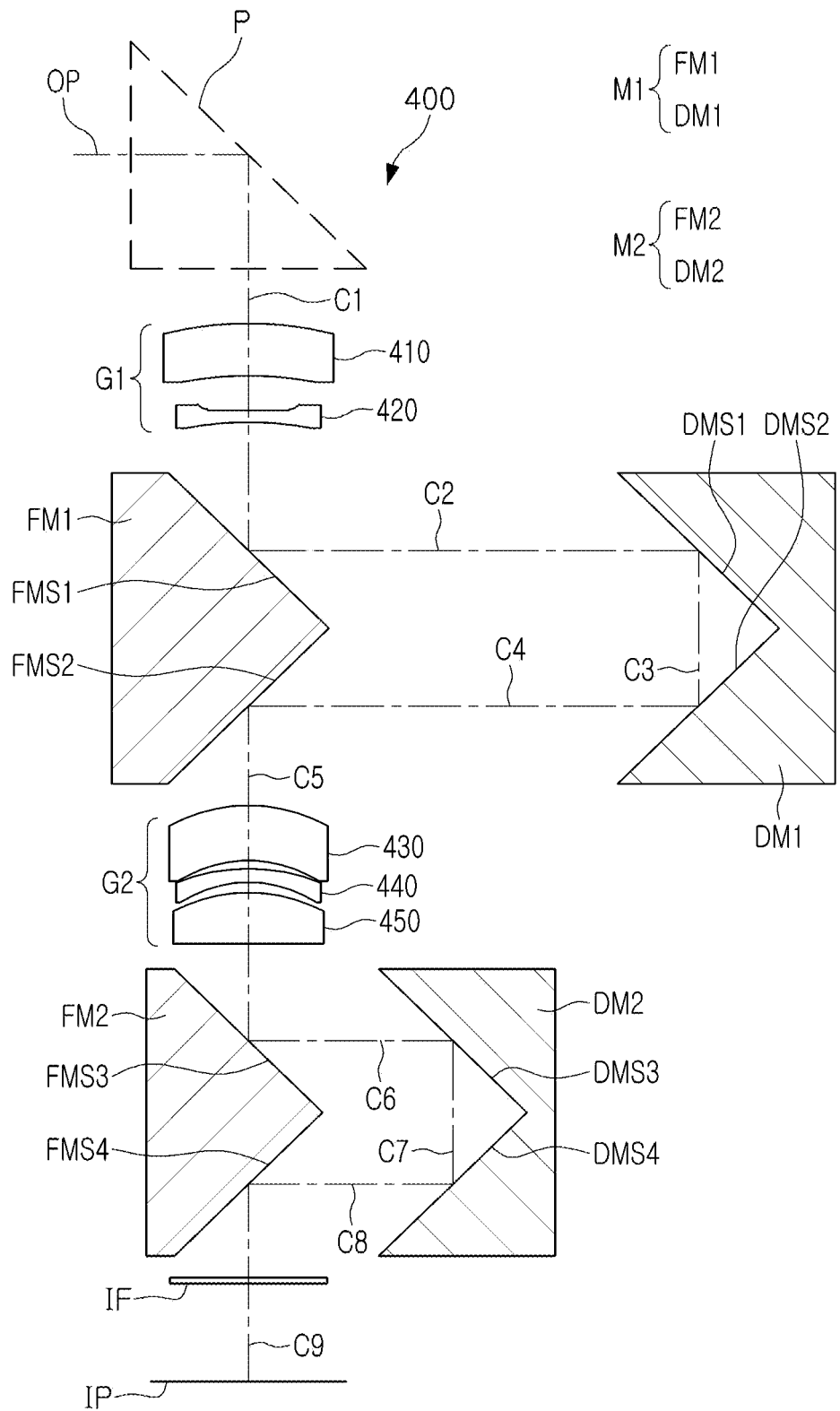
FIG. 13 is a diagram of a fourth example of a camera module in a first mode having a first magnification.
Figure 14:
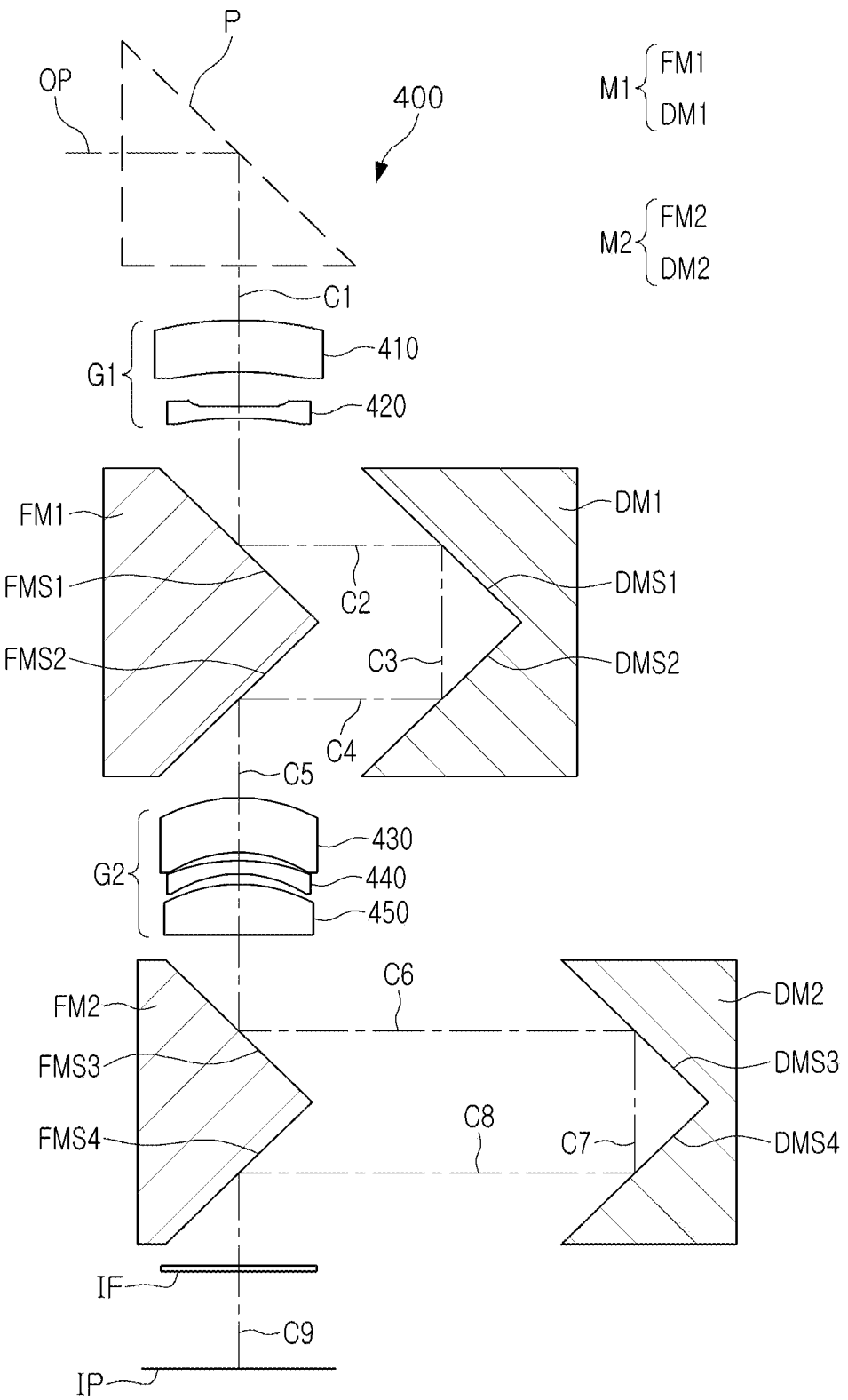
FIG. 14 is a diagram of the fourth example of the camera module in a second mode having a second magnification greater than the first magnification.
Figure 15:
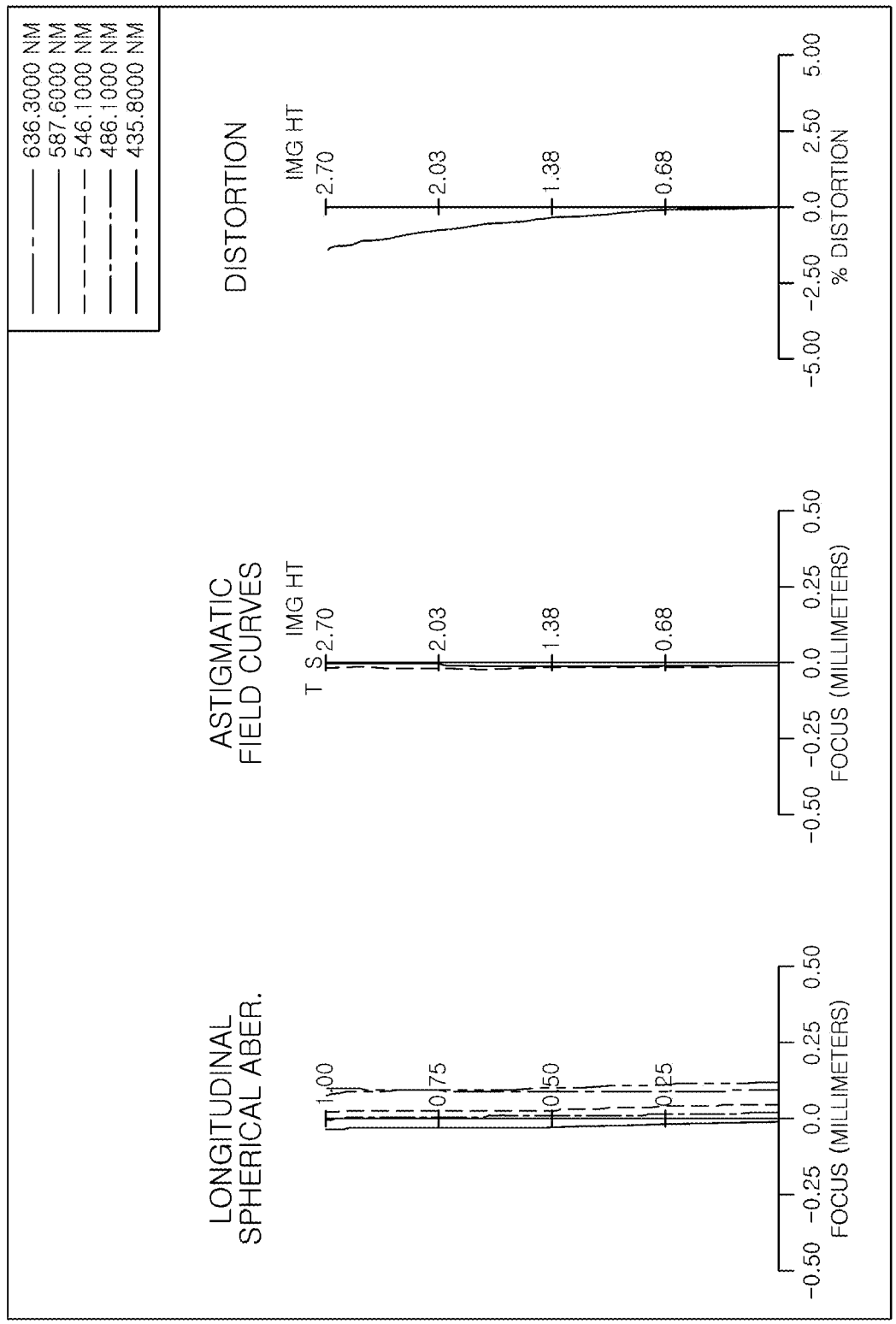
FIG. 15 shows curves representing aberration characteristics of the fourth example of the camera module in the first mode illustrated in FIG. 13.
Figure 16:
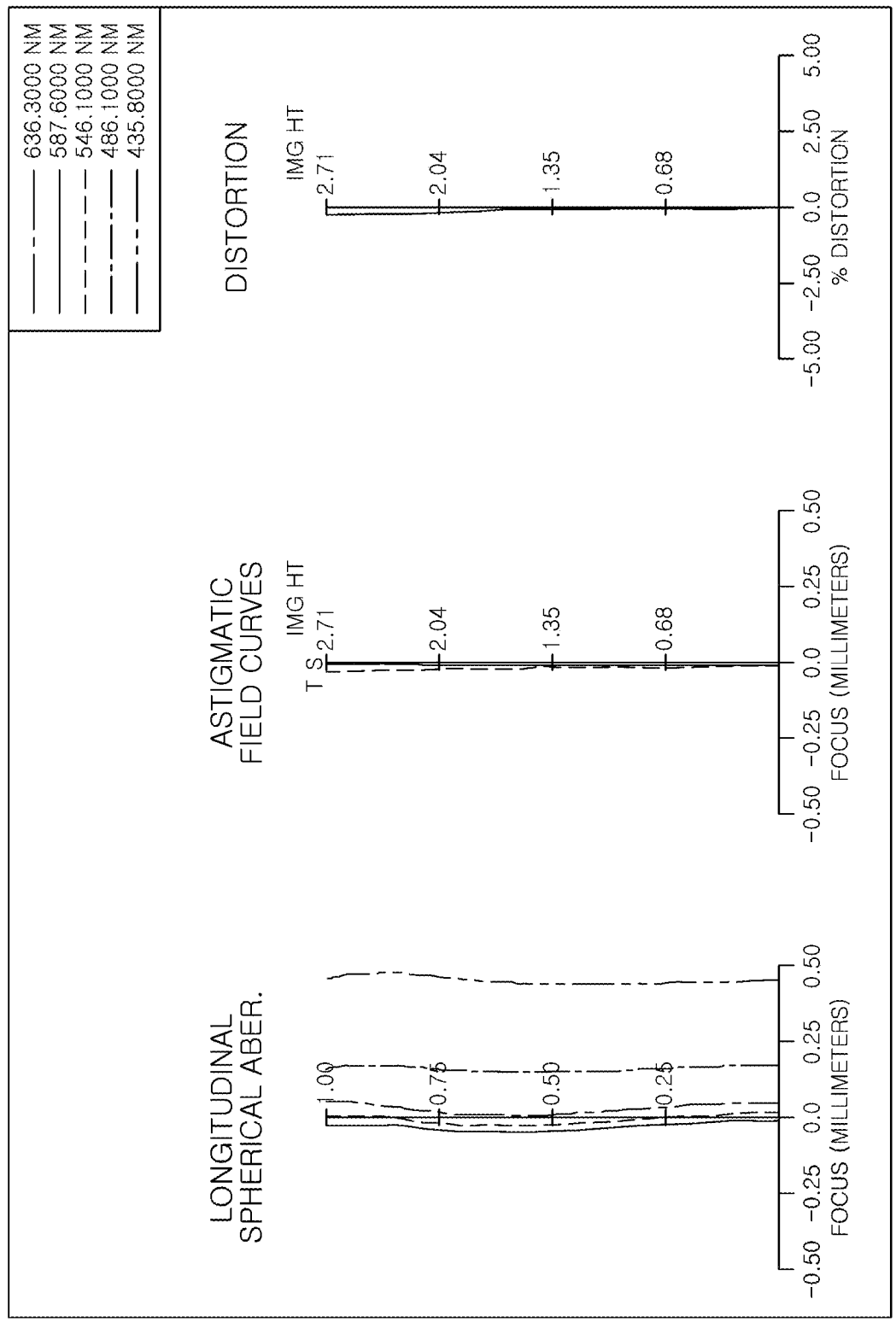
FIG. 16 shows curves representing aberration characteristics of the fourth example of the camera module in the second mode illustrated in FIG. 14.

FIG. 13 is a diagram of a fourth example of a camera module in a first mode having a first magnification, FIG. 14 is a diagram of the fourth example of the camera module in a second mode having a second magnification greater than the first magnification, FIG. 15 shows curves representing aberration characteristics of the fourth example of the camera module in the first mode illustrated in FIG. 13, and FIG. 16 shows curves representing aberration characteristics of the fourth example of the camera module in the second mode illustrated in FIG. 14.

Referring to FIGS. 13 and 14, a camera module 400 may include a prism P, a first lens group G1, a second lens group G2, a first optical path folding unit M1, a second optical path folding unit M2, a filter IF, and an image sensor IP having an imaging surface disposed at an imaging plane of the camera module 400.

The prism P may be disposed in an opening of the camera module 400. The prism P may convert a path of light incident from one side of the camera module 400 into a length direction of the camera module 400. For example, a path OP of light reflected from an object may be changed into a first optical axis C1 direction by the prism P. The first optical axis C1 is an optical axis of the first lens group G1.

The first lens group G1 may be disposed on an image side of the prism P and may include a first lens 410 and a second lens 420. The first lens 410 may have a positive refractive power, and an object-side surface thereof may be convex while an image-side surface thereof may be concave. The second lens 420 may have a negative refractive power, and an object-side surface thereof may be convex while an image-side surface thereof may be concave.

The second lens group G2 may be disposed on an image side of the first lens group G1 and may include a third lens 430, a fourth lens 440, and a fifth lens 450. The third lens 430 may have a negative refractive power, and an object-side surface thereof may be convex while an image-side surface thereof may be concave. The fourth lens 440 may have a negative refractive power, and an object-side surface thereof may be convex while an image-side surface thereof may be concave. The fifth lens 450 may have a positive refractive power, and an object-side surface thereof may be convex while an image-side surface thereof may be concave.

The first optical path folding unit M1 may be disposed between the first lens group G1 and the second lens group G2. The first optical path folding unit M1 may include a first fixed reflective member FM1 and a first movable reflective member DM1.

The first fixed reflective member FM1 may be disposed between the first lens group G1 and the second lens group G2. In detail, the first fixed reflective member FM1 may be disposed on a virtual straight line connecting the first optical axis C1 of the first lens group G1 to the fifth optical axis of the second lens group G2. In other words, the fifth optical axis C5 of the second lens group G2 may be coaxial with the first optical axis C1 of the first lens group G1. The first fixed reflective member FM1 may include a plurality of reflective surfaces. For example, the first fixed reflective member FM1 may include a first fixed reflective surface FMS1 and a second fixed reflective surface FMS2. The first fixed reflective surface FMS1 may reflect light emitted from the second lens 420 in a direction intersecting the first optical axis C1. For example, the first fixed reflective surface FMS1 may reflect light incident along the first optical axis C1 in a second optical axis C2 direction intersecting the first optical axis C1. The second fixed reflective surface FMS2 may reflect light emitted from the first movable reflective member DM1 to the second lens group G2. For example, the second fixed reflective surface FMS2 may reflect light incident along a fourth optical axis C4 in the fifth optical axis C5 direction intersecting the fourth optical axis C4.

The first movable reflective member DM1 may be disposed on one side of the first fixed reflective member FM1. For example, the first movable reflective member DM1 may be disposed on the second optical axis C2 and the fourth optical axis C4. The first movable reflective member DM1 may move along the second optical axis C2 and the fourth optical axis C4. For example, the first movable reflective member DM1 may be moved to be near to the first fixed reflective member FM1 or be moved to be far from the first fixed reflective member FM1 by a first driving unit. The first movable reflective member DM1 may include a plurality of reflective surfaces. For example, the first movable reflective member DM1 may include a first movable reflective surface DMS1 and a second movable reflective surface DMS2. The first movable reflective surface DMS1 may reflect light incident along the second optical axis C2 in a third optical axis C3 direction, and the second movable reflective surface DMS2 may reflect light incident along the third optical axis C3 in the fourth optical axis C4 direction to the second fixed reflective surface FMS2. The first movable reflective member DM1 may increase or decrease a length of an optical path connecting the first lens group G1 and the second lens group G2 to each other along the first optical axis C1, the second optical axis C2, the third optical axis C3, the fourth optical axis C4, and the fifth optical axis C5. For example, the length of the optical path connecting the first lens group G1 and the second lens group G2 to each other may decrease as the first movable reflective member DM1 moves closer to the first fixed reflective member FM1, and may increase as the first movable reflective member DM1 moves farther from the first fixed reflective member FM1.

The first optical path folding unit M1 configured as described above may bypass a portion of a straight-line optical path connecting the first lens group G1 and the second lens group G2 to each other. In addition, the first optical path folding unit M1 may increase or decrease the length of the optical path connecting the first lens group G1 and the second lens group G2 to each other as described above. Therefore, in the camera module 400, a focus and a magnification may be adjusted through the first optical path folding unit M1.

The second optical path folding unit M2 is disposed between the second lens group G2 and the image sensor IP. The second optical path folding unit M2 may include a second fixed reflective member FM2 and a second movable reflective member DM2.

The second fixed reflective member FM2 may be disposed on a virtual straight line connecting the fifth optical axis C5 of the second lens group G2 to a ninth optical axis C9 of the image sensor IP. In other words, the ninth optical axis C9 of the image sensor IP may be coaxial with the fifth optical axis C5 of the second lens group G2. The second fixed reflective member FM2 may include a plurality of reflective surfaces. For example, the second fixed reflective member FM2 may include a third fixed reflective surface FMS3 and a fourth fixed reflective surface FMS4. The third fixed reflective surface FMS3 may reflect light emitted from the fifth lens 450 in a direction intersecting the fifth optical axis C5. For example, the third fixed reflective surface FMS3 may reflect light incident along the fifth optical axis C5 in a sixth optical axis C6 direction intersecting the fifth optical axis C5. The fourth fixed reflective surface FMS4 may reflect light emitted from the second movable reflective member DM2 to the image sensor IP. For example, the fourth fixed reflective surface FMS4 may reflect light incident along an eighth optical axis C8 in the ninth optical axis C9 direction intersecting the eighth optical axis C8.

The second movable reflective member DM2 may be disposed on one side of the second fixed reflective member FM2. For example, the second movable reflective member DM2 may be disposed on the sixth optical axis C6 and the eighth optical axis C8. The second movable reflective member DM2 may move along the sixth optical axis C6 and the eighth optical axis C8. For example, the second movable reflective member DM2 may be moved to be near to the second fixed reflective member FM2 or be moved to be far from the second fixed reflective member FM2 by a second driving unit. The second movable reflective member DM2 may include a plurality of reflective surfaces. For example, the second movable reflective member DM2 may include a third movable reflective surface DMS3 and a fourth movable reflective surface DMS4. The third movable reflective surface DMS3 may reflect light incident along the sixth optical axis C6 in a seventh optical axis C7 direction, and the fourth movable reflective surface DMS4 may reflect light incident along the seventh optical axis C7 in the eighth optical axis direction C8 to the fourth fixed reflective surface FMS4. The second movable reflective member DM2 may increase or decrease a length of an optical path connecting the second lens group G2 and the image sensor IP to each other along the fifth optical axis C5, the sixth optical axis C6, the seventh optical axis C7, the eighth optical axis C8, and the ninth optical axis C9. For example, the length of the optical path connecting the second lens group G2 and the image sensor IP to each other may decrease as the second movable reflective member DM2 moves closer to the second fixed reflective member FM2, and may increase as the second movable reflective member DM2 moves farther from the second fixed reflective member FM2.

The second optical path folding unit M2 configured as described above may bypass a portion of a straight-line optical path connecting the second lens group G2 and the image sensor IP to each other. In addition, the second optical path folding unit M2 may increase or decrease the length of the optical path connecting the second lens group G2 and the image sensor IP to each other as described above. Therefore, in the camera module 400, a focus and a magnification may be adjusted through the second optical path folding unit M2.

The filter IF may be disposed on an object side of the image sensor IP. The filter IF may filter light of a specific range of wavelengths included in incident light. For example, the filter IF may be configured to filter infrared rays.

The image sensor IP may be configured to convert an incident optical signal into an electric signal. The image sensor IP may include a plurality of optical sensors. The image sensor IP can be manufactured in a CCD form. However, a form of the image sensor IP is not limited to the CCD form.

The camera module 400, may perform image capturing in two modes. For example, the camera module 400 may have a first mode of capturing an image of a subject located at a middle distance, and a second mode of capturing an image of a subject located at a long distance. Alternatively, the camera module 400 may have a first mode of magnifying a subject at a first magnification and capturing an image of the magnified subject at the first magnification, and a second mode of magnifying a subject at a second magnification greater than the first magnification and capturing an image of the magnified subject at the second magnification. However, an image capturing mode of the camera module 400 is not limited to two modes. For example, the camera module 400 may also perform image capturing during an operation in which the first mode is switched to the second mode or an operation in which the second mode is switched to the first mode, as well as in the first and second modes.

First, the first mode of the camera module 400 will be described with reference to FIG. 13.

The first mode of the camera module 400 may be a mode in which the length of the optical path between the first lens group G1 and the second lens group G2 is increased by as much as possible. For example, in the first mode, the length of the optical path between the first lens group G1 and the second lens group G2 may be increased by as much as possible by increasing a distance between the first fixed reflective member FM1 and the first movable reflective member DM1. In addition, in the first mode, a focus of the camera module 400 may be adjusted while decreasing a distance between the second fixed reflective member FM2 and the second movable reflective member DM2. The camera module 400 in the first mode may capture an image of the subject located at a middle distance, or may magnify the subject at the first magnification and capture an image of the magnified subject at the first magnification, as described above.

FIG. 15 shows curves representing aberration characteristics of the camera module 400 in the first mode illustrated in FIG. 13.

Next, the second mode of the camera module 400 will be described with reference to FIG. 14.

The second mode of the camera module 400 may be a mode in which the length of the optical path between the second lens group G2 and the image sensor IP is increased by as much as possible. For example, in the second mode, the length of the optical path between the second lens group G2 and the image sensor IP may be increased by as much as possible by increasing a distance between the second fixed reflective member FM2 and the second movable reflective member DM2. In addition, in the second mode, a focus of the camera module 400 may be adjusted while decreasing the distance between the first fixed reflective member FM1 and the first movable reflective member DM1. The camera module 400 in the second mode may capture an image of the subject located at a long distance, or may magnify the subject at the second magnification greater than the first magnification and capture an image of the magnified subject at the second magnification, as described above.

FIG. 16 shows curves representing aberration characteristics of the camera module 400 in the second mode illustrated in FIG. 14.

The camera module 400 configured as described above may capture images of the subjects located at a middle distance and a long distance, or may magnify the subjects at a plurality of magnifications and capture images of the magnified subjects at the plurality of magnifications, through the plurality of optical path folding units M1 and M2. Furthermore, in the camera module 400, a folded optical path may be formed inside the camera module 400 as illustrated in FIGS. 13 and 14, and the camera module 400 may thus be miniaturized.

Table 7 below lists characteristics of the lenses and other elements of the camera module 400, and Table 8 below lists aspherical constants of surfaces of the lenses of the camera module 400. As can be seen from Table 8, all of the first to fifth lenses of the camera module 400 may have spherical surfaces.

TABLE 7

| Surface No. | Element | Radius of Curvature | Thickness/ Distance (First Mode) | Thickness/ Distance (Second Mode) | Refractive Index | Abbe Number |
|---|---|---|---|---|---|---|
| S1 | Prism | Infinity | 6.000 | 6.000 | 1.717 | 29.50 |
| S2 | | Infinity | 6.000 | 6.000 | 1.717 | 29.50 |
| S3 | | Infinity | 3.098 | 3.098 | | |
| S4 | First | 14.611 | 2.750 | 2.750 | 1.660 | 20.40 |
| S5 | Lens | 17.861 | 1.837 | 1.837 | | |
| S6 | Second | 56.742 | 0.650 | 0.650 | 1.560 | 37.30 |
| S7 | Lens | 21.744 | 6.500 | 6.500 | | |

TABLE 7-continued

| Surface No. | Element | Radius of Curvature | Thickness/ Distance (First Mode) | Thickness/ Distance (Second Mode) | Refractive Index | Abbe Number |
|---|---|---|---|---|---|---|
| S8 | FMS1 | Infinity | 24.000 | 7.800 | | |
| S9 | DMS1 | Infinity | 9.000 | 9.000 | | |
| S10 | DMS2 | Infinity | 24.000 | 7.800 | | |
| S11 | FMS2 | Infinity | 5.000 | 5.000 | | |
| S12 | Third | 7.600 | 2.973 | 2.973 | 1.544 | 56.00 |
| S13 | Lens | 6.508 | 0.566 | 0.566 | | |
| S14 | Fourth | 10.532 | 0.650 | 0.650 | 1.615 | 25.90 |
| S15 | Lens | 6.694 | 0.550 | 0.550 | | |
| S16 | Fifth | 7.349 | 2.660 | 2.660 | 1.544 | 56.00 |
| S17 | Lens | 55.937 | 5.000 | 5.000 | | |
| S18 | FMS3 | Infinity | 11.000 | 17.800 | | |
| S19 | DMS3 | Infinity | 8.000 | 8.000 | | |
| S20 | DMS4 | Infinity | 11.000 | 17.800 | | |
| S21 | FMS4 | Infinity | 5.000 | 5.000 | | |
| S22 | Filter | Infinity | 0.220 | 0.220 | 1.516 | 64.10 |
| S23 | | Infinity | 5.746 | 5.746 | | |
| S24 | Imaging Plane | Infinity | 0.000 | 0.000 | | |

TABLE 8

| | Surface No. | | | | |
|---|---|---|---|---|---|
| | S4 | S5 | S6 | S7 | S12 |
| k | 0 | 0 | 0 | 0 | 0 |
| A | 0 | 0 | 0 | 0 | 0 |
| B | 0 | 0 | 0 | 0 | 0 |
| C | 0 | 0 | 0 | 0 | 0 |
| D | 0 | 0 | 0 | 0 | 0 |
| E | 0 | 0 | 0 | 0 | 0 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

| | Surface No. | | | | |
|---|---|---|---|---|---|
| | S13 | S14 | S15 | S16 | S17 |
| k | 0 | 0 | 0 | 0 | 0 |
| A | 0 | 0 | 0 | 0 | 0 |
| B | 0 | 0 | 0 | 0 | 0 |
| C | 0 | 0 | 0 | 0 | 0 |
| D | 0 | 0 | 0 | 0 | 0 |
| E | 0 | 0 | 0 | 0 | 0 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

Figure 17:
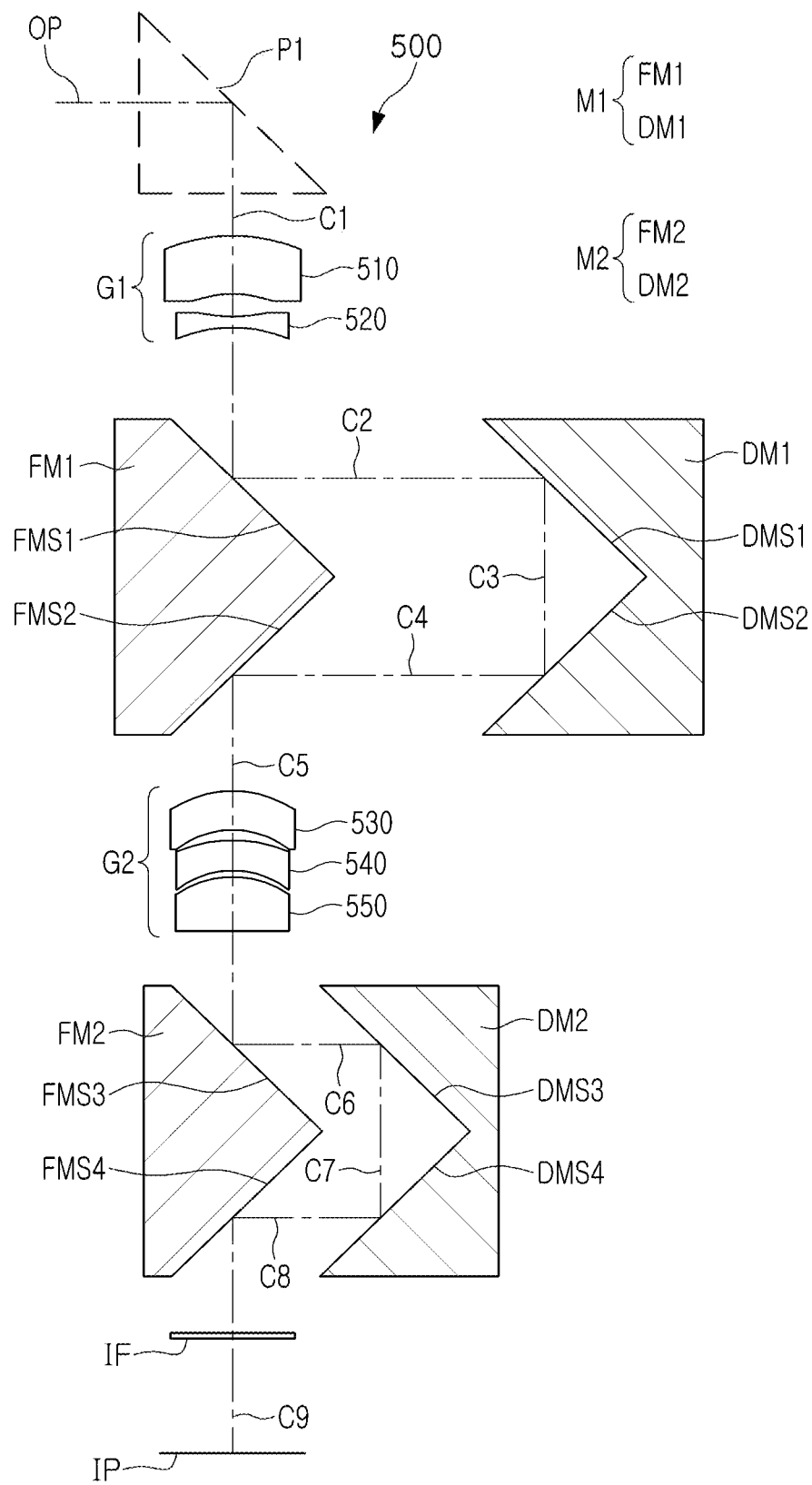
FIG. 17 is a diagram of a fifth example of a camera module in a first mode having a first magnification.
Figure 18:
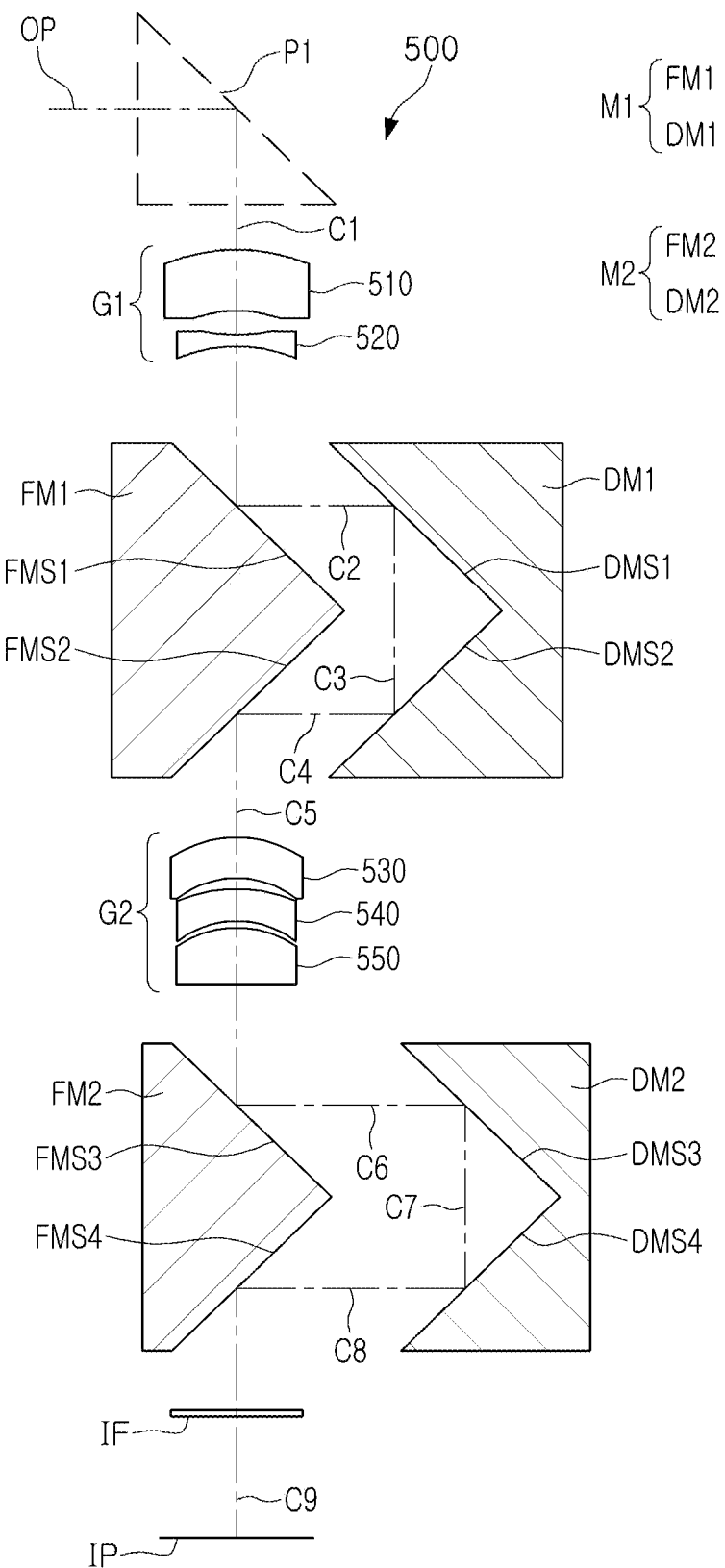
FIG. 18 is a diagram of the fifth example of the camera module in a second mode having a second magnification greater than the first magnification.
Figure 19:
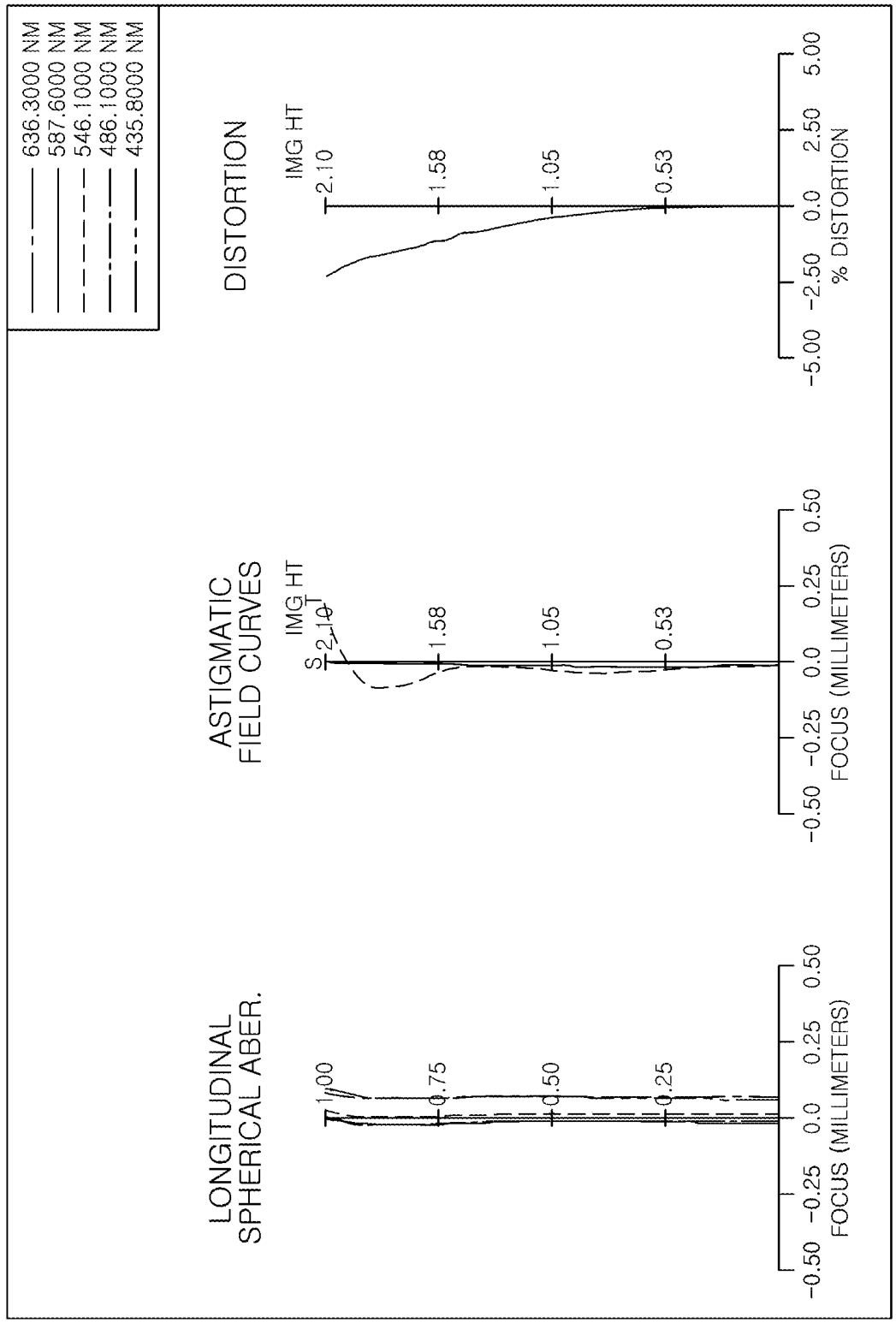
FIG. 19 shows curves representing aberration characteristics of the fifth example of the camera module in the first mode illustrated in FIG. 17.
Figure 20:
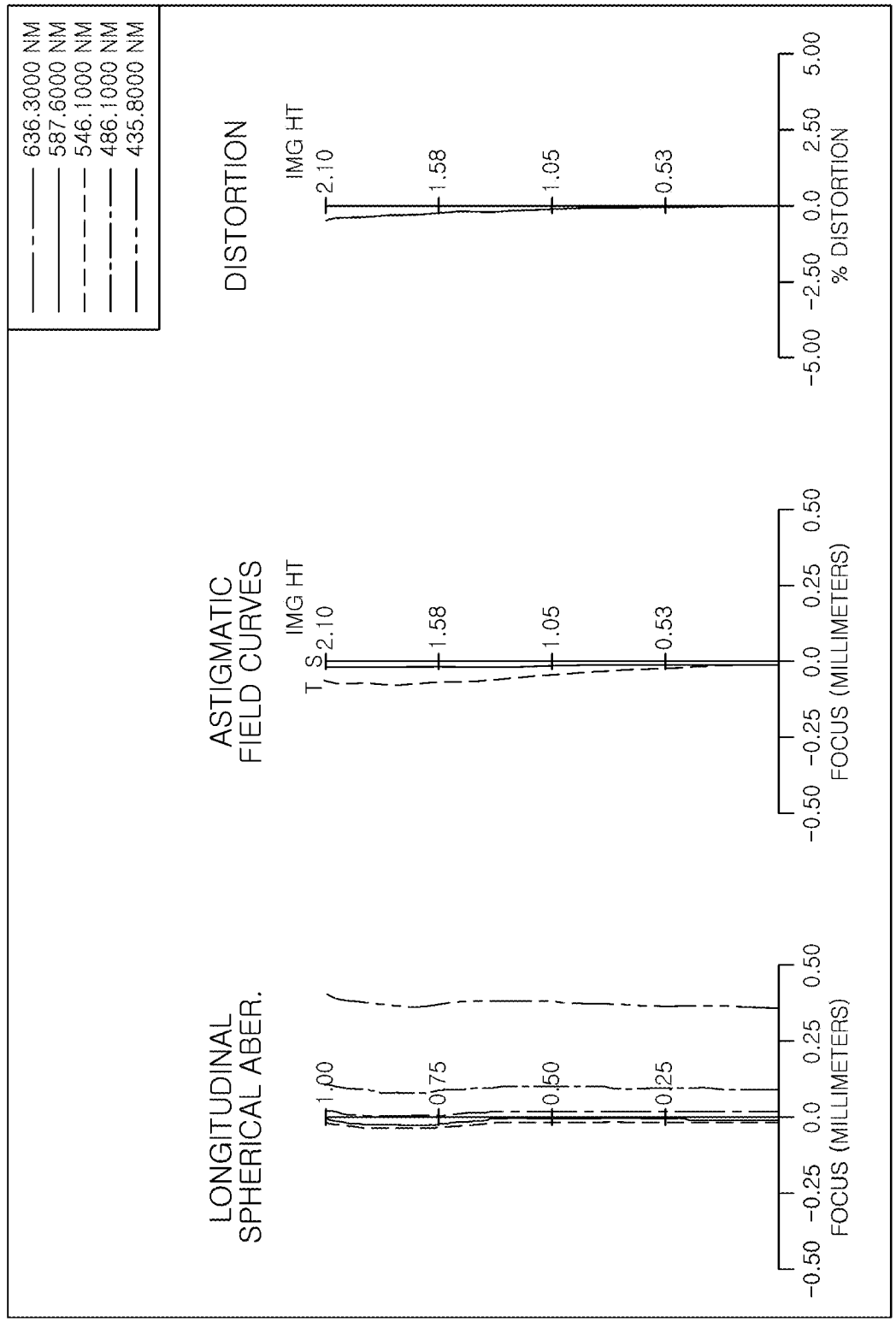
FIG. 20 shows curves representing aberration characteristics of the fifth example of the camera module in the second mode illustrated in FIG. 18.

FIG. 17 is a diagram of a fifth example of a camera module in a first mode having a first magnification, FIG. 18 is a diagram of the fifth example of the camera module in a second mode having a second magnification greater than the first magnification, FIG. 19 shows curves representing aberration characteristics of the fifth example of the camera module in the first mode illustrated in FIG. 17, and FIG. 20 shows curves representing aberration characteristics of the fifth example of the camera module in the second mode illustrated in FIG. 18.

Referring to FIGS. 17 and 18, a camera module 500 may include a prism P, a first lens group G1, a second lens group G2, a first optical path folding unit M1, a second optical path folding unit M2, a filter IF, and an image sensor IP having an imaging surface disposed at an imaging plane of the camera module 500.

The prism P may be disposed in an opening of the camera module 500. The prism P may convert a path of light incident from one side of the camera module 500 into a length direction of the camera module 500. For example, a path OP of light reflected from an object may be changed into a first optical axis C1 direction by the prism P. The first optical axis C1 is an optical axis of the first lens group G1.

The first lens group G1 may be disposed on an image side of the prism P and may include a first lens 510 and a second lens 520. The first lens 510 may have a positive refractive power, and an object-side surface thereof may be convex while an image-side surface thereof may be concave. The second lens 520 may have a negative refractive power, and an object-side surface thereof may be concave and an image-side surface thereof may be concave.

The second lens group G2 may be disposed on an image side of the first lens group G1 and may include a third lens 530, a fourth lens 540, and a fifth lens 550. The third lens 530 may have a positive refractive power, and an object-side surface thereof may be convex while an image-side surface thereof may be concave. The fourth lens 540 may have a negative refractive power, and an object-side surface thereof may be convex while an image-side surface thereof may be concave. The fifth lens 550 may have a positive refractive power, and an object-side surface thereof may be convex while an image-side surface thereof may be concave.

The first optical path folding unit M1 may be disposed between the first lens group G1 and the second lens group G2. The first optical path folding unit M1 may include a first fixed reflective member FM1 and a first movable reflective member DM1.

The first fixed reflective member FM1 may be disposed between the first lens group G1 and the second lens group G2. In detail, the first fixed reflective member FM1 may be disposed on a virtual straight line connecting the first optical axis C1 of the first lens group G1 to a fifth optical axis C5 of the second lens group G2. In other words, the fifth optical axis C5 of the second lens group G2 may be coaxial with the first optical axis C1 of the first lens group G1. The first fixed reflective member FM1 may include a plurality of reflective surfaces. For example, the first fixed reflective member FM1 may include a first fixed reflective surface FMS1 and a second fixed reflective surface FMS2. The first fixed reflective surface FMS1 may reflect light emitted from the second lens 520 in a direction intersecting the first optical axis C1. For example, the first fixed reflective surface FMS1 may reflect light incident along the first optical axis C1 in a second optical axis C2 direction intersecting the first optical axis C1. The second fixed reflective surface FMS2 may reflect light emitted from the first movable reflective member DM1 to the second lens group G2. For example, the second fixed reflective surface FMS2 may reflect light incident along a fourth optical axis C4 in the fifth optical axis C5 direction intersecting the fourth optical axis C4.

The first movable reflective member DM1 may be disposed on one side of the first fixed reflective member FM1. For example, the first movable reflective member DM1 may be disposed on the second optical axis C2 and the fourth optical axis C4. The first movable reflective member DM1 may move along the second optical axis C2 and the fourth optical axis C4. For example, the first movable reflective member DM1 may be moved to be near to the first fixed reflective member FM1 or be moved to be far from the first fixed reflective member FM1 by a first driving unit. The first movable reflective member DM1 may include a plurality of reflective surfaces. For example, the first movable reflective member DM1 may include a first movable reflective surface DMS1 and a second movable reflective surface DMS2. The first movable reflective surface DMS1 may reflect light incident along the second optical axis C2 in a third optical axis C3 direction, and the second movable reflective surface DMS2 may reflect light incident along the third optical axis C3 in the fourth optical axis C4 direction to the second fixed reflective surface FMS2. The first movable reflective member DM1 may increase or decrease a length of an optical path connecting the first lens group G1 and the second lens group G2 to each other along the first optical axis C1, the second optical axis C2, the third optical axis C3, the fourth optical axis C4, and the fifth optical axis C5. For example, the length of the optical path connecting the first lens group G1 and the second lens group G2 to each other may decrease as the first movable reflective member DM1 moves closer to the first fixed reflective member FM1, and may increase as the first movable reflective member DM1 moves farther from the first fixed reflective member FM1.

The first optical path folding unit M1 configured as described above may bypass a portion of a straight-line optical path connecting the first lens group G1 and the second lens group G2 to each other. In addition, the first optical path folding unit M1 may increase or decrease the length of the optical path connecting the first lens group G1 and the second lens group G2 to each other as described above. Therefore, in the camera module 500, a focus and a magnification may be adjusted through the first optical path folding unit M1.

The second optical path folding unit M2 is disposed between the second lens group G2 and the image sensor IP. The second optical path folding unit M2 may include a second fixed reflective member FM2 and a second movable reflective member DM2.

The second fixed reflective member FM2 may be disposed on a virtual straight line connecting the fifth optical axis C5 of the second lens group G2 to a ninth optical axis C9 of the image sensor IP. In other words, the ninth optical axis C9 of the image sensor IP may be coaxial with the fifth optical axis C5 of the second lens group G2. The second fixed reflective member FM2 may include a plurality of reflective surfaces. For example, the second fixed reflective member FM2 may include a third fixed reflective surface FMS3 and a fourth fixed reflective surface FMS4. The third fixed reflective surface FMS3 may reflect light emitted from the fifth lens 550 in a direction intersecting the fifth optical axis C5. For example, the third fixed reflective surface FMS3 may reflect light incident along the fifth optical axis C5 in a sixth optical axis C6 direction intersecting the fifth optical axis C5. The fourth fixed reflective surface FMS4 may reflect light emitted from the second movable reflective member DM2 to the image sensor IP. For example, the fourth fixed reflective surface FMS4 may reflect light incident along an eighth optical axis C8 in the ninth optical axis C9 direction intersecting the eighth optical axis C8.

The second movable reflective member DM2 may be disposed on one side of the second fixed reflective member FM2. For example, the second movable reflective member DM2 may be disposed on the sixth optical axis C6 and the eighth optical axis C8. The second movable reflective member DM2 may move along the sixth optical axis C6 and the eighth optical axis C8. For example, the second movable reflective member DM2 may be moved to be near to the second fixed reflective member FM2 or be moved to be far from the second fixed reflective member FM2 by a second driving unit. The second movable reflective member DM2 may include a plurality of reflective surfaces. For example, the second movable reflective member DM2 may include a third movable reflective surface DMS3 and a fourth movable reflective surface DMS4. The third movable reflective surface DMS3 may reflect light incident along the sixth optical axis C6 in a seventh optical axis C7 direction, and the fourth movable reflective surface DMS4 may reflect light incident along the seventh optical axis C7 in the eighth optical axis direction C8 to the fourth fixed reflective surface FMS4. The second movable reflective member DM2 may increase or decrease a length of an optical path connecting the second lens group G2 and the image sensor IP to each other along the fifth optical axis C5, the sixth optical axis C6, the seventh optical axis C7, the eighth optical axis C8, and the ninth optical axis C9. For example, the length of the path connecting the second lens group G2 and the image sensor IP to each other may decrease as the second movable reflective member DM2 moves closer to the second fixed reflective member FM2, and may increase as the second movable reflective member DM2 moves farther from the second fixed reflective member FM2.

The second optical path folding unit M2 configured as described above may bypass a portion of a straight-line optical path connecting the second lens group G2 and the image sensor IP to each other. In addition, the second optical path folding unit M2 may increase or decrease the length of the optical path connecting the second lens group G2 and the image sensor IP to each other as described above. Therefore, in the camera module 500, a focus and a magnification may be adjusted through the second optical path folding unit M2.

The filter IF may be disposed on an object side of the image sensor IP. The filter IF may filter light of a specific range of wavelengths included in incident light. For example, the filter IF may be configured to filter infrared rays.

The image sensor IP may be configured to convert an incident optical signal into an electric signal. The image sensor IP may include a plurality of optical sensors. The image sensor IP can be manufactured in a CCD form. However, a form of the image sensor IP is not limited to the CCD form.

The camera module 500, may perform image capturing in two modes. For example, the camera module 500 may have a first mode of capturing an image of a subject located at a middle distance, and a second mode of capturing an image of a subject located at a long distance. Alternatively, the camera module 500 may have a first mode of magnifying a subject at a first magnification and capturing an image of the magnified subject at the first magnification, and a second mode of magnifying a subject at a second magnification greater than the first magnification and capturing an image of the magnified subject at the second magnification. However, an image capturing mode of the camera module 500 is not limited to two modes. For example, the camera module 500 may also perform image capturing during an operation in which the first mode is switched to the second mode or an operation in which the second mode is switched to the first mode, as well as in the first and second modes.

First, the first mode of the camera module 500 will be described with reference to FIG. 17.

The first mode of the camera module 500 may be a mode in which the length of the optical path between the first lens group G1 and the second lens group G2 is increased by as much as possible. For example, in the first mode, the length of the optical path between the first lens group G1 and the second lens group G2 may be increased by as much as possible by increasing a distance between the first fixed reflective member FM1 and the first movable reflective member DM1. In addition, in the first mode, a focus of the camera module 500 may be adjusted while decreasing a distance between the second fixed reflective member FM2 and the second movable reflective member DM2. The camera module 500 in the first mode may capture an image of the subject located at a middle distance, or may magnify the subject at the first magnification and capture an image of the magnified subject at the first magnification, as described above.

FIG. 19 shows curves representing aberration characteristics of the camera module 500 in the first mode illustrated in FIG. 17.

Next, the second mode of the camera module 500 will be described with reference to FIG. 18.

The second mode of the camera module 500 may be a mode in which the length of the optical path between the second lens group G2 and the image sensor IP is increased by as much as possible. For example, in the second mode, the length of the optical path between the second lens group G2 and the image sensor IP may be increased by as much as possible by increasing a distance between the second fixed reflective member FM2 and the second movable reflective member DM2. In addition, in the second mode, a focus of the camera module 500 may be adjusted while decreasing the distance between the first fixed reflective member FM1 and the first movable reflective member DM1. The camera module 500 in the second mode may capture an image of the subject located at a long distance, or may magnify the subject at the second magnification greater than the first magnification and capture an image of the magnified subject at the second magnification, as described above.

FIG. 20 shows curves representing aberration characteristics of the camera module 500 in the second mode illustrated in FIG. 18.

The camera module 500 configured as described above may capture images of the subjects located at a middle distance and a long distance, or may magnify the subjects at a plurality of magnifications and capture images of the magnified subjects at the plurality of magnifications, through the plurality of optical path folding units M1 and M2. Furthermore, in the camera module 500, a folded optical path may be formed inside the camera module 500 as illustrated in FIGS. 17 and 18, and the camera module 500 may thus be miniaturized.

Table 9 below lists characteristics of the lenses and other elements of the camera module 500, and Table 10 below lists aspherical constants of surfaces of the lenses of the camera module 500.

TABLE 9

| Surface No. | Element | Radius of Curvature | Thickness/ Distance (First Mode) | Thickness/ Distance (Second Mode) | Refractive Index | Abbe Number |
|---|---|---|---|---|---|---|
| S1 | Prism | Infinity | 4.000 | 4.000 | 1.717 | 29.50 |
| S2 | | Infinity | 4.000 | 4.000 | 1.717 | 29.50 |
| S3 | | Infinity | 1.942 | 1.942 | | |
| S4 | First | 8.000 | 2.602 | 2.602 | 1.574 | 37.40 |
| S5 | Lens | 9.123 | 0.850 | 0.850 | | |
| S6 | Second | −581.950 | 0.650 | 0.650 | 1.544 | 56.00 |
| S7 | Lens | 9.093 | 6.500 | 6.500 | | |
| S8 | FMS1 | Infinity | 14.000 | 6.800 | | |
| S9 | DMS1 | Infinity | 9.000 | 9.000 | | |
| S10 | DMS2 | Infinity | 14.000 | 6.800 | | |
| S11 | FMS2 | Infinity | 5.000 | 5.000 | | |
| S12 | Third | 5.003 | 1.732 | 1.732 | 1.544 | 56.00 |
| S13 | Lens | 4.499 | 0.487 | 0.487 | | |
| S14 | Fourth | 7.599 | 1.293 | 1.293 | 1.608 | 27.40 |
| S15 | Lens | 4.387 | 0.320 | 0.320 | | |
| S16 | Fifth | 4.827 | 2.274 | 2.274 | 1.544 | 56.00 |
| S17 | Lens | 26.925 | 5.000 | 5.000 | | |

TABLE 9-continued

| Surface No. | Element | Radius of Curvature | Thickness/ Distance (First Mode) | Thickness/ Distance (Second Mode) | Refractive Index | Abbe Number |
|---|---|---|---|---|---|---|
| S18 | FMS3 | Infinity | 6.500 | 17.806 | | |
| S19 | DMS3 | Infinity | 8.000 | 8.000 | | |
| S20 | DMS4 | Infinity | 6.500 | 17.806 | | |
| S21 | FMS4 | Infinity | 5.000 | 5.000 | | |
| S22 | Filter | Infinity | 0.220 | 0.220 | 1.516 | 64.10 |
| S23 | | Infinity | 5.156 | 5.156 | | |
| S24 | Imaging Plane | Infinity | 0.000 | 0.000 | | |

TABLE 10

| | Surface No. | | | | |
|---|---|---|---|---|---|
| | S4 | S5 | S6 | S7 | S12 |
| k | 0 | 0 | 0 | 0 | 0 |
| A | 6.251E−05 | 1.523E−05 | 9.862E−05 | 2.454E−04 | 2.170E−05 |
| B | 8.872E−06 | 1.394E−05 | 2.337E−05 | 5.826E−05 | 7.395E−06 |
| C | 3.271E−07 | 8.202E−07 | 6.330E−06 | −2.079E−06 | 1.216E−07 |
| D | −1.050E−07 | 6.717E−07 | 7.526E−07 | 5.121E−07 | 1.076E−07 |
| E | 6.416E−09 | 1.614E−08 | 7.126E−19 | −3.718E−19 | −9.652E−09 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

| | Surface No. | | | | |
|---|---|---|---|---|---|
| | S13 | S14 | S15 | S16 | S17 |
| k | 0 | 0 | 0 | 0 | 0 |
| A | −2.420E−05 | −7.384E−06 | 8.626E−06 | 2.806E−05 | 1.113E−05 |
| B | −2.521E−06 | −7.931E−06 | 4.340E−06 | 2.420E−06 | 3.297E−07 |
| C | 1.113E−06 | −1.801E−06 | 1.206E−06 | −7.959E−07 | −3.734E−06 |
| D | −5.741E−08 | 4.854E−07 | −2.183E−07 | −1.095E−06 | −5.708E−07 |
| E | 1.891E−18 | −4.592E−19 | 2.215E−18 | −4.439E−18 | 2.403E−18 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

Figure 21:
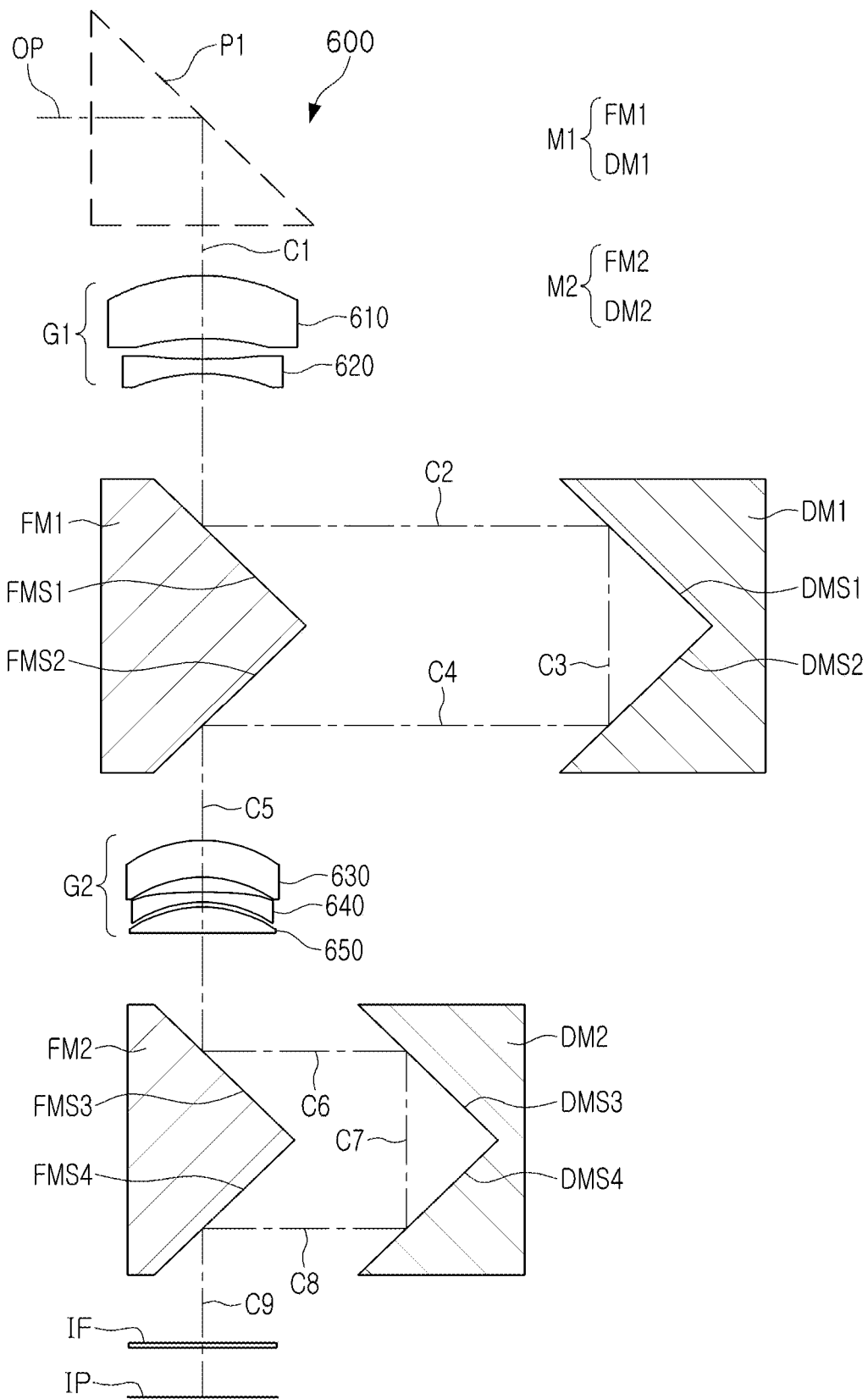
FIG. 21 is a diagram of a sixth example of a camera module in a first mode having a first magnification.
Figure 22:
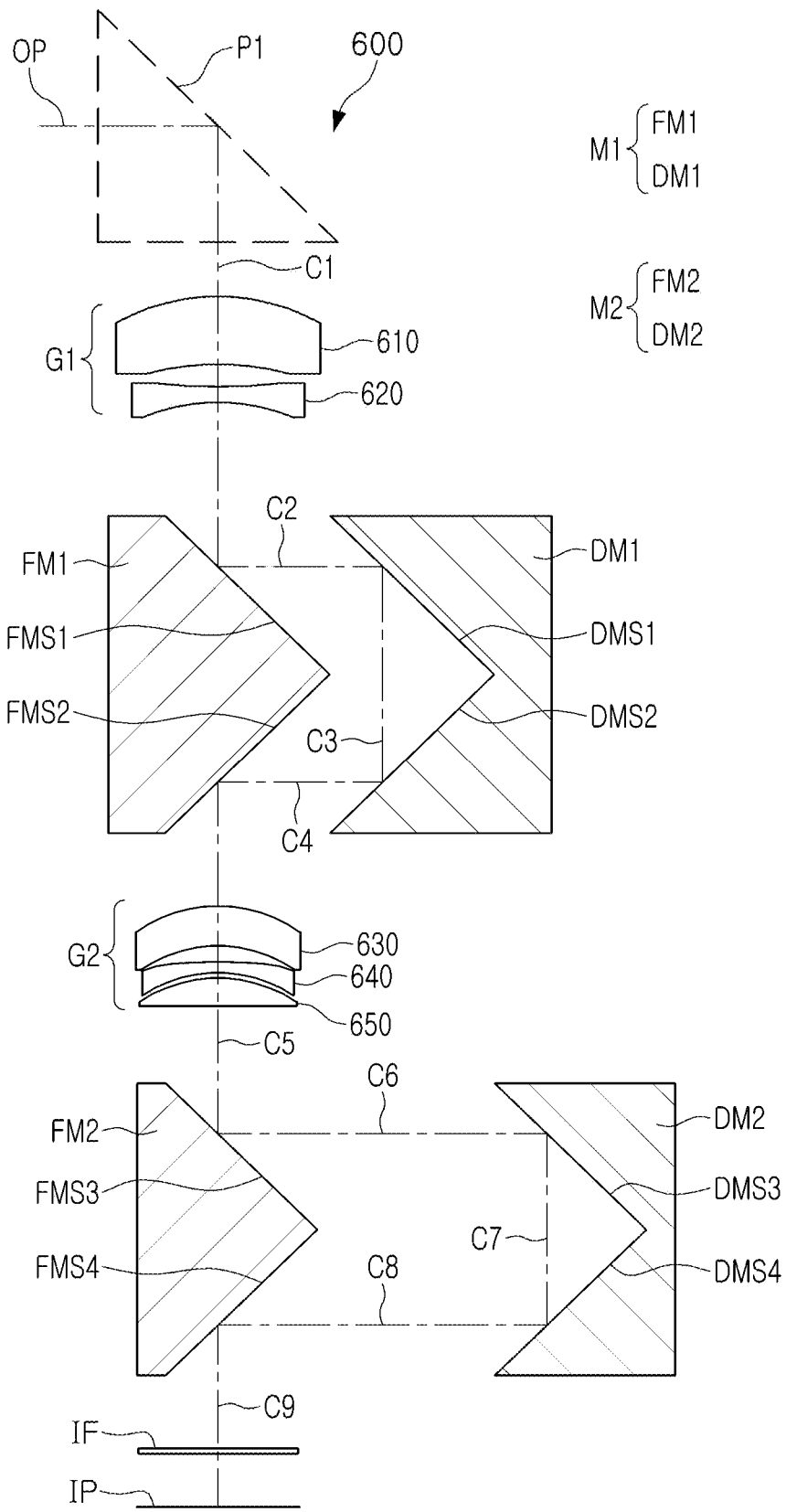
FIG. 22 is a diagram of the sixth example of the camera module in a second mode having a second magnification greater than the first magnification.
Figure 23:
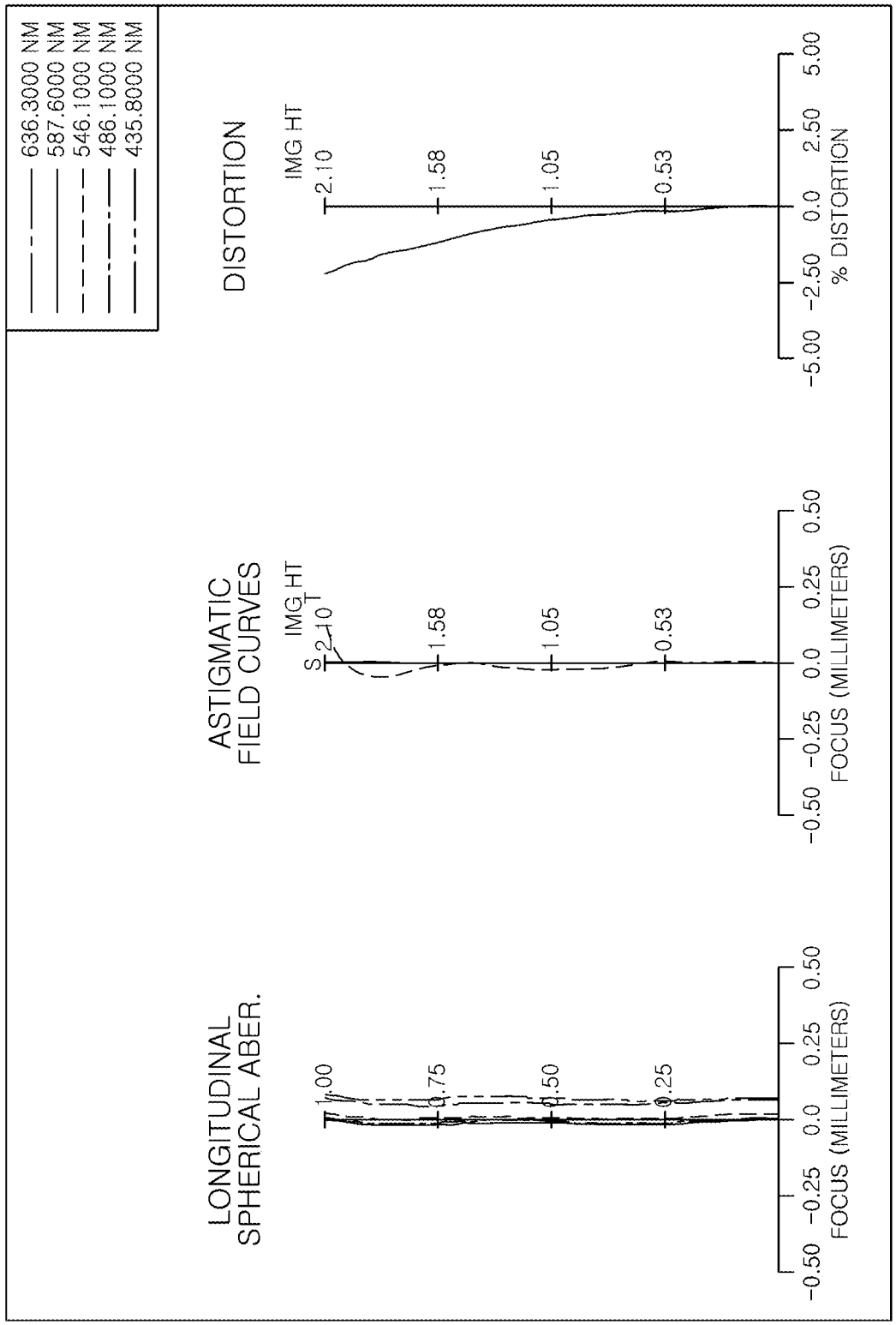
FIG. 23 shows curves representing aberration characteristics of the sixth example of the camera module in the first mode illustrated in FIG. 21.
Figure 24:
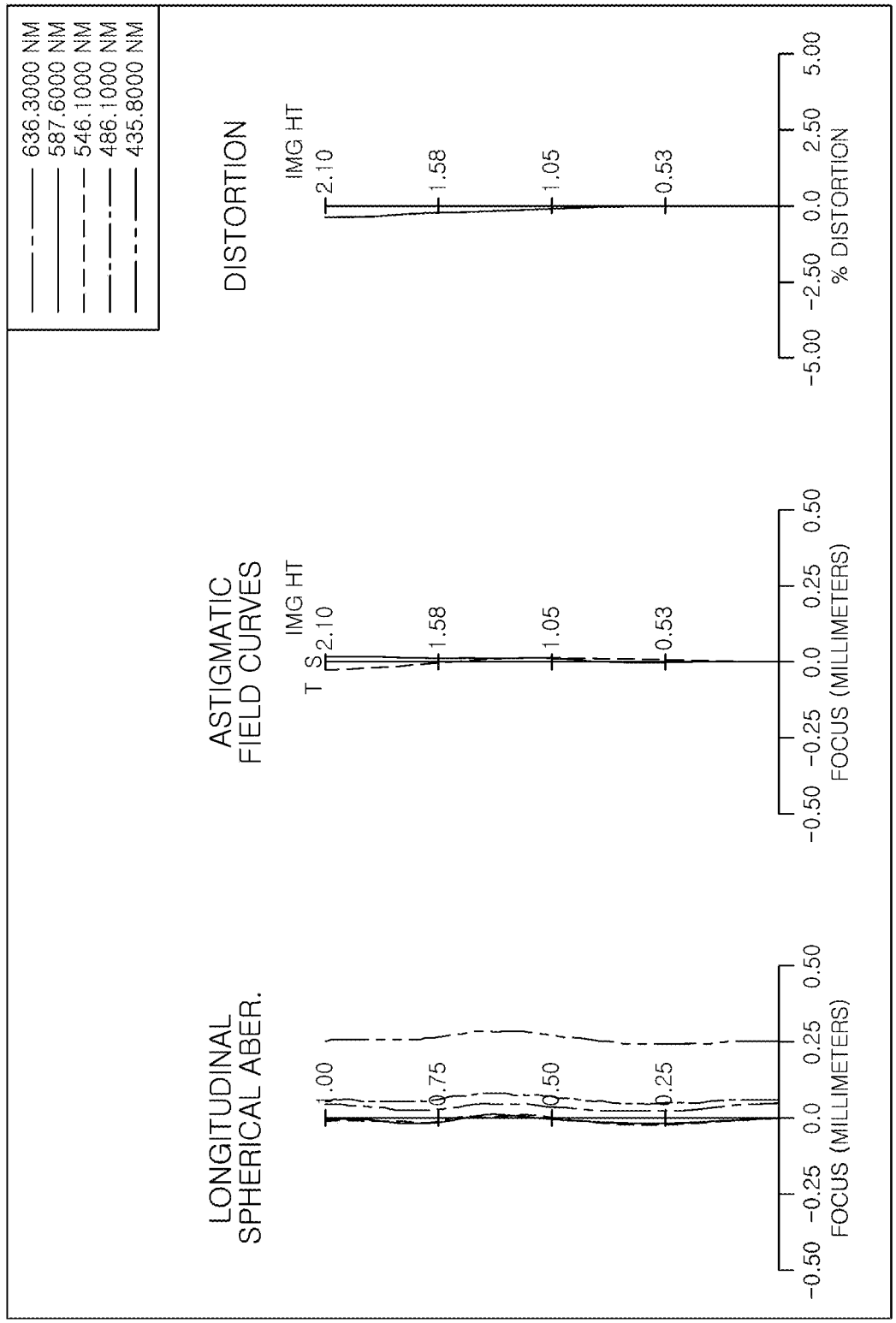
FIG. 24 shows curves representing aberration characteristics of the sixth example of the camera module in the second mode illustrated in FIG. 22.

FIG. 21 is a diagram of a sixth example of a camera module in a first mode having a first magnification, FIG. 22 is a diagram of the sixth example of the camera module in a second mode having a second magnification greater than the first magnification, FIG. 23 shows curves representing aberration characteristics of the sixth example of the camera module in the first mode illustrated in FIG. 21, and FIG. 24 shows curves representing aberration characteristics of the sixth example of the camera module in the second mode illustrated in FIG. 22.

Referring to FIGS. 21 and 22, a camera module 600 may include a prism P, a first lens group G1, a second lens group G2, a first optical path folding unit M1, a second optical path folding unit M2, a filter IF, and an image sensor IP having an imaging surface disposed at an imaging plane of the camera module 600.

The prism P may be disposed in an opening of the camera module 600. The prism P may convert a path of light incident from one side of the camera module 600 into a length direction of the camera module 600. For example, a path OP of light reflected from an object may be changed into a first optical axis C1 direction by the prism P. The first optical axis C1 is an optical axis of the first lens group G1.

The first lens group G1 may be disposed on an image side of the prism P and may include a first lens 610 and a second lens 620. The first lens 610 may have a positive refractive power, and an object-side surface thereof may be convex while an image-side surface thereof may be concave. The second lens 620 may have a negative refractive power, and an object-side surface thereof may be concave and an image-side surface thereof may be concave.

The second lens group G2 may be disposed on an image side of the first lens group G1 and may include a third lens 630, a fourth lens 640, and a fifth lens 650. The third lens 630 may have a positive refractive power, and an object-side surface thereof may be convex while an image-side surface thereof may be concave. The fourth lens 640 may have a negative refractive power, and an object-side surface thereof may be convex while an image-side surface thereof may be concave. The fifth lens 650 may have a positive refractive power, and an object-side surface thereof may be convex while an image-side surface thereof may be concave.

The first optical path folding unit M1 may be disposed between the first lens group G1 and the second lens group G2. The first optical path folding unit M1 may include a first fixed reflective member FM1 and a first movable reflective member DM1.

The first fixed reflective member FM1 may be disposed between the first lens group G1 and the second lens group G2. In detail, the first fixed reflective member FM1 may be disposed on a virtual straight line connecting the first optical axis C1 of the first lens group G1 to a fifth optical axis C5 of the second lens group G2. In other words, the fifth optical axis C5 of the second lens group G2 may be coaxial with the first optical axis C1 of the first lens group G1. The first fixed reflective member FM1 may include a plurality of reflective surfaces. For example, the first fixed reflective member FM1 may include a first fixed reflective surface FMS1 and a second fixed reflective surface FMS2. The first fixed reflective surface FMS1 may reflect light emitted from the second lens 620 in a direction intersecting the first optical axis C1. For example, the first fixed reflective surface FMS1 may reflect light incident along the first optical axis C1 in a second optical axis C2 direction intersecting the first optical axis C1. The second fixed reflective surface FMS2 may reflect light emitted from the first movable reflective member DM1 to the second lens group G2. For example, the second fixed reflective surface FMS2 may reflect light incident along a fourth optical axis C4 in the fifth optical axis C5 direction intersecting the fourth optical axis C4.

The first movable reflective member DM1 may be disposed on one side of the first fixed reflective member FM1. For example, the first movable reflective member DM1 may be disposed on the second optical axis C2 and the fourth optical axis C4. The first movable reflective member DM1 may move along the second optical axis C2 and the fourth optical axis C4. For example, the first movable reflective member DM1 may be moved to be near to the first fixed reflective member FM1 or be moved to be far from the first fixed reflective member FM1 by a first driving unit. The first movable reflective member DM1 may include a plurality of reflective surfaces. For example, the first movable reflective member DM1 may include a first movable reflective surface DMS1 and a second movable reflective surface DMS2. The first movable reflective surface DMS1 may reflect light incident along the second optical axis C2 in a third optical axis C3 direction, and the second movable reflective surface DMS2 may reflect light incident along the third optical axis C3 in the fourth optical axis C4 direction to the second fixed reflective surface FMS2. The first movable reflective member DM1 may increase or decrease a length of an optical path connecting the first lens group G1 and the second lens group G2 to each other along the first optical axis C1, the second optical axis C2, the third optical axis C3, the fourth optical axis C4, and the fifth optical axis C5. For example, the length of the optical path connecting the first lens group G1 and the second lens group G2 to each other may decrease as the first movable reflective member DM1 moves closer to the first fixed reflective member FM1, and may increase as the first movable reflective member DM1 moves farther from the first fixed reflective member FM1.

The first optical path folding unit M1 configured as described above may bypass a portion of a straight-line optical path connecting the first lens group G1 and the second lens group G2 to each other. In addition, the first optical path folding unit M1 may increase or decrease the length of the optical path connecting the first lens group G1 and the second lens group G2 to each other as described above. Therefore, in the camera module 600, a focus and a magnification may be adjusted through the first optical path folding unit M1.

The second optical path folding unit M2 is disposed between the second lens group G2 and the image sensor IP. The second optical path folding unit M2 may include a second fixed reflective member FM2 and a second movable reflective member DM2.

The second fixed reflective member FM2 may be disposed on a virtual straight line connecting the fifth optical axis C5 of the second lens group G2 to a ninth optical axis C9 of the image sensor IP. In other words, the ninth optical axis C9 of the image sensor IP may be coaxial with the fifth optical axis C5 of the second lens group G2. The second fixed reflective member FM2 may include a plurality of reflective surfaces. For example, the second fixed reflective member FM2 may include a third fixed reflective surface FMS3 and a fourth fixed reflective surface FMS4. The third fixed reflective surface FMS3 may reflect light emitted from the fifth lens 650 in a direction intersecting the fifth optical axis C5. For example, the third fixed reflective surface FMS3 may reflect light incident along the fifth optical axis C5 in a sixth optical axis C6 direction intersecting the fifth optical axis C5. The fourth fixed reflective surface FMS4 may reflect light emitted from the second movable reflective member DM2 to the image sensor IP. For example, the fourth fixed reflective surface FMS4 may reflect light incident along an eighth optical axis C8 in the ninth optical axis C9 direction intersecting the eighth optical axis C8.

The second movable reflective member DM2 may be disposed on one side of the second fixed reflective member FM2. For example, the second movable reflective member DM2 may be disposed on the sixth optical axis C6 and the eighth optical axis C8. The second movable reflective member DM2 may move along the sixth optical axis C6 and the eighth optical axis C8. For example, the second movable reflective member DM2 may be moved to be near to the second fixed reflective member FM2 or be moved to be far from the second fixed reflective member FM2 by a second driving unit. The second movable reflective member DM2 may include a plurality of reflective surfaces. For example, the second movable reflective member DM2 may include a third movable reflective surface DMS3 and a fourth movable reflective surface DMS4. The third movable reflective surface DMS3 may reflect light incident along the sixth optical axis C6 in a seventh optical axis C7 direction, and the fourth movable reflective surface DMS4 may reflect light incident along the seventh optical axis C7 in the eighth optical axis direction C8 to the fourth fixed reflective surface FMS4. The second movable reflective member DM2 may increase or decrease a length of an optical path connecting the second lens group G2 and the image sensor IP to each other along the fifth optical axis C5, the sixth optical axis C6, the seventh optical axis C7, the eighth optical axis C8, and the ninth optical axis C9. For example, the length of the optical path connecting the second lens group G2 and the image sensor IP to each other may decrease as the second movable reflective member DM2 moves closer to the second fixed reflective member FM2, and may increase as the second movable reflective member DM2 moves farther from the second fixed reflective member FM2.

The second optical path folding unit M2 configured as described above may bypass a portion of a straight-line optical path connecting the second lens group G2 and the image sensor IP to each other. In addition, the second optical path folding unit M2 may increase or decrease the length of the optical path connecting the second lens group G2 and the image sensor IP to each other as described above. Therefore, in the camera module 600, a focus and a magnification may be adjusted through the second optical path folding unit M2.

The filter IF may be disposed on an object side of the image sensor IP. The filter IF may filter light of a specific range of wavelengths included in incident light. For example, the filter IF may be configured to filter infrared rays.

The image sensor IP may be configured to convert an incident optical signal into an electric signal. The image sensor IP may include a plurality of optical sensors. The image sensor IP can be manufactured in a CCD form. However, a form of the image sensor IP is not limited to the CCD form.

The camera module 600 may perform image capturing in two modes. For example, the camera module 600 may have a first mode of capturing an image of a subject located at a middle distance, and a second mode of capturing an image of a subject located at a long distance. Alternatively, the camera module 600 may have a first mode of magnifying a subject at a first magnification and capturing an image of the magnified subject at the first magnification, and a second mode of magnifying a subject at a second magnification greater than the first magnification and capturing an image of the magnified subject at the second magnification. However, an image capturing mode of the camera module 600 is not limited to two modes. For example, the camera module 600 may also perform image capturing during an operation in which the first mode is switched to the second mode or an operation in which the second mode is switched to the first mode, as well as in the first and second modes.

First, the first mode of the camera module 600 will be described with reference to FIG. 21.

The first mode of the camera module 600 may be a mode in which the length of the optical path between the first lens group G1 and the second lens group G2 is increased by as much as possible. For example, in the first mode, the length of the optical path between the first lens group G1 and the second lens group G2 may be increased by as much as possible by increasing a distance between the first fixed reflective member FM1 and the first movable reflective member DM1. In addition, in the first mode, a focus of the camera module 600 may be adjusted while decreasing a distance between the second fixed reflective member FM2 and the second movable reflective member DM2. The camera module 600 in the first mode may capture an image of the subject located at a middle distance, or may magnify the subject at the first magnification and capture an image of the magnified subject at the first magnification, as described above.

FIG. 23 shows curves representing aberration characteristics of the camera module 600 in the first mode illustrated in FIG. 21.

Next, the second mode of the camera module 600 will be described with reference to FIG. 22.

The second mode of the camera module 600 may be a mode in which the length of the optical path between the second lens group G2 and the image sensor IP is increased by as much as possible. For example, in the second mode, the length of the optical path between the second lens group G2 and the image sensor IP may be increased by as much as possible by increasing a distance between the second fixed reflective member FM2 and the second movable reflective member DM2. In addition, in the second mode, a focus of the camera module 600 may be adjusted while decreasing the distance between the first fixed reflective member FM1 and the first movable reflective member DM1. The camera module 600 in the second mode may capture an image of the subject located at a long distance, or may magnify the subject at the second magnification greater than the first magnification and capture an image of the magnified subject at the second magnification, as described above.

FIG. 24 shows curves representing aberration characteristics of the camera module 600 in the second mode illustrated in FIG. 22.

The camera module 600 configured as described above may capture images of the subjects located at a middle distance and a long distance, or may magnify the subjects at a plurality of magnifications and capture images of the magnified subjects at the plurality of magnifications, through the plurality of optical path folding units M1 and M2. Furthermore, in the camera module 600, a folded optical path may be formed inside the camera module 600 as illustrated in FIGS. 21 and 22, and the camera module 600 may thus be miniaturized.

Table 11 below lists characteristics of the lenses and other elements of the camera module 600, and Table 12 below lists aspherical constants of surfaces of the lenses of the camera module 600.

TABLE 11

| Surface No. | Element | Radius of Curvature | Thickness/ Distance (First Mode) | Thickness/ Distance (Second Mode) | Refractive Index | Abbe Number |
|---|---|---|---|---|---|---|
| S1 | Prism | Infinity | 5.000 | 5.000 | 1.717 | 29.50 |
| S2 | | Infinity | 5.000 | 5.000 | 1.717 | 29.50 |
| S3 | | Infinity | 1.942 | 1.942 | | |
| S4 | First | 8.398 | 2.750 | 2.750 | 1.567 | 40.50 |
| S5 | Lens | 11.709 | 0.916 | 0.916 | | |
| S6 | Second | −41.072 | 0.650 | 0.650 | 1.544 | 56.00 |
| S7 | Lens | 10.862 | 6.500 | 6.500 | | |
| S8 | FMS1 | Infinity | 18.000 | 6.800 | | |
| S9 | DMS1 | Infinity | 9.000 | 9.000 | | |
| S10 | DMS2 | Infinity | 18.000 | 6.800 | | |
| S11 | FMS2 | Infinity | 5.000 | 5.000 | | |
| S12 | Third | 5.632 | 1.613 | 1.613 | 1.544 | 56.00 |
| S13 | Lens | 5.771 | 0.602 | 0.602 | | |
| S14 | Fourth | 12.495 | 0.400 | 0.400 | 1.596 | 30.60 |
| S15 | Lens | 5.868 | 0.320 | 0.320 | | |
| S16 | Fifth | 6.831 | 1.128 | 1.128 | 1.544 | 56.00 |
| S17 | Lens | 957.353 | 5.000 | 5.000 | | |
| S18 | FMS3 | Infinity | 9.000 | 13.500 | | |
| S19 | DMS3 | Infinity | 8.000 | 8.000 | | |
| S20 | DMS4 | Infinity | 9.000 | 13.500 | | |
| S21 | FMS4 | Infinity | 5.000 | 5.000 | | |
| S22 | Filter | Infinity | 0.220 | 0.220 | 1.516 | 64.10 |
| S23 | | Infinity | 2.310 | 2.310 | | |
| S24 | Imaging Plane | Infinity | 0.000 | 0.000 | | |

TABLE 12

| | Surface No. | | | | |
|---|---|---|---|---|---|
| | S4 | S5 | S6 | S7 | S12 |
| k | 0 | 0 | 0 | 0 | 0 |
| A | −1.771E−04 | −4.247E−04 | −7.951E−05 | −1.201E−05 | 6.462E−05 |
| B | −5.529E−07 | −1.707E−05 | −1.557E−05 | 3.572E−05 | 7.652E−06 |
| C | 2.574E−07 | −4.071E−07 | 1.388E−06 | −3.017E−06 | 1.010E−06 |
| D | −2.661E−08 | 2.432E−07 | 1.713E−07 | 7.409E−08 | 4.006E−08 |
| E | 1.220E−09 | 5.731E−09 | 7.268E−19 | −3.877E−19 | −7.125E−09 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

TABLE 12-continued

| | Surface No. | | | | |
|---|---|---|---|---|---|
| | S13 | S14 | S15 | S16 | S17 |
| k | 0 | 0 | 0 | 0 | 0 |
| A | −2.621E−05 | −4.111E−05 | 2.819E−05 | 4.340E−05 | −2.599E−06 |
| B | −3.890E−07 | −1.253E−05 | 4.940E−06 | 9.279E−06 | −1.192E−05 |
| C | 7.219E−07 | −3.197E−06 | 1.758E−06 | −4.833E−06 | −1.223E−06 |
| D | −7.307E−08 | 2.794E−07 | −3.498E−07 | −8.217E−07 | −5.376E−07 |
| E | 1.888E−18 | −4.590E−19 | 2.213E−18 | −4.440E−18 | 2.402E−18 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

Figure 25:
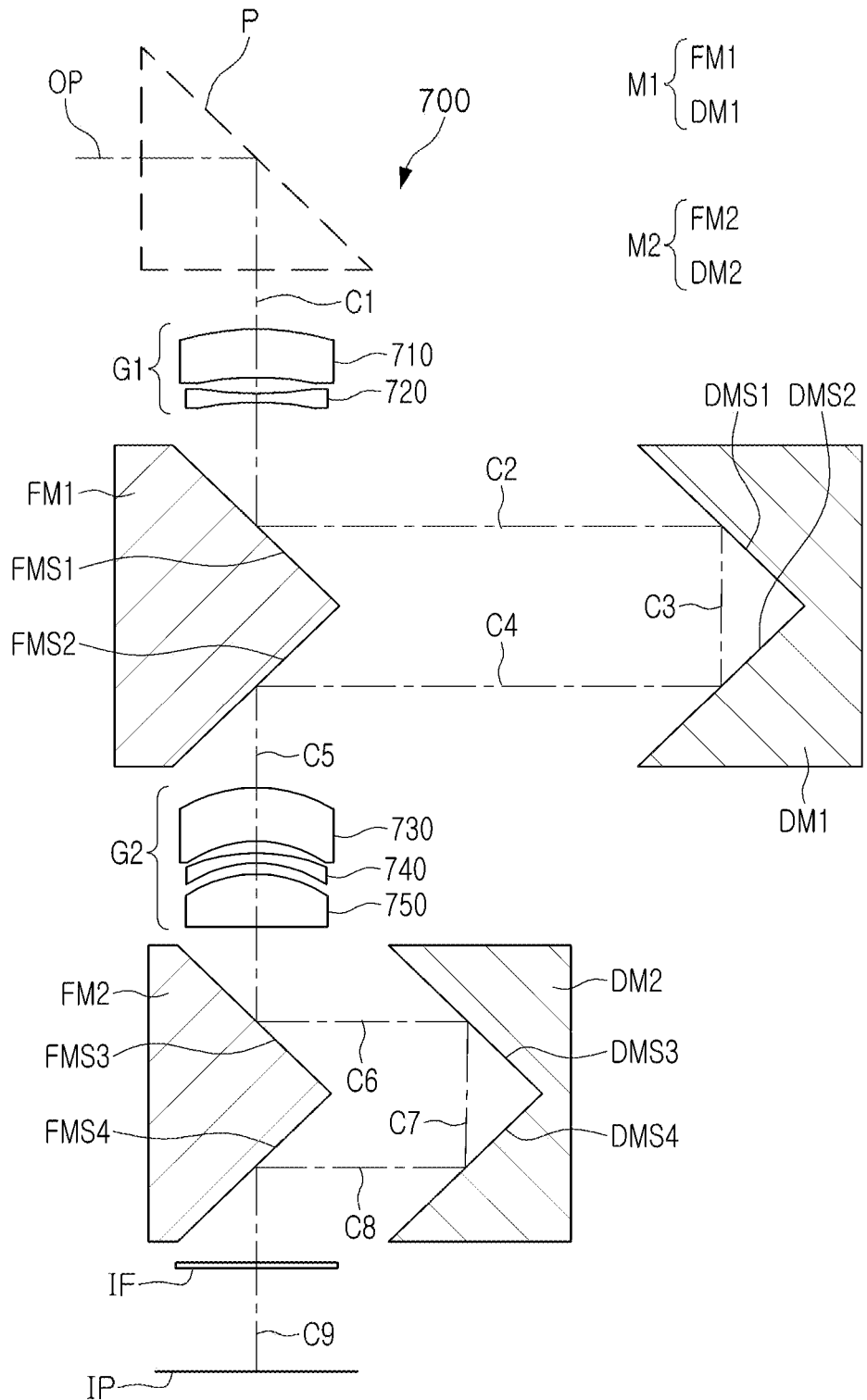
FIG. 25 is a diagram of a seventh example of a camera module in a first mode having a first magnification.
Figure 26:
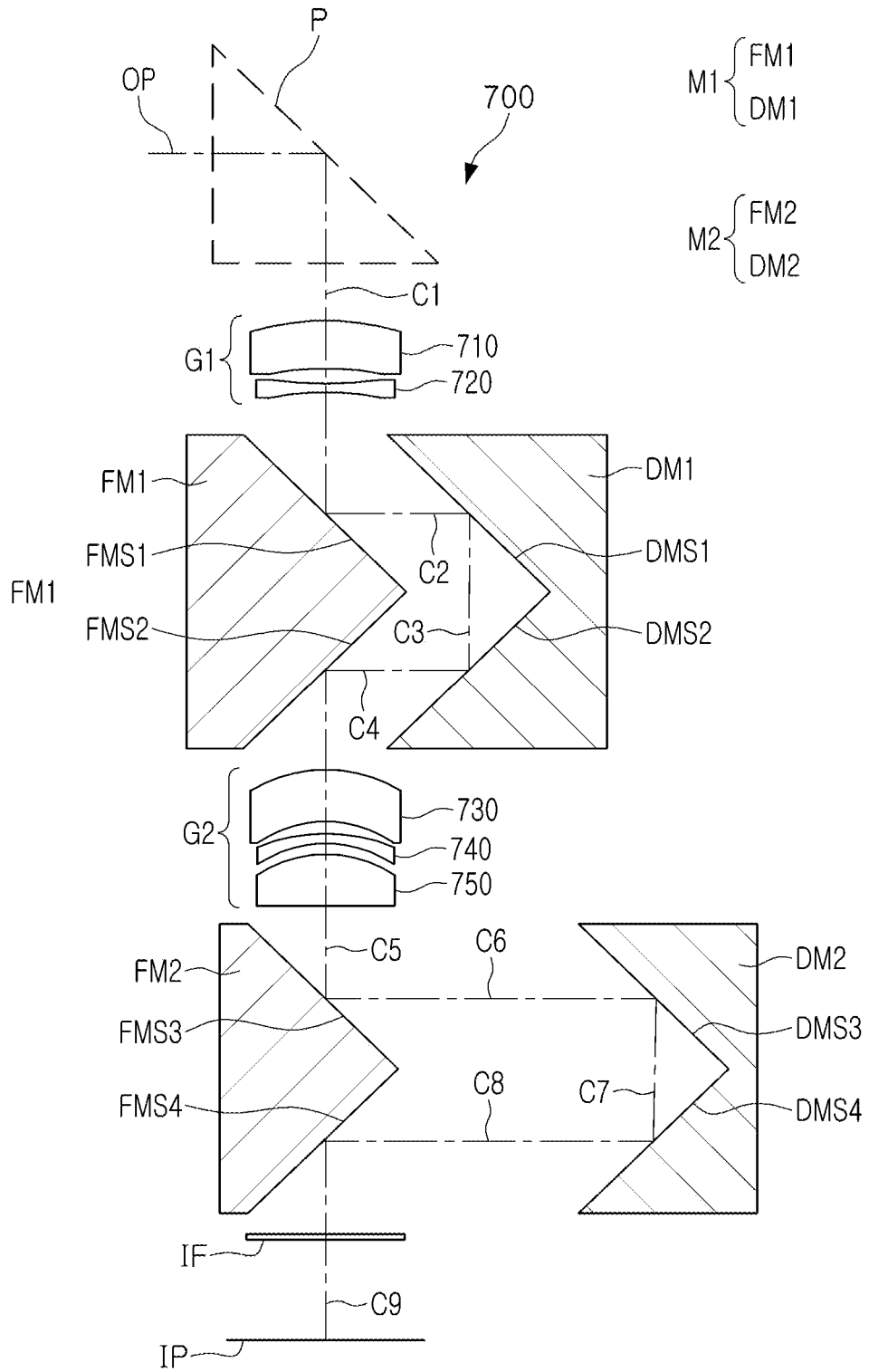
FIG. 26 is a diagram of the seventh example of the camera module in a second mode having a second magnification greater than the first magnification.
Figure 27:
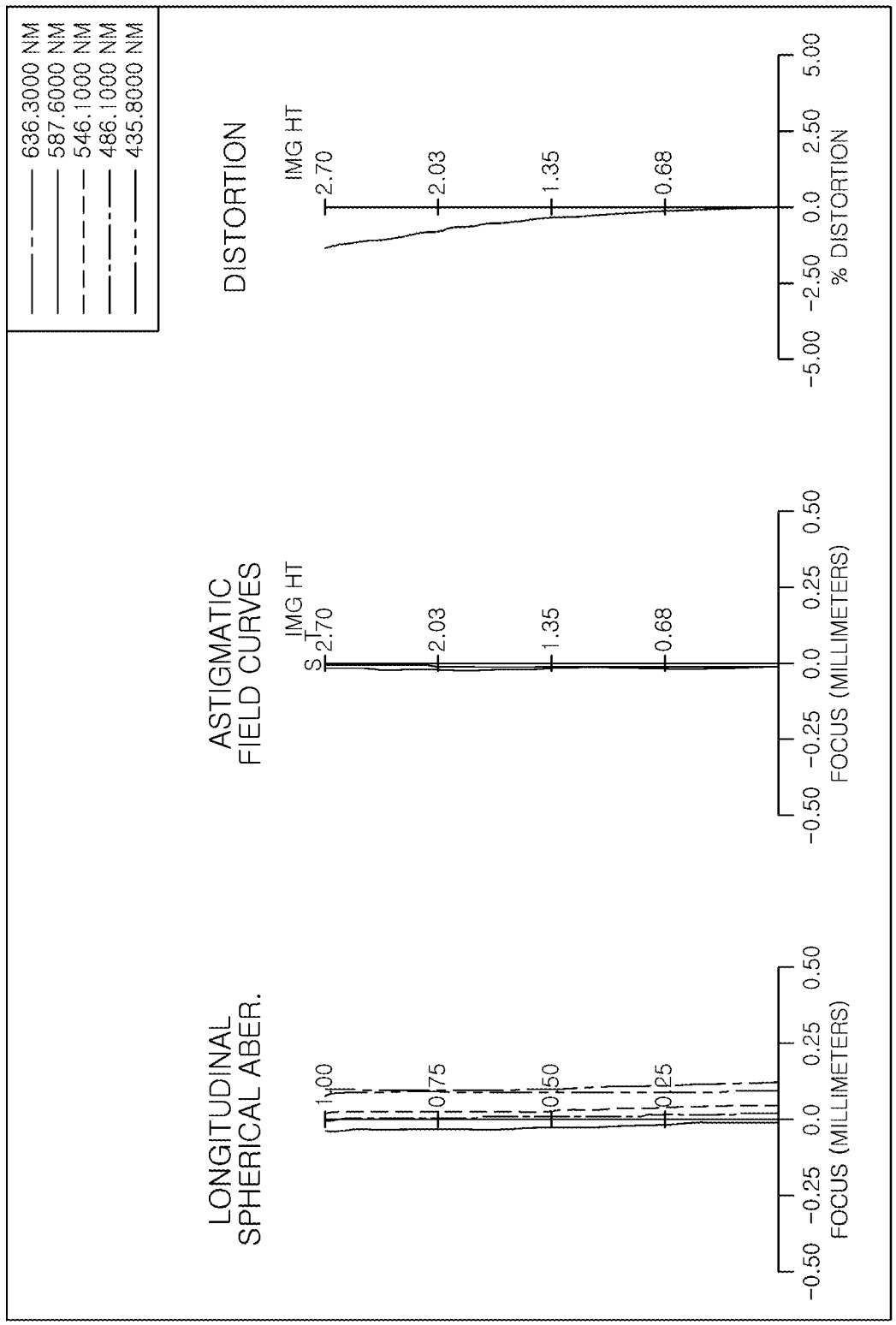
FIG. 27 shows curves representing aberration characteristics of the seventh example of the camera module in the first mode illustrated in FIG. 25.
Figure 28:
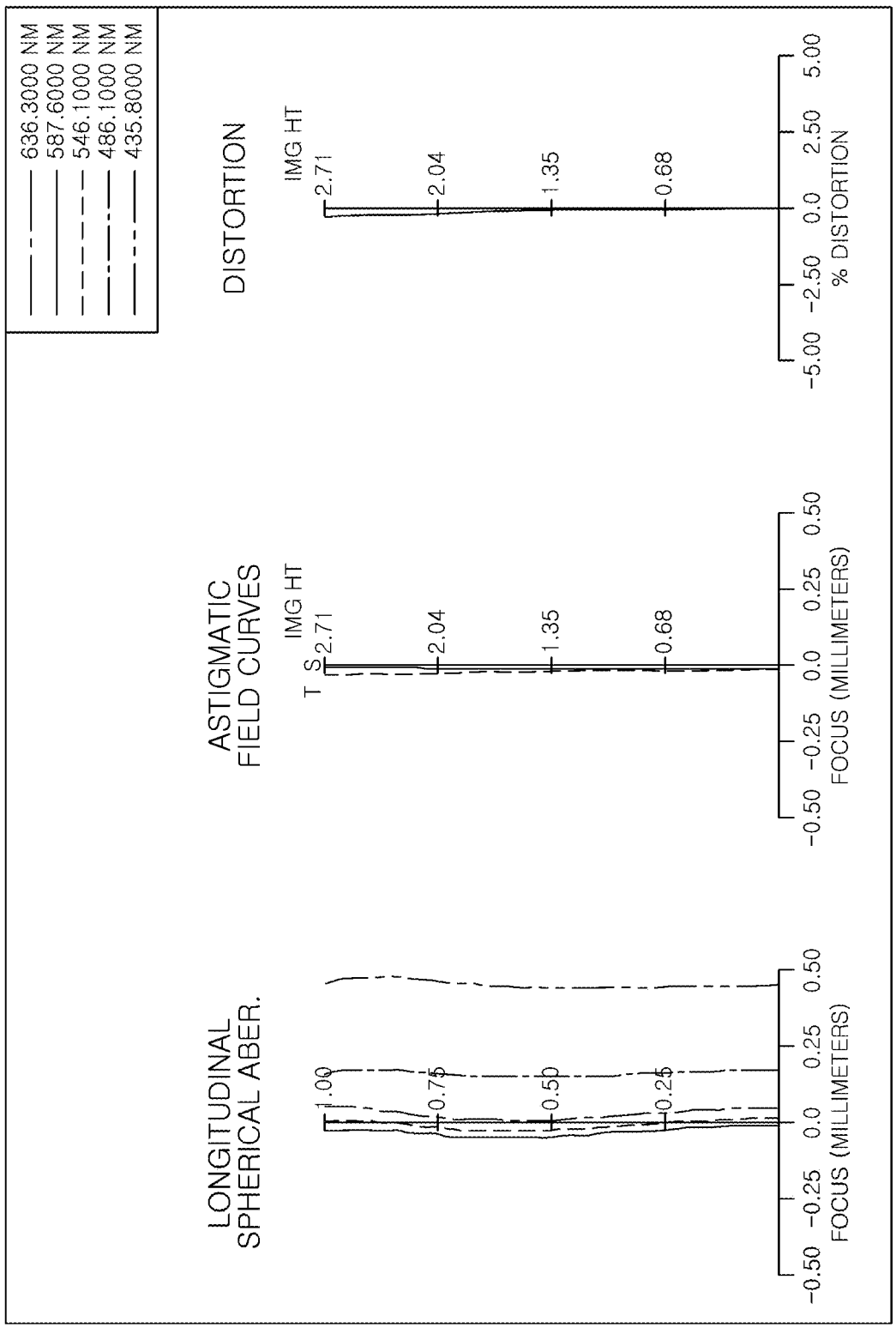
FIG. 28 shows curves representing aberration characteristics of the seventh example of the camera module in the second mode illustrated in FIG. 26.

FIG. 25 is a diagram of a seventh example of a camera module in a first mode having a first magnification, FIG. 26 is a diagram of the seventh example of the camera module in a second mode having a second magnification greater than the first magnification, FIG. 27 shows curves representing aberration characteristics of the seventh example of the camera module in the first mode illustrated in FIG. 25, and FIG. 28 shows curves representing aberration characteristics of the seventh example of the camera module in the second mode illustrated in FIG. 26.

Referring to FIGS. 25 and 26, a camera module 700 may include a prism P, a first lens group G1, a second lens group G2, a first optical path folding unit M1, a second optical path folding unit M2, a filter IF, and an image sensor IP having an imaging surface disposed at an imaging plane of the camera module 700.

The prism P may be disposed in an opening of the camera module 700. The prism P may convert a path of light incident from one side of the camera module 700 into a length direction of the camera module 700. For example, a path OP of light reflected from an object may be changed into a first optical axis C1 direction by the prism P. The first optical axis C1 is an optical axis of the first lens group G1.

The first lens group G1 may be disposed on an image side of the prism P and may include a first lens 710 and a second lens 720. The first lens 710 may have a positive refractive power, and an object-side surface thereof may be convex while an image-side surface thereof may be concave. The second lens 720 may have a negative refractive power, and an object-side surface thereof may be concave and an image-side surface thereof may be concave.

The second lens group G2 may be disposed on an image side of the first lens group G1 and may include a third lens 730, a fourth lens 740, and a fifth lens 750. The third lens 730 may have a positive refractive power, and an object-side surface thereof may be convex while an image-side surface thereof may be concave. The fourth lens 740 may have a negative refractive power, and an object-side surface thereof may be convex while an image-side surface thereof may be concave. The fifth lens 750 may have a positive refractive power, and an object-side surface thereof may be convex while an image-side surface thereof may be concave.

The first optical path folding unit M1 may be disposed between the first lens group G1 and the second lens group G2. The first optical path folding unit M1 may include a first fixed reflective member FM1 and a first movable reflective member DM1.

The first fixed reflective member FM1 may be disposed between the first lens group G1 and the second lens group G2. In detail, the first fixed reflective member FM1 may be disposed on a virtual straight line connecting the first optical axis C1 of the first lens group G1 to a fifth optical axis C5 of the second lens group G2. In other words, the fifth optical axis C5 of the second lens group G2 may be coaxial with the first optical axis C1 of the first lens group G1. The first fixed reflective member FM1 may include a plurality of reflective surfaces. For example, the first fixed reflective member FM1 may include a first fixed reflective surface FMS1 and a second fixed reflective surface FMS2. The first fixed reflective surface FMS1 may reflect light emitted from the second lens 720 in a direction intersecting the first optical axis C1. For example, the first fixed reflective surface FMS1 may reflect light incident along the first optical axis C1 in a second optical axis C2 direction intersecting the first optical axis C1. The second fixed reflective surface FMS2 may reflect light emitted from the first movable reflective member DM1 to the second lens group G2. For example, the second fixed reflective surface FMS2 may reflect light incident along a fourth optical axis C4 in the fifth optical axis C5 direction intersecting the fourth optical axis C4.

The first movable reflective member DM1 may be disposed on one side of the first fixed reflective member FM1. For example, the first movable reflective member DM1 may be disposed on the second optical axis C2 and the fourth optical axis C4. The first movable reflective member DM1 may move along the second optical axis C2 and the fourth optical axis C4. For example, the first movable reflective member DM1 may be moved to be near to the first fixed reflective member FM1 or be moved to be far from the first fixed reflective member FM1 by a first driving unit. The first movable reflective member DM1 may include a plurality of reflective surfaces. For example, the first movable reflective member DM1 may include a first movable reflective surface DMS1 and a second movable reflective surface DMS2. The first movable reflective surface DMS1 may reflect light incident along the second optical axis C2 in a third optical axis C3 direction, and the second movable reflective surface DMS2 may reflect light incident along the third optical axis C3 in the fourth optical axis C4 direction to the second fixed reflective surface FMS2. The first movable reflective member DM1 may increase or decrease a length of an optical path connecting the first lens group G1 and the second lens group G2 to each other along the first optical axis C1, the second optical axis C2, the third optical axis C3, the fourth optical axis C4, and the fifth optical axis C5. For example, the length of the optical path connecting the first lens group G1 and the second lens group G2 to each other may decrease as the first movable reflective member DM1 moves closer to the first fixed reflective member FM1, and may increase as the first movable reflective member DM1 moves farther from the first fixed reflective member FM1.

The first optical path folding unit M1 configured as described above may bypass a portion of a straight-line optical path connecting the first lens group G1 and the second lens group G2 to each other. In addition, the first optical path folding unit M1 may increase or decrease the length of the optical path connecting the first lens group G1 and the second lens group G2 to each other as described above. Therefore, in the camera module 700, a focus and a magnification may be adjusted through the first optical path folding unit M1.

The second optical path folding unit M2 is disposed between the second lens group G2 and the image sensor IP. The second optical path folding unit M2 may include a second fixed reflective member FM2 and a second movable reflective member DM2.

The second fixed reflective member FM2 may be disposed on a virtual straight line connecting the fifth optical axis C5 of the second lens group G2 to a ninth optical axis C9 of the image sensor IP. In other words, the ninth optical axis C9 of the image sensor IP may be coaxial with the fifth optical axis C5 of the second lens group G2. The second fixed reflective member FM2 may include a plurality of reflective surfaces. For example, the second fixed reflective member FM2 may include a third fixed reflective surface FMS3 and a fourth fixed reflective surface FMS4. The third fixed reflective surface FMS3 may reflect light emitted from the fifth lens 750 in a direction intersecting the fifth optical axis C5. For example, the third fixed reflective surface FMS3 may reflect light incident along the fifth optical axis C5 in a sixth optical axis C6 direction intersecting the fifth optical axis C5. The fourth fixed reflective surface FMS4 may reflect light emitted from the second movable reflective member DM2 to the image sensor IP. For example, the fourth fixed reflective surface FMS4 may reflect light incident along an eighth optical axis C8 in the ninth optical axis C9 direction intersecting the eighth optical axis C8.

The second movable reflective member DM2 may be disposed on one side of the second fixed reflective member FM2. For example, the second movable reflective member DM2 may be disposed on the sixth optical axis C6 and the eighth optical axis C8. The second movable reflective member DM2 may move along the sixth optical axis C6 and the eighth optical axis C8. For example, the second movable reflective member DM2 may be moved to be near to the second fixed reflective member FM2 or be moved to be far from the second fixed reflective member FM2 by a second driving unit. The second movable reflective member DM2 may include a plurality of reflective surfaces. For example, the second movable reflective member DM2 may include a third movable reflective surface DMS3 and a fourth movable reflective surface DMS4. The third movable reflective surface DMS3 may reflect light incident along the sixth optical axis C6 in a seventh optical axis C7 direction, and the fourth movable reflective surface DMS4 may reflect light incident along the seventh optical axis C7 in the eighth optical axis direction C8 to the fourth fixed reflective surface FMS4. The second movable reflective member DM2 may increase or decrease a length of an optical path connecting the second lens group G2 and the image sensor IP to each other along the fifth optical axis C5, the sixth optical axis C6, the seventh optical axis C7, the eighth optical axis C8, and the ninth optical axis C9. For example, the length of the optical path connecting the second lens group G2 and the image sensor IP to each other may decrease as the second movable reflective member DM2 moves closer to the second fixed reflective member FM2, and may increase as the second movable reflective member DM2 moves farther from the second fixed reflective member FM2.

The second optical path folding unit M2 configured as described above may bypass a portion of a straight-line optical path connecting the second lens group G2 and the image sensor IP to each other. In addition, the second optical path folding unit M2 may increase or decrease the length of the optical path connecting the second lens group G2 and the image sensor IP to each other as described above. Therefore, in the camera module 700, a focus and a magnification may be adjusted through the second optical path folding unit M2.

The filter IF may be disposed on an object side of the image sensor IP. The filter IF may filter light of a specific range of wavelengths included in incident light. For example, the filter IF may be configured to filter infrared rays.

The image sensor IP may be configured to convert an incident optical signal into an electric signal. The image sensor IP may include a plurality of optical sensors. The image sensor IP can be manufactured in a CCD form. However, a form of the image sensor IP is not limited to the CCD form.

The camera module 700 may perform image capturing in two modes. For example, the camera module 700 may have a first mode of capturing an image of a subject located at a middle distance, and a second mode of capturing an image of a subject located at a long distance. Alternatively, the camera module 700 may have a first mode of magnifying a subject at a first magnification and capturing an image of the magnified subject at the first magnification, and a second mode of magnifying a subject at a second magnification greater than the first magnification and capturing an image of the magnified subject at the second magnification. However, an image capturing mode of the camera module 700 is not limited to two modes. For example, the camera module 700 may also perform image capturing during an operation in which the first mode is switched to the second mode or an operation in which the second mode is switched to the first mode, as well as in the first and second modes.

First, the first mode of the camera module 700 will be described with reference to FIG. 25.

The first mode of the camera module 700 may be a mode in which the length of the optical path between the first lens group G1 and the second lens group G2 is increased by as much as possible. For example, in the first mode, the length of the optical path between the first lens group G1 and the second lens group G2 may be increased by as much as possible by increasing a distance between the first fixed reflective member FM1 and the first movable reflective member DM1. In addition, in the first mode, a focus of the camera module 700 may be adjusted while decreasing a distance between the second fixed reflective member FM2 and the second movable reflective member DM2. The camera module 700 in the first mode may capture an image of the subject located at a middle distance, or may magnify the subject at the first magnification and capture an image of the magnified subject at the first magnification, as described above.

FIG. 27 shows curves representing aberration characteristics of the camera module 700 in the first mode illustrated in FIG. 25.

Next, the second mode of the camera module 700 will be described with reference to FIG. 26.

The second mode of the camera module 700 may be a mode in which the length of the optical path between the second lens group G2 and the image sensor IP is increased by as much as possible. For example, in the second mode, the length of the optical path between the second lens group G2 and the image sensor IP may be increased by as much as possible by increasing a distance between the second fixed reflective member FM2 and the second movable reflective member DM2. In addition, in the second mode, a focus of the camera module 700 may be adjusted while decreasing the distance between the first fixed reflective member FM1 and the first movable reflective member DM1. The camera module 700 in the second mode may capture an image of the subject located at a long distance, or may magnify the subject at the second magnification greater than the first magnification and capture an image of the magnified subject at the second magnification, as described above.

FIG. 28 shows curves representing aberration characteristics of the camera module 700 in the second mode illustrated in FIG. 26.

The camera module 700 configured as described above may capture images of the subjects located at a middle distance and a long distance, or may magnify the subjects at a plurality of magnifications and capture images of the magnified subjects at the plurality of magnifications, through the plurality of optical path folding units M1 and M2. Furthermore, in the camera module 700, a folded optical path may be formed inside the camera module 700 as illustrated in FIGS. 25 and 26, and the camera module 700 may thus be miniaturized.

Table 13 below lists characteristics of the lenses and other elements of the camera module 700, and Table 14 below lists aspherical constants of surfaces of the lenses of the camera module 700. As can be seen from Table 14, all of the first to fifth lenses of the camera module 700 may have spherical surfaces.

TABLE 13

| Surface No. | Element | Radius of Curvature | Thickness/ Distance (First Mode) | Thickness/ Distance (Second Mode) | Refractive Index | Abbe Number |
|---|---|---|---|---|---|---|
| S1 | Prism | Infinity | 6.000 | 6.000 | 1.717 | 29.50 |
| S2 | | Infinity | 6.000 | 6.000 | 1.717 | 29.50 |
| S3 | | Infinity | 3.098 | 3.098 | | |
| S4 | First | 13.552 | 2.574 | 2.574 | 1.660 | 20.40 |
| S5 | Lens | 16.668 | 0.776 | 0.776 | | |
| S6 | Second | −70.345 | 0.550 | 0.550 | 1.560 | 37.30 |
| S7 | Lens | 19.573 | 6.500 | 6.500 | | |
| S8 | FMS1 | Infinity | 24.000 | 7.800 | | |
| S9 | DMS1 | Infinity | 9.000 | 9.000 | | |
| S10 | DMS2 | Infinity | 24.000 | 7.800 | | |
| S11 | FMS2 | Infinity | 5.000 | 5.000 | | |
| S12 | Third | 7.369 | 2.970 | 2.970 | 1.544 | 56.00 |
| S13 | Lens | 6.358 | 0.585 | 0.585 | | |
| S14 | Fourth | 10.067 | 0.550 | 0.550 | 1.615 | 25.90 |
| S15 | Lens | 6.450 | 0.614 | 0.614 | | |
| S16 | Fifth | 7.237 | 2.660 | 2.660 | 1.544 | 56.00 |
| S17 | Lens | 47.856 | 5.000 | 5.000 | | |
| S18 | FMS3 | Infinity | 11.000 | 18.000 | | |
| S19 | DMS3 | Infinity | 8.000 | 8.000 | | |
| S20 | DMS4 | Infinity | 11.000 | 18.000 | | |
| S21 | FMS4 | Infinity | 5.000 | 5.000 | | |
| S22 | Filter | Infinity | 0.220 | 0.220 | 1.516 | 64.10 |
| S23 | | Infinity | 5.412 | 5.412 | | |
| S24 | Imaging Plane | Infinity | 0.000 | 0.000 | | |

TABLE 14

| | Surface No. | | | | |
|---|---|---|---|---|---|
| | S4 | S5 | S6 | S7 | S12 |
| k | 0 | 0 | 0 | 0 | 0 |
| A | 0 | 0 | 0 | 0 | 0 |
| B | 0 | 0 | 0 | 0 | 0 |
| C | 0 | 0 | 0 | 0 | 0 |
| D | 0 | 0 | 0 | 0 | 0 |
| E | 0 | 0 | 0 | 0 | 0 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

| | Surface No. | | | | |
|---|---|---|---|---|---|
| | S13 | S14 | S15 | S16 | S17 |
| k | 0 | 0 | 0 | 0 | 0 |
| A | 0 | 0 | 0 | 0 | 0 |
| B | 0 | 0 | 0 | 0 | 0 |
| C | 0 | 0 | 0 | 0 | 0 |
| D | 0 | 0 | 0 | 0 | 0 |
| E | 0 | 0 | 0 | 0 | 0 |
| F | 0 | 0 | 0 | 0 | 0 |
| G | 0 | 0 | 0 | 0 | 0 |
| H | 0 | 0 | 0 | 0 | 0 |
| J | 0 | 0 | 0 | 0 | 0 |

Table 15 below lists values of parameters of the first to seventh examples of the camera module described above, and Table 16 below lists values of Conditional Expressions 1 to 13 in the first to seventh examples of the camera module described above.

TABLE 15

| Parameter | First Example | Second Example | Third Example | Fourth Example | Fifth Example | Sixth Example | Seventh Example |
|---|---|---|---|---|---|---|---|
| TTL1 | 129.0786 | 127.5235 | 126.2232 | 127.1015 | 95.0839 | 103.4086 | 125.4101 |
| TTL2 | 110.2906 | 108.3355 | 107.8352 | 108.3015 | 103.2959 | 90.0086 | 107.0101 |
| TLD | 59.0786 | 58.1235 | 56.6232 | 57.1015 | 54.0839 | 49.4086 | 55.4101 |
| fw | 25.50 | 25.50 | 25.50 | 25.50 | 16.00 | 16.00 | 25.50 |
| ft | 48.00 | 48.00 | 48.00 | 48.00 | 30.00 | 32.00 | 48.00 |
| f1 | 231.680 | 43.386 | 87.188 | 89.682 | 60.819 | 39.998 | 81.451 |
| f2 | −33.699 | −18.483 | −27.222 | −27.438 | −16.379 | −15.651 | −26.748 |
| f3 | −416.597 | −3493.170 | 4176.698 | −2215.400 | 382.450 | 83.841 | 2230.721 |
| f4 | −34.509 | −27.940 | −31.227 | −31.656 | −19.953 | −18.824 | −30.721 |

TABLE 15-continued

| Parameter | First Example | Second Example | Third Example | Fourth Example | Fifth Example | Sixth Example | Seventh Example |
|---|---|---|---|---|---|---|---|
| f5 | 15.544 | 14.590 | 15.317 | 15.188 | 10.387 | 12.585 | 15.248 |
| Fno | 7.8~10.3 | 7.6~10.0 | 8.1~10.8 | 8.1~10.7 | 9.5~12.7 | 7.5~10.0 | 8.1~10.8 |
| IMGHTw | 2.70 | 2.70 | 2.70 | 2.70 | 2.10 | 2.10 | 2.70 |
| IMGHTt | 2.71 | 2.71 | 2.71 | 2.71 | 2.10 | 2.10 | 2.71 |

TABLE 16

| Conditional Expression | First Example | Second Example | Third Example | Fourth Example | Fifth Example | Sixth Example | Seventh Example |
|---|---|---|---|---|---|---|---|
| fw/f1 | 0.1101 | 0.5877 | 0.2925 | 0.2843 | 0.2631 | 0.4000 | 0.3131 |
| fw/f3 | −0.0612 | −0.0073 | 0.0061 | −0.0115 | 0.0418 | 0.1908 | 0.0114 |
| fw/f4 | −0.7389 | −0.9127 | −0.8166 | −0.8055 | −0.8019 | −0.8500 | −0.8301 |
| fw/f5 | 1.6405 | 1.7478 | 1.6648 | 1.6790 | 1.5404 | 1.2714 | 1.6724 |
| TTL1/TTL2 | 1.1703 | 1.1771 | 1.1705 | 1.1736 | 0.9205 | 1.1489 | 1.1719 |
| ft/fw | 1.8824 | 1.8824 | 1.8824 | 1.8824 | 1.8750 | 2.0000 | 1.8824 |
| TTL2/ft | 2.2977 | 2.2570 | 2.2466 | 2.2563 | 3.4432 | 2.8128 | 2.2294 |
| ft/IMGHTt | 17.7778 | 17.7778 | 17.7778 | 17.7778 | 14.2857 | 15.2381 | 17.7778 |
| TTL1/fw | 5.0619 | 5.0009 | 4.9499 | 4.9844 | 5.9427 | 6.4630 | 4.9180 |
| TTL1/IMGHTw | 47.8069 | 47.2309 | 46.7493 | 47.0746 | 45.2780 | 49.2422 | 46.4482 |
| fw/IMGHTw | 9.4444 | 9.4444 | 9.4444 | 9.4444 | 7.6190 | 7.6190 | 9.4444 |
| TLD/TTL1 | 0.4577 | 0.4558 | 0.4486 | 0.4493 | 0.5688 | 0.4778 | 0.4418 |
| TLD/ft | 1.2308 | 1.2109 | 1.1796 | 1.1896 | 1.8028 | 1.5440 | 1.1544 |

Figure 29:
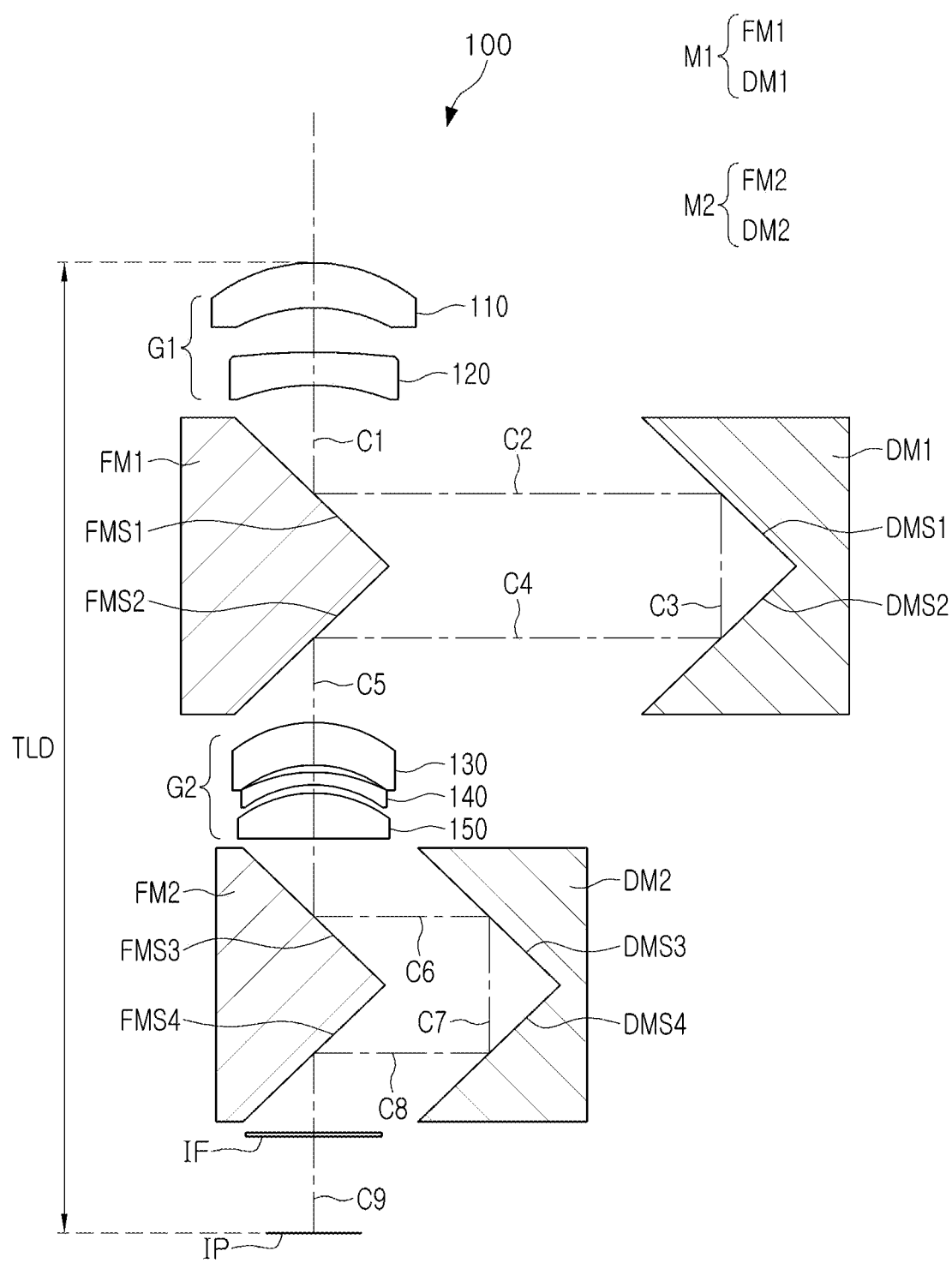
FIG. 29 is a diagram of a first modified example of the first example of the camera module illustrated in FIG. 1.

FIG. 29 is a diagram of a first modified example of the first example of the camera module illustrated in FIG. 1.

Referring to FIG. 29, the camera module 100 illustrated in FIG. 1 may be modified by omitting the prism P in FIG. 1 as illustrated in FIG. 29.

Figure 30:
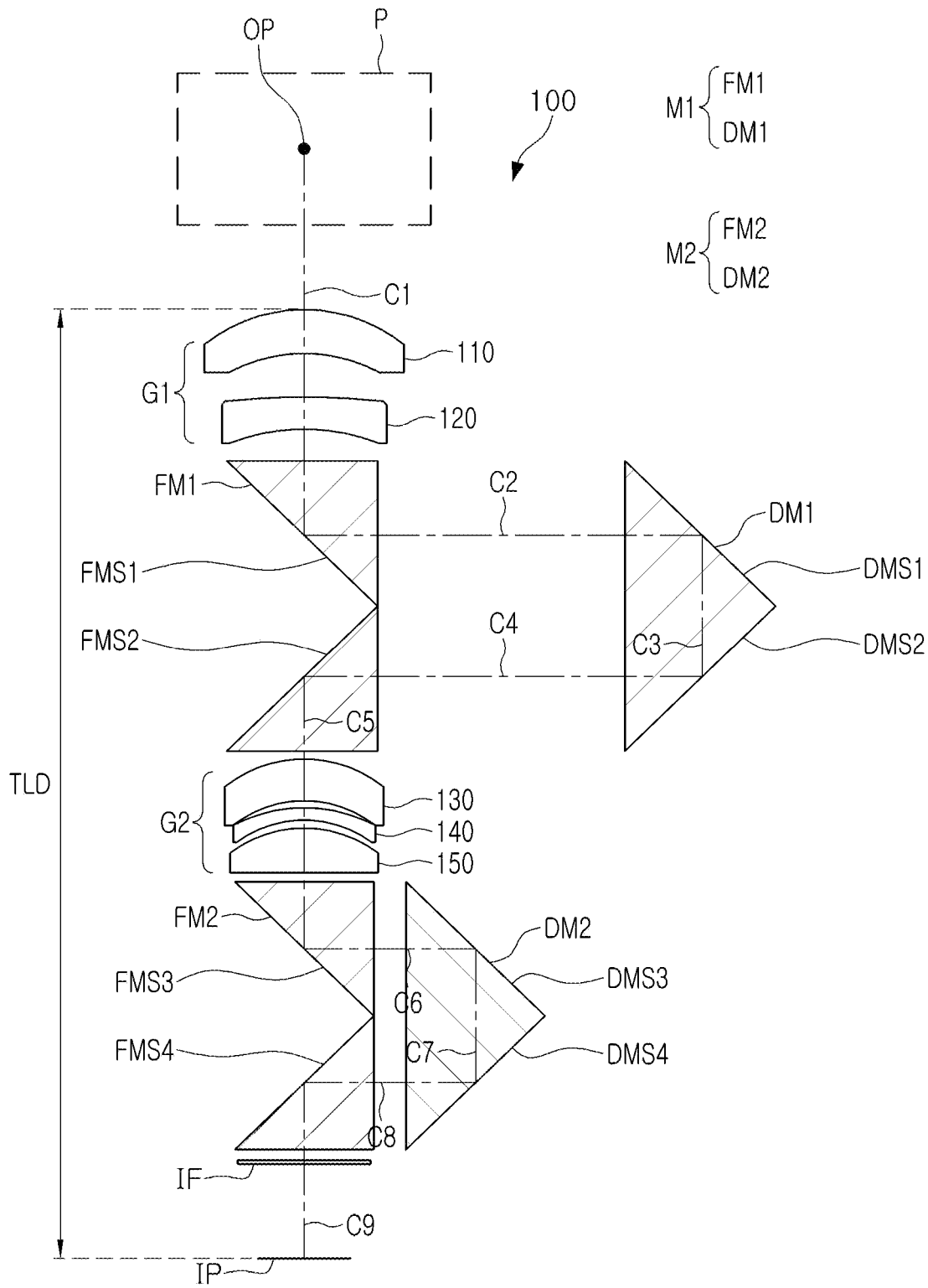
FIG. 30 is a diagram of a second modified example of the first example of the camera module illustrated in FIG. 1.

FIG. 30 is a diagram of a second modified example of the first example of the camera module illustrated in FIG. 1.

Referring to FIG. 30, the camera module 100 illustrated in FIG. 1 may be modified by rotating the prism P as illustrated in FIG. 30. Also, the first fixed reflective member FM1, the first movable reflective member DM1, the second fixed reflective member FM2, and the second movable reflective member DM2 in FIG. 1 may be replaced by prisms as illustrated in FIG. 30.

Figure 31:
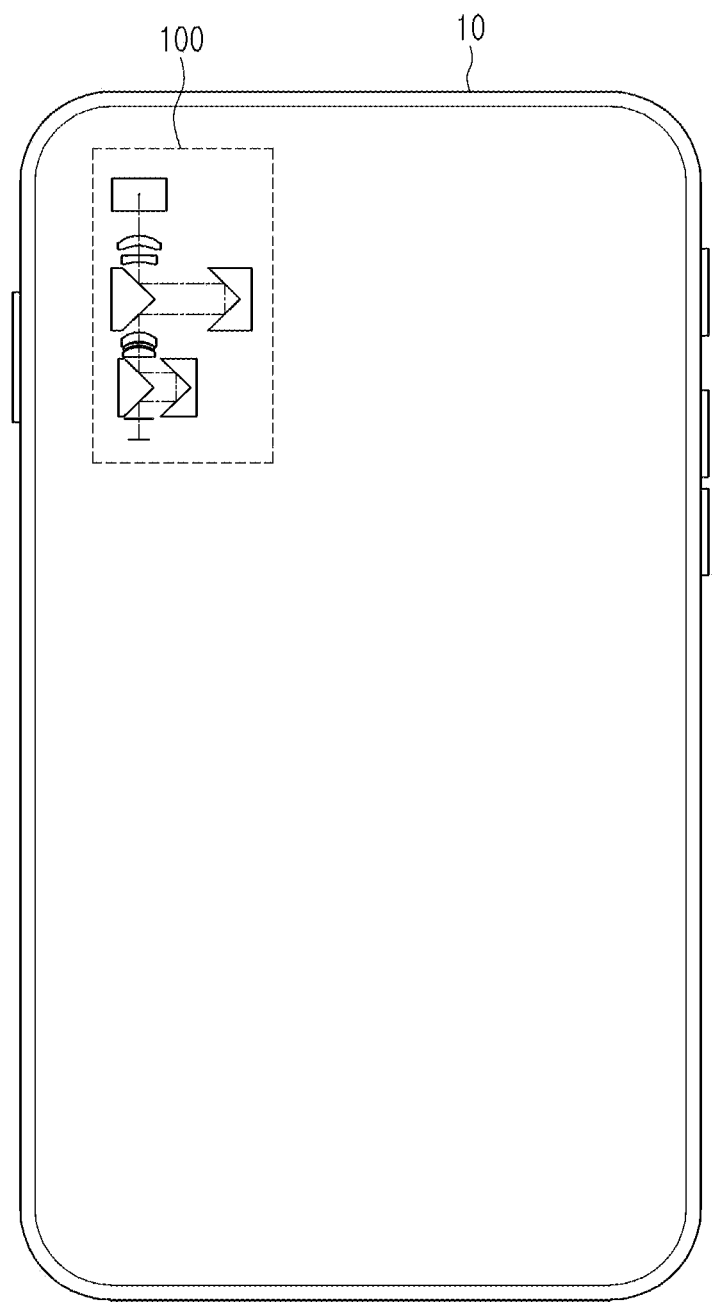
FIGS. 31 through 33 are rear views of examples of a mobile terminal in which a third modified example of the camera module illustrated in FIG. 1 is mounted.
Figure 32:
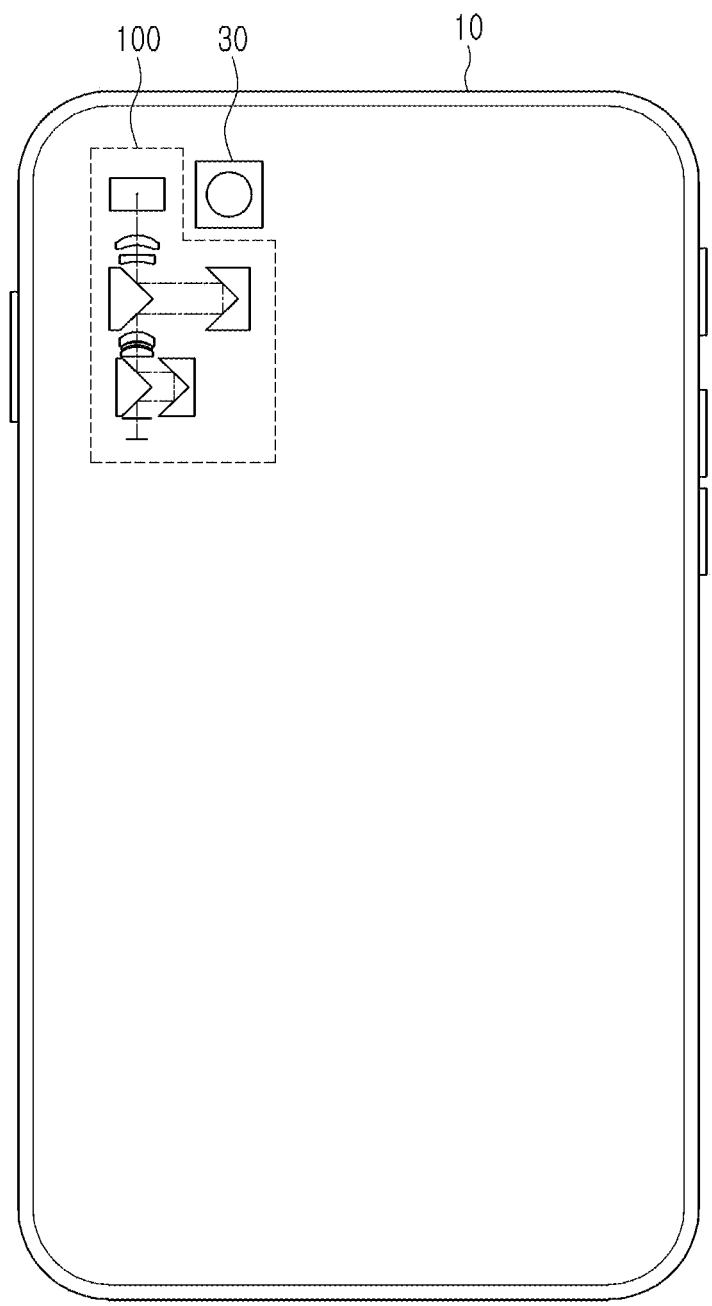
Figure 33:
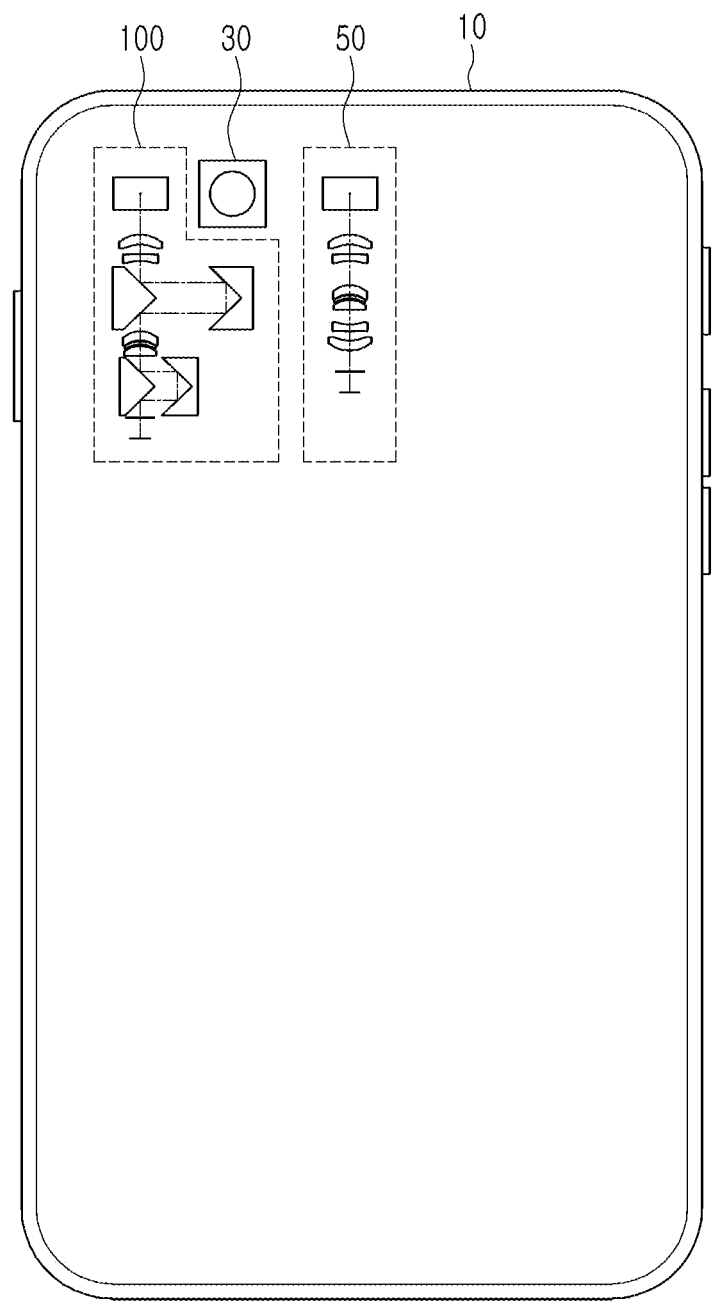

FIGS. 31 through 33 are rear views of examples of a mobile terminal in which a third modified example of the camera module illustrated in FIG. 1 is mounted.

Referring to FIG. 31, a third modified example of the camera module 100 illustrated in FIG. 1 in which the prism P is rotated as illustrated in FIG. 30 may be mounted in a length direction of a mobile terminal 10.

Referring to FIG. 32, the camera module 100 illustrated in FIG. 31 may be mounted in the mobile terminal 10 together with a camera module 30 for short distance image capturing. The camera module 30 may be mounted in an unoccupied area within a rectangular outline of the camera module 100 illustrated in FIG. 31 as illustrated in FIG. 32.

Referring to FIG. 33, the camera module 100 illustrated in FIG. 31 may be mounted in the mobile terminal 10 together with the camera module 30 for short distance image capturing illustrated in FIG. 32 and a camera module 50 for middle distance image capturing.

According to the examples described above, a camera module in which a focus and a magnification may be adjusted and that may be mounted on a mobile terminal may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a first lens group;
   a first optical path folding unit;
   a second lens group; and
   a second optical path folding unit,
   wherein the first lens group, the first optical path folding unit, the second lens group, and the second optical path folding unit are sequentially disposed from an object side of the first lens group toward an imaging plane of the camera module,
   the first lens group and the second lens group comprise a total of five lenses with refractive power,
   the first optical path folding unit comprises a first fixed reflective member and a first movable reflective member configured to vary a length of an optical path between the first lens group and the second lens group, and
   the second optical path folding unit comprises a second fixed reflective member and a second movable reflective member configured to vary a length of an optical path between the second lens group and the imaging plane.

2. The camera module of claim 1, wherein the first lens group comprises:
 a first lens having a refractive power; and
 a second lens having a refractive power.

3. The camera module of claim 2, wherein an object-side surface of the first lens is convex.

4. The camera module of claim 2, wherein an image-side surface of the second lens is concave.

5. The camera module of claim 1, wherein the second lens group comprises:
 a third lens having a refractive power;
 a fourth lens having a refractive power; and
 a fifth lens having a refractive power.

6. The camera module of claim 5, wherein an object-side surface of the third lens is convex.

7. The camera module of claim 5, wherein an object-side surface of the fourth lens is convex.

8. The camera module of claim 5, wherein an object-side surface of the fifth lens is convex.

9. The camera module of claim 1, further comprising a prism disposed before the object side of the first lens group.

10. The camera module of claim 1, wherein the first movable reflective member and the second movable reflective member are configured to move so that a distance between the first fixed reflective member and the first movable reflective member decreases as a distance between the second fixed reflective member and the second movable reflective member increases, and increases as the distance between the second fixed reflective member and the second movable reflective member decreases.

11. A camera module comprising:
 a first lens group;
 a second lens group;
 a first optical path folding unit disposed between the first lens group and the second lens group; and
 a second optical path folding unit disposed between the second lens group and an imaging plane of the camera module,
 wherein the first lens group and the second lens group comprise a total of five lenses with refractive power,
 wherein an optical path of the camera module extends from an object side of the first lens group to the imaging plane, and
 the first optical path folding unit and the second optical path folding unit are configured to increase or decrease a length of at least one portion of the optical path of the camera module in a direction intersecting an optical axis of the first lens group.

12. The camera module of claim 11, wherein the first lens group comprises a first lens,
 the optical path of the camera module extends from an object-side surface of the first lens to the imaging plane, and
 a ratio (TTL1/TTL2) of a maximum length (TTL1) of the optical path of the camera module to a minimum length (TTL2) of the optical path of the camera module is 0.90 to 1.20.

13. The camera module of claim 11, wherein the camera module comprises an optical imaging system comprising the first lens group, the second lens group, the first optical path folding unit, and the second optical path folding unit, and
 a ratio (ft/fw) of a maximum focal length (ft) of the optical imaging system to a minimum focal length (fw) of the optical imaging system is 1.8 to 2.2.

14. The camera module of claim 13, wherein the first lens group comprises a first lens,
 the optical path of the camera module extends from an object-side surface of the first lens to the imaging plane, and
 a ratio (TTL2/ft) of a minimum length (TTL2) of the optical path of the camera module to the maximum focal length (ft) is 2.0 to 4.0.

15. The camera module of claim 13, wherein a ratio (ft/IMGHTt) of the maximum focal length (ft) to an image height (IMGHTt) of the optical imaging system at the maximum focal length (ft) equal to one half of a diagonal length of an effective area of the imaging plane at the maximum focal length (ft) is 14 to 20.

16. The camera module of claim 11, further comprising a prism disposed before an object side of the first lens group.

17. A camera module comprising:
 a first lens group having an optical axis;
 a first optical path folding unit;
 a second lens group having an optical axis; and
 a second optical path folding unit,
 wherein the first lens group and the second lens group comprise a total of five lenses with refractive power,
 wherein the first lens group, the first optical path folding unit, the second lens group, and the second optical path folding unit are sequentially disposed from an object side of the first lens group toward an imaging plane of the camera module,
 the first optical path folding unit comprises:
 a first fixed reflective member; and
 a first movable reflective member configured to move in a direction intersecting the optical axis of the first lens group to vary a length of an optical path between the first lens group and the second lens group, and
 the second optical path folding unit comprises:
 a second fixed reflective member; and
 a second movable reflective member configured to move in a direction intersecting the optical axis of the second lens group to vary a length of an optical path between the second lens group and the imaging plane.

18. The camera module of claim 17, wherein the first fixed reflective member is disposed between the first lens group and the second lens group on a virtual straight line that is coaxial with the optical axis of the first lens group,
 the first movable reflective member is disposed to face the first fixed reflective member in the direction intersecting the optical axis of the first lens group,
 the second fixed reflective member is disposed between the second lens group and the imaging plane on a virtual straight line that is coaxial with the optical axis of the second lens group, and
 the second movable reflective member is disposed to face the second fixed reflective member in the direction intersecting the optical axis of the second lens group.

19. The camera module of claim 18, wherein the first movable reflective member is configured to move away from the first fixed reflective member to decrease a magnification of the camera module, and move toward the first fixed reflective member to adjust a focus of the camera module, and
 the second movable reflective member is configured to move away from the second fixed reflective member to increase the magnification of the camera module as the first movable reflective member moves toward the first fixed reflective member to adjust the focus of the camera module, and move toward the second fixed reflective member to adjust the focus of the camera module as the first movable reflective member moves away from the first fixed reflective member to decrease the magnification of the camera module.

20. The camera module of claim 17, wherein the first lens group comprises a first lens having a positive refractive power and a second lens having a negative refractive power sequentially disposed in ascending numerical order along the optical axis of the first lens group from the object side of the first lens group to an image side of the first lens group, and the second lens group comprises a third lens having a refractive power, a fourth lens having a negative refractive power, and a fifth lens having a positive refractive power sequentially disposed in ascending numerical order along the optical axis of the second lens group from an object side of the second lens group to an image side of the second lens group.

21. An electronic device comprising the camera module of claim 17.

22. The electronic device of claim 21, further comprising either one or both of a camera module configured to perform short distance image capturing and a camera module configured to perform middle distance image capturing.

23. A camera module comprising:
a first lens group having an optical axis;
a second lens group having an optical axis;
a first optical path folding unit disposed between the first lens group and the second lens group; and
a second optical path folding unit disposed between the second lens group and an imaging plane of the camera module,
wherein the first lens group and the second lens group comprise a total of five lenses with refractive power,
wherein an optical path of the camera module extends from an object side of the first lens group to an imaging plane of the camera module and comprises:
first path portions formed by the first optical path folding unit and extending in a direction intersecting the optical axis of the first lens group; and
second path portions formed by the second optical path folding unit and extending in a direction intersecting the optical axis of the second lens group,
the first optical path folding unit is configured to increase or decrease respective lengths of the first path portions, and
the second optical path folding unit is configured to increase or decrease respective lengths of the second path portions.

24. The camera module of claim 23, wherein the first optical path folding unit comprises:
a first fixed reflective member disposed between the first lens group and the second lens group on a virtual straight line that is coaxial with the optical axis of the first lens group; and
a first movable reflective member disposed on the first path portions, and
the second optical path folding unit comprises:
a second fixed reflective member disposed between the second lens group and the second lens group on a virtual straight line that is coaxial with the optical axis of the second lens group; and
a second movable reflective member disposed on the second path portions.

25. The camera module of claim 24, wherein the first movable reflective member is configured to increase the respective lengths of the first path portions to decrease a focal length of the camera module, and decrease the respective lengths of the first path portions to adjust a focus of the camera module, and the second movable reflective member is configured to increase the respective lengths of the second path portions to increase the focal length of the camera module as the first movable reflective member decreases the respective lengths of the first path portions to adjust the focus of the camera module, and decrease the respective lengths of the second path portions to adjust the focus of the camera module as the first movable reflective member increases the respective lengths of the first path portions to decrease the focal length of the camera module.

26. The camera module of claim 23, wherein the first lens group comprises a first lens having a positive refractive power and a second lens having a negative refractive power sequentially disposed in ascending numerical order along the optical axis of the first lens group from the object side of the first lens group to an image side of the first lens group, and the second lens group comprises a third lens having a refractive power, a fourth lens having a negative refractive power, and a fifth lens having a positive refractive power sequentially disposed in ascending numerical order along the optical axis of the second lens group from an object side of the second lens group to an image side of the second lens group.

27. An electronic device comprising the camera module of claim 23.

28. The electronic device of claim 27, further comprising either one or both of a camera module configured to perform short distance image capturing and a camera module configured to perform middle distance image capturing.

* * * * *